(12) United States Patent
Fujita et al.

(10) Patent No.: US 9,752,221 B2
(45) Date of Patent: Sep. 5, 2017

(54) STEEL SHEET PROVIDED WITH HOT DIP GALVANIZED LAYER EXCELLENT IN PLATING WETTABILITY AND PLATING ADHESION AND METHOD OF PRODUCTION OF SAME

(71) Applicant: NIPPON STEEL & SUMITOMO METAL CORPORATION, Tokyo (JP)

(72) Inventors: Soshi Fujita, Tokyo (JP); Shintaro Yamanaka, Tokyo (JP); Koichi Sato, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 691 days.

(21) Appl. No.: 14/346,618

(22) PCT Filed: Sep. 28, 2012

(86) PCT No.: PCT/JP2012/075189
§ 371 (c)(1),
(2) Date: Mar. 21, 2014

(87) PCT Pub. No.: WO2013/047804
PCT Pub. Date: Apr. 4, 2013

(65) Prior Publication Data
US 2014/0234656 A1 Aug. 21, 2014

(30) Foreign Application Priority Data
Sep. 30, 2011 (JP) ................................. 2011-217144

(51) Int. Cl.
*B32B 15/01* (2006.01)
*C21D 9/46* (2006.01)
(Continued)

(52) U.S. Cl.
CPC .............. *C23C 2/02* (2013.01); *B32B 15/013* (2013.01); *C21D 1/74* (2013.01); *C21D 8/0278* (2013.01);
(Continued)

(58) Field of Classification Search
None
See application file for complete search history.

(56) References Cited

U.S. PATENT DOCUMENTS 7,687,152 B2    3/2010    Ikematsu et al.
2004/0202889 A1   10/2004   Fujita et al.
(Continued)

FOREIGN PATENT DOCUMENTS

CN    1771344 A    5/2006
CN    101641456 A   2/2010
(Continued)

OTHER PUBLICATIONS

International Search Report issued in PCT/JP2012/075189 mailed Dec. 25, 2012.

*Primary Examiner* — Humera Sheikh
*Assistant Examiner* — Lucas Wang
(74) *Attorney, Agent, or Firm* — Birch, Stewart, Kolasch & Birch, LLP

(57) ABSTRACT

A steel sheet which uses steel sheet which contains the easily oxidizable elements Si and Mn as a base material and which is provided with a hot dip galvanized layer which is excellent in plating wettability and plating adhesion and a method of production of the same are provided. A hot dip galvanized steel sheet which is comprised of a steel sheet having a hot dip galvanized layer A on the surface of the steel sheet, characterized by having the following B layer right under the steel sheet surface and in the steel sheet:
B layer: Layer which has thickness of 0.001 µm to 0.5 µm, which contains, based on mass of the B layer, one or more of Fe, Si, Mn, P, S, and Al oxides in a total of less than 50 mass %, which contains C, Si, Mn, P, S, and Al not in oxides in C: less than 0.05 mass %, Si: less than 0.1 mass %, Mn: less than 0.5 mass %, P: less than 0.001 mass %, S: less than 0.001 mass %, and Al: less than 0.005 mass % and which contains Fe not in oxides in 50 mass % or more.

12 Claims, 4 Drawing Sheets

(51) Int. Cl.
*C23C 2/02* (2006.01)
*C21D 1/74* (2006.01)
*C22C 38/00* (2006.01)
*C23C 2/06* (2006.01)
*C22C 38/06* (2006.01)
*C22C 38/58* (2006.01)
*C22C 38/02* (2006.01)
*C22C 38/04* (2006.01)
*C21D 8/02* (2006.01)

(52) U.S. Cl.
CPC ............... C21D 9/46 (2013.01); C22C 38/00 (2013.01); C22C 38/02 (2013.01); C22C 38/04 (2013.01); C22C 38/06 (2013.01); C22C 38/58 (2013.01); C23C 2/06 (2013.01); C21D 8/0226 (2013.01); C21D 8/0236 (2013.01); *Y10T 428/12799* (2015.01)

(56) References Cited

U.S. PATENT DOCUMENTS

| | | | |
|---|---|---|---|
| 2006/0292391 A1* | 12/2006 | Ikematsu | C22C 38/02 428/659 |
| 2007/0051438 A1* | 3/2007 | Honda | C21D 1/76 148/533 |
| 2010/0104891 A1* | 4/2010 | Nakagaito | C22C 38/02 428/659 |
| 2011/0095002 A1* | 4/2011 | Katayama | B23K 26/244 219/121.61 |

FOREIGN PATENT DOCUMENTS

| | | |
|---|---|---|
| JP | 2001-200352 A | 7/2001 |
| JP | 2001-226742 A | 8/2001 |
| JP | 2003-171752 A | 6/2003 |
| JP | 2004-149912 A | 5/2004 |

* cited by examiner

STEEL SHEET PROVIDED WITH HOT DIP GALVANIZED LAYER EXCELLENT IN PLATING WETTABILITY AND PLATING ADHESION AND METHOD OF PRODUCTION OF SAME

TECHNICAL FIELD

The present invention relates to a hot dip galvanized steel sheet and a method of production of the same, more particularly relates to a steel sheet which is provided with a hot dip galvanized layer excellent in plating wettability and plating adhesion and which can be applied as a member in the automotive field, household appliance field, and construction material field and a method of production of the same.

BACKGROUND ART

In members in the automotive field, household appliance field, and construction material field, surface treated steel sheet which imparts corrosion prevention is being used. In particular, hot dip galvanized steel sheet which can be inexpensively produced and which is excellent in corrosion prevention is being used.

In general, hot dip galvanized steel sheet is produced by the following method using a continuous hot dip galvanization facility. First, a slab is hot rolled, cold rolled, and heat treated to obtain a thin-gauge steel sheet. This is degreased and/or pickled by a pretreatment step for the purpose of cleaning the surface of the base material steel sheet or, omitting the pretreatment step, is heated in a preheating furnace to burn off the oil on the surface of the base material steel sheet surface, then is heated to recrystallize and anneal it. The atmosphere at the time of recrystallization and annealing is an Fe reducing atmosphere since at the time of the later plating treatment, Fe oxides would obstruct the wettability of the plating layer and the base material steel sheet or the adhesion of the plating layer and base material steel sheet. After the recrystallization and annealing, without contacting the air, the steel sheet is continuously cooled to a temperature suitable for plating in an Fe reducing atmosphere and dipped in a hot dip galvanization bath for hot dip galvanization.

In a continuous hot dip galvanization facility, the types of heating furnaces which perform the recrystallization and annealing include DFF (direct flame furnaces), NOF (non-oxidizing furnaces), all radiant tube type (all reducing) types or combinations of the same etc., but for ease of operation, less roll pickup in the heating furnace, the ability to produce high quality plated steel sheet at a lower cost, and other reasons, the mainstream practice has been to make the entire inside of the furnace an Fe reducing atmosphere and make the heating furnace an all radiant tube type. The "roll pickup" referred to here means the deposition of oxides or foreign matter from the surface of the steel sheet on the rolls in the furnace at the time of running through the furnace. After deposition, defects in appearance occur at the steel sheet, so this has a detrimental effect on quality and productivity.

In recent years, in particular in the automotive field, to achieve both the function of protecting the passengers at the time of collision and lighter weight aimed at improvement of the fuel efficiency, use of hot dip galvanized steel sheet which is made higher in strength of the base material steel sheet by inclusion of elements such as Si and Mn has been increasing.

However, Si and Mn are elements which are more easily oxidizable compared with Fe, so at the time of heating in recrystallization and annealing in the all radiant tube type of furnace, even in a reducing atmosphere of Fe, Si and Mn end up oxidizing. For this reason, in a steel sheet which contains Si and Mn, in the process of recrystallization and annealing, the Si and Mn present in the steel sheet surface oxidize. Further, the Si and Mn which thermally diffuse from the inside of the steel sheet oxidize at the steel sheet surface whereby gradually the Si and Mn oxides become concentrated. If the Si and Mn oxides concentrate at the steel sheet surface, in the process of dipping the steel sheet in the hot dip galvanization bath, contact between the molten zinc and steel sheet would be obstructed, which would cause a drop in the wettability of the plating layer and adhesion of the plating layer. If the plating layer falls in wettability, non-plating defects occur and result in defects in appearance and/or defects in corrosion prevention. If the plating adhesion falls, when press forming this plated steel sheet, peeling of the plating occurs and results in defects in appearance and/or defects in corrosion prevention after forming, so becomes a major problem.

As the art for suppressing concentration of oxides of Si and Mn, as art focusing on the recrystallization and annealing process, PLT 1 shows oxidizing the steel sheet surface so that the thickness of the oxide film becomes 400 to 10000 Å, then reducing the Fe in the furnace atmosphere containing hydrogen and then plating. Further, PLT 2 shows the method of oxidizing the steel sheet surface and controlling the oxygen potential in the reducing furnace to thereby reduce the Fe and internally oxidize the Si so as to suppress the concentration of Si oxides at the surface, then plating. However, in these art, if the reduction time is too long, Si concentrates at the surface, while if too short, an Fe oxide film remains on the steel sheet surface. In the actual case where the oxide film on the steel sheet surface becomes uneven in thickness, there is the problem that adjustment of the reducing time is extremely difficult and issues in the plating layer wettability and plating layer adhesion are insufficiently resolved. Furthermore, if the Fe oxide film of the surface at the time of oxidation becomes too thick, there is the problem that roll pickup is caused.

PLT 3 solves the above problem which was due to causing Fe to oxidize once, has as its object to suppress the concentration of the Si and Mn oxides, and shows a method comprising lowering the oxygen potential ($\log(PH_2O/PH_2)$) of the atmosphere in the recrystallization and annealing in an all radiant tube type of furnace to a value at which Fe and Si and Mn will not be oxidized (be reduced), then plating. However, in this art, to reduce Si and Mn, it is necessary to greatly lower the steam concentration of the atmosphere or greatly raise the hydrogen concentration, but there is the problem that this is poor in industrial practicality and also the problem that the Si and Mn which remain at the steel sheet surface without being oxidized obstruct the reaction between the plating and base material steel sheet and, further, react with the oxides floating on the surface of the bath to form Si and Mn oxides at the time of dipping in the plating bath, so the plating wettability and plating adhesion fall.

PLT 4 shows a method of raising the oxygen potential in the atmosphere in the recrystallization and annealing in an all radiant tube type of furnace until Si and Mn internally oxidize, then plating. Further, PLTs 5 and 6 show methods of carefully controlling the means and conditions for raising the oxygen potential to suppress the surface concentration of both Fe oxides and Si and Mn oxides, then plating. However, if raising the oxygen potential, Si and Mn internally oxidize, but Fe oxidizes. On the other hand, with an increase of oxygen potential of an extent where Fe does not oxidize, the internal oxidation of Si and Mn becomes insufficient and Si and Mn oxides concentrate at the surface. In the arts of adjusting the oxygen potential of the atmosphere which are described in PLTs 4 to 6, there is the problem that the issues in plating layer wettability and the plating layer adhesion are not sufficiently resolved.

Furthermore, as art for suppressing the concentration of Si and Mn oxides, as the above-mentioned means increasing the steps of production of the general continuous type hot dip galvanization, PLT 7 shows the method of performing annealing two times, pickling and removing the surface concentrates of Si which are formed on the surface after the first annealing so as to suppress the formation of surface concentrates at the time of the second annealing, then plating. However, when the Si concentration is high, pickling is not enough to completely remove the surface concentrates, so the plating wettability and plating adhesion are insufficiently improved. Further, facilities for two annealing operations and pickling facilities are newly required for removing the surface concentrates of Si, so there is the problem of an increase in the capital costs and production costs.

PLTs 8 and 9 show methods of preplating the steel sheet surface by Cr, Ni, Fe, etc. before or after recrystallization and annealing, then plating. However, in these art, there are the problem that when preplating before recrystallization and annealing, the heating at the time of annealing causes the preplated elements to diffuse in the steel sheet and the steel sheet to fall in strength and elongation and the problem that the Fe or Si and Mn which diffuse at the steel sheet surface oxidizes. Further, when preplating after recrystallization and annealing, oxides are formed on the steel sheet surface, so there is the problem that preplating unevenly deposits on the steel sheet and has difficulty covering the concentrated oxides. Further, this method has the problem that no matter whether performing the preplating before or after the recrystallization and annealing, cost is incurred in the materials of the preplating or costs are incurred in the preplating facilities, so the increase in steps leads to an increase in the production costs.

Furthermore, in art which suppresses the concentration of the Si and Mn, as art which focuses on causing internal oxidation in advance in the hot rolling step, PLT 10 shows the art of controlling the oxygen potential in the hot rolling step so as to cause internal oxidation of Si and using the resultant thin-gauge steel sheet to produce hot dip galvanized steel sheet by a continuous hot dip galvanization facility. However, in this art, at the time of the cold rolling step and other rolling, the layer of internal oxidation also ends up being rolled together, so the internal oxidation layer becomes smaller in thickness and Si oxides end up concentrating at the surface in the recrystallization and annealing process, so there is the problem that the plating wettability and plating adhesion are insufficiently improved. Further, there is the problem that if causing internal oxidation in the hot rolling step, the simultaneously formed Fe oxides cause roll pickup.

PLT 11 shows the method of controlling the oxygen potential in the atmosphere in the heating furnace and the oxygen potential in the atmosphere at the topmost part of the soaking furnace high in the same way and controlling the oxygen potential of the top part of the soaking furnace to be higher than the oxygen potential at the bottom part of the furnace by a certain degree to plate the high-Si containing steel sheet. However, by this method as well, the plating adhesion is insufficient.

CITATIONS LIST

Patent Literature

PLT 1. Japanese Patent Publication No. 55-122865A
PLT 2. Japanese Patent Publication No. 2001-323355A
PLT 3. Japanese Patent Publication No. 2010-126757A
PLT 4. Japanese Patent Publication No. 2008-7842A
PLT 5. Japanese Patent Publication No. 2001-279412A
PLT 6. Japanese Patent Publication No. 2009-209397A
PLT 7. Japanese Patent Publication No. 2010-196083A
PLT 8. Japanese Patent Publication No. 56-33463A
PLT 9. Japanese Patent Publication No. 57-79160A
PLT 10. Japanese Patent Publication No. 2000-309847A
PLT 11. Japanese Patent Publication No. 2009-068041A

SUMMARY OF INVENTION

Technical Problem

The present invention has as its problem to provide a hot dip galvanized steel sheet which uses a steel sheet which contains the easily oxidizable elements of Si and Mn as a base material and is provided with a hot dip galvanized layer which is excellent in plating wettability and plating adhesion and to provide a method of production of the same.

Solution to Problem

To solve the above problem, the inventors took note of the effect of the contents of components of the hot dip galvanized layer and base material steel sheet in a hot dip galvanized steel sheet, in particular the base material steel sheet right under the plating layer, on the plating wettability and plating adhesion and further took note of, in the method of production of the same, achieving both causing internal oxidation of Si and Mn when raising the oxygen potential of the atmosphere and reducing the Fe in a radiant tube type of heating furnace by controlling the recrystallization and annealing to the oxygen potential in the heating step and soaking step. They engaged in various studies in depth and, as a result, discovered that it is possible to produce hot dip galvanized steel sheet which is excellent in plating wettability and plating adhesion without increasing the steps in a continuous hot dip galvanization facility which is provided with an all radiant tube type of heating furnace and thereby completed the present invention.

That is, the present invention has as its gist the following:

(1) A hot dip galvanized steel sheet comprising a steel sheet which contains, by mass %,
C: 0.05% to 0.50%,
Si: 0.1% to 3.0%,
Mn: 0.5% to 5.0%,
P: 0.001% to 0.5%,
S: 0.001% to 0.03%,
Al: 0.005% to 1.0%, and
a balance of Fe and unavoidable impurities, having a hot dip galvanized layer A on the surface of the steel sheet, characterized by having the following B layer right below the steel sheet surface and inside the steel sheet:

B layer: Layer which has thickness of 0.001 μm to 0.5 μm, which contains, based on mass of the B layer, one or more of Fe, Si, Mn, P, S, and Al oxides in a total of less than 50 mass %, which contains C, Si, Mn, P, S, and Al not in oxides in:
C: less than 0.05 mass %,
Si: less than 0.1 mass %,
Mn: less than 0.5 mass %,
P: less than 0.001 mass %,
S: less than 0.001 mass %, and
Al: less than 0.005 mass %, and
which contains Fe not in oxides in 50 mass % or more.

(2) A hot dip galvanized steel sheet comprising a steel sheet which contains, by mass %,
C: 0.05% to 0.50%,
Si: 0.1% to 3.0%,
Mn: 0.5% to 5.0%,
P: 0.001% to 0.5%,
S: 0.001% to 0.03%,
Al: 0.005% to 1.0%,
one or more elements of Ti, Nb, Cr, Mo, Ni, Cu, Zr, V, W, B, Ca, and REM in respectively 0.0001% to 1%, and a balance of Fe and unavoidable impurities, having a hot dip galvanized layer A on the surface of the steel sheet, characterized by having the following B layer right below the steel sheet surface and inside the steel sheet:
B layer: Layer which has thickness of 0.001 μm to 0.5 μm, which contains, based on mass of the B layer, one or more of Fe, Si, Mn, P, S, Al, Ti, Nb, Cr, Mo, Ni, Cu, Zr, V, W, B, Ca, and REM oxides in a total of less than 50 mass %, which contains C, Si, Mn, P, S, Al, Ti, Nb, Cr, Mo, Ni, Cu, Zr, V, W, B, Ca, and REM not in oxides in:
C: less than 0.05 mass %,
Si: less than 0.1 mass %,
Mn: less than 0.5 mass %,
P: less than 0.001 mass %,
S: less than 0.001 mass %,
Al: less than 0.005 mass %,
one or more of Ti, Nb, Cr, Mo, Ni, Cu, Zr, V, W, B, Ca, and REM in respectively less than 0.0001 mass %, and
which contains Fe not in oxides in 50 mass % or more.

(3) The hot dip galvanized steel sheet according to (1) or (2), wherein the hot dip galvanized layer A has a thickness of 2 μm to 100 μm.

(4) A method of production of a hot dip galvanized steel sheet comprising casting, hot rolling, pickling, and cold rolling a steel containing the components described in (1) or (2) to obtain a cold rolled steel sheet, and annealing the cold rolled steel sheet and hot dip galvanizing the annealed steel sheet in a continuous hot dip galvanization facility which is provided with a heating furnace and a soaking furnace,
wherein,
in the heating furnace and the soaking furnace which perform the annealing treatment, the temperature of the cold rolled steel sheet in the furnaces being 500° C. to 950° C. in temperature range and running the cold rolled steel sheet under the following conditions:
Heating furnace conditions: Using an all radiant tube type of heating furnace, heating the cold rolled steel sheet in the above temperature range for 10 seconds to 1000 seconds, wherein the $\log(PH_2O/PH_2)$ of the value of the steam partial pressure ($PH_2O$) in the heating furnace divided by the hydrogen partial pressure ($PH_2$) is −2 to 2, and wherein the heating furnace has an atmosphere comprised of hydrogen in a hydrogen concentration of 1 vol % to 30 vol %, steam, and nitrogen;
Soaking furnace conditions: After the heating furnace, in the soaking furnace, soaking the cold rolled steel sheet in the above temperature range for 10 seconds to 1000 seconds, wherein the $\log(PH_2O/PH_2)$ of the value of the steam partial pressure ($PH_2O$) in the soaking furnace divided by the hydrogen partial pressure ($PH_2$) is −5 to less than −2, and wherein the soaking furnace has an atmosphere comprised of hydrogen in a hydrogen concentration of 1 vol % to 30 vol %, steam, and nitrogen.

Advantageous Effects of Invention

According to the method of production of the present invention, a hot dip galvanized steel sheet which is excellent in plating wettability and plating adhesion is obtained using a steel sheet which contains the easily oxidizable elements Si and Mn as a base material.

DESCRIPTION OF EMBODIMENTS

Figure 1:
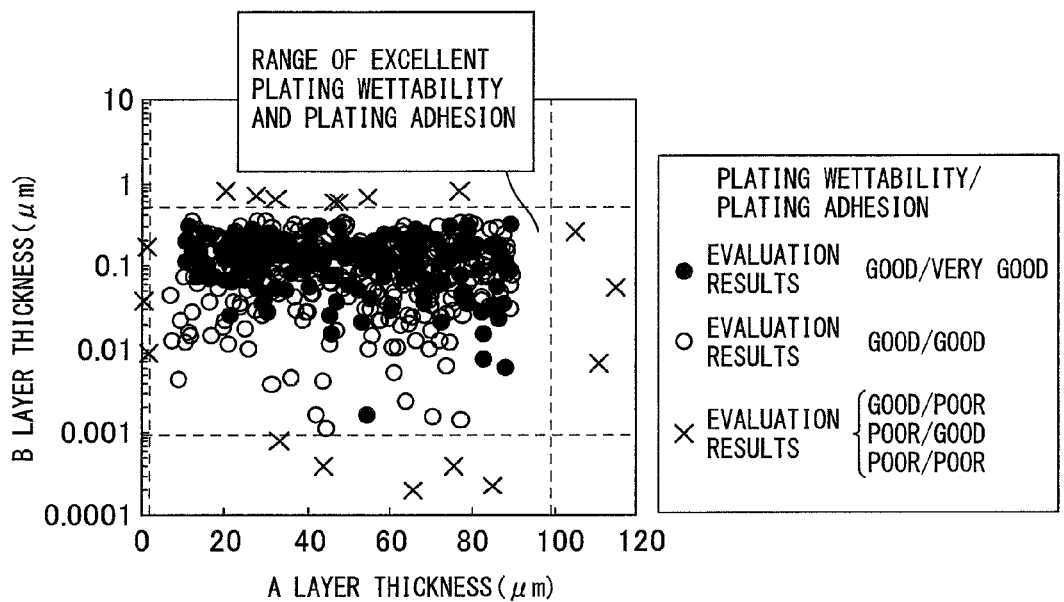
FIG. 1 shows the results of the plating wettability/plating adhesion determined by the relationship of the thickness of the A layer and thickness of the B layer obtained from the results of the later explained Examples A1 to A72, B1 to B72, C1 to C72, D1 to D72, E1 to E72, F1 to F72, and G1 to G72 and Comparative Examples H1 to H12 and H29 to H34.

Below, the present invention will be explained in detail. First, the assumed components of the steel sheet which is provided with the hot dip galvanized layer of the present invention which are as follows. Further, below, the % which is explained in the Description shall be mass % unless otherwise indicated.

C: 0.05% to 0.50%

C is an element which stabilizes the austenite phase and is an element which is necessary for raising the strength of the steel sheet. If the amount of C is less than 0.05%, the steel sheet becomes insufficient in strength, while if over 0.50%, the workability falls. For this reason, the amount of C is 0.05% to 0.5%, preferably 0.10% to 0.40%.

Si: 0.1% to 3.0%

Si causes the solid solution C in the ferrite phase to concentrate in the austenite phase and raises the temper softening resistance of the steel sheet to thereby improve the strength of the steel sheet. If the amount of Si is less than 0.1%, the steel sheet becomes insufficient in strength, while if over 3.0%, it falls in workability. Further, the plating wettability and plating adhesion are not sufficiently improved. For this reason, the amount of Si is 0.1% to 3.0%, preferably 0.5% to 2.0%.

Mn: 0.5% to 5.0%

Mn is an element which is useful for raising the hardenability and raising the strength of the steel sheet. If the amount of Mn is less than 0.5%, the steel sheet becomes insufficient in strength, while if over 5.0%, it falls in workability. Further, the plating wettability and plating adhesion are not sufficiently improved. For this reason, the amount of Mn is 0.5% to 5.0%, preferably 1.0% to less than 3.0%.

P: 0.001% to 0.5%

P contributes to improvement of the strength, so can include P in accordance with the required strength level. However, if the content of P is contained over 0.5%, grain boundary segregation causes the material quality to deteriorate, so the upper limit is made 0.5%. On the other hand, to make the content of P less than 0.001%, a tremendous increase in cost is required at the steelmaking stage, so 0.001% is made the lower limit.

S: 0.001% to 0.03%

S is an unavoidably included impurity element. After cold rolling, sheet shaped inclusions MnS are formed whereby the workability drops, so the amount of S is preferably as small as possible, but excessive reduction is accompanied with an increase in the desulfurization costs of the steelmaking process. Therefore, the amount of S is 0.001% to 0.03%.

Al: 0.005% to 1.0%

Al has a high affinity with the N in the steel sheet and has the effect of fixing the solid solution N as precipitates to thereby improve the workability. However, excessive addition of Al conversely causes the workability to deteriorate. For this reason, the amount of Al is 0.005% to 1.0%.

The balance other than the above composition of components is Fe and unavoidable impurities. In the present invention, for the purpose of securing the strength, improving the workability, etc., in accordance with need, one or more elements which are selected from Ti, Nb, Cr, Mo, Ni, Cu, Zr, V, W, B, Ca, and REM may be suitably included in the steel sheet in respectively 0.0001% to 1%.

The method of production of steel sheet is not particularly limited from casting to cold rolling. The steel is processed by general casting, hot rolling, pickling, and cold rolling to obtain cold rolled steel sheet. The steel sheet has a thickness of preferably 0.1 mm to 3 mm.

Next, factors which are important in the present invention, that is, the hot dip galvanized layer of the steel sheet (A layer) and the layer which is formed in the steel sheet (B layer), will be explained.

The hot dip galvanized steel sheet of the present invention is has the A layer on the steel sheet surface and the B layer right under the steel sheet surface. The A layer is a hot dip galvanized layer which is formed on the steel sheet surface to secure corrosion prevention. The B layer is a layer mainly comprised of Fe which is suppressed in contents of oxides and elements of C, Si, Mn, etc. It is formed in the steel sheet right under the base material steel sheet surface to thereby improve the plating wettability and plating adhesion.

The A layer constituted by the hot dip galvanized layer may have elements other than zinc added in the layer so long as 50% or more of the constituent components is zinc. Further, a hot dip galvannealed layer which becomes an Fe—Zn alloy by heating after hot dip galvanization treatment is also possible. In the case of a hot dip galvannealed layer, if the content of Fe in the Fe—Zn alloy is over 20 mass %, the plating adhesion falls, so the content is preferably 20 mass % or less.

The Fe content in the Fe—Zn alloy of the hot dip galvannealed layer referred to here is found by cutting out a piece of a predetermined area from the hot dip galvanized steel sheet, dipping it in hydrochloric acid to dissolve only the plating layer, then analyzing this solution by an ICP (emission spectrophotometric analyzer) to measure the amount of Fe and amount of Zn and thereby calculate the ratio of Fe.

The thickness of the A layer, as shown in FIG. 1, is preferably 2 μm to 100 μm. If less than 2 μm, the corrosion prevention ability is insufficient. In addition, it becomes difficult to make the plating uniformly deposit on the base material steel sheet and nonplating defects are formed, that is, a problem arises relating to plating wettability. If over 100 μm, the effect of improvement of the corrosion resistance by the plating layer becomes saturated, so this is not economical. Further, the residual stress inside the plating layer increases, so the plating adhesion falls. For this reason, the thickness of the A layer is preferably 2 μm to 100 μm. Regarding the method of measurement of the thickness of the A layer which is mentioned here, there are various methods, but for example the microscopic cross-section test method described in JIS H 8501 may be mentioned. This is a method of burying a cross-section of a sample in a resin, polishing it, then in accordance with need etching it by a corrosive solution and analyzing the polished surface by an optical microscope or scan type electron microscope (SEM), electron probe microanalyzer (EPMA), etc. and finding the thickness. In the present invention, the sample is buried in Technovit 4002 (made by Maruto Instrument Co., Ltd.) and polished in order by #240, #320, #400, #600, #800, and #1000 polishing paper (JIS R 6001), then he polished surface is analyzed by EPMA from the surface of the plated steel sheet by line analysis, the thickness at which Zn is no longer detected is found at positions of any 10 locations separated from each other by 1 mm or more, the found values are averaged, and the obtained value is deemed the thickness of the A layer.

In the case of a hot dip galvannealed layer, due to the B layer inside the steel sheet right under the steel sheet surface of the base material, the content of the oxides of the steel sheet of the base material is reduced whereby the reactivity between the Fe and plating is promoted and the plating wettability and the plating adhesion are further improved, so this is preferable.

The B layer which characterizes the present invention is a layer which is formed by raising the oxygen potential of the atmosphere in a radiant tube type of heating furnace and lowering the oxygen potential of the atmosphere to reduce the Fe in a soaking furnace. In the heating furnace, Si and Mn internally oxidize and C oxidizes and disassociates at the steel sheet surface as a gas, so at a certain thickness under the steel sheet surface, the concentration of Si, Mn, and C not in oxides right under the steel sheet surface of the base material is reduced, but the thickness follows the heat dispersion of Si and Mn and C, so becomes greater than the thickness of the internal oxidation layer. If just raising the oxygen potential of the atmosphere, Fe oxides would be formed at the steel sheet surface of the base material and increase. Also, for example, in internal oxidation of Si, internal oxides of the composite oxide with Fe called "fayalite" ($Fe_2SiO_4$) would be formed and increase. However, with the method of the present invention, the Fe is reduced in the soaking furnace, so Fe oxides can be suppressed right under the steel sheet surface of the base material. Therefore, the B layer according to the present invention is a different layer from the "internal oxidation layer" which is described in the prior art literature etc.

The B layer in the steel sheet right under the base material steel sheet surface, as shown in FIG. 1, having a thickness of 0.001 μm to 0.5 μm is important for improving the plating wettability and plating layer adhesion. If less than 0.001 μm, the amount of the B layer falls, so the plating wettability and adhesion are not sufficiently improved, while if over 0.5 μm, the strength in the B layer is not secured and cohesive failure occurs, so the plating adhesion falls. More preferably, the B layer has a thickness of 0.01 μm to 0.4 μm. The thickness of the B layer referred to here was found as follows: the surface of the hot dip galvanized steel sheet was sputtered while using an X-ray photoelectron spectroscope (XPS) for analyzing the composition in the depth direction. The depth at which Zn could no longer be detected was designated as D1. The amounts of C, Si, Mn, P, S, and Al in the B layer were respectively C: less than 0.05 mass %, Si: less than 0.1 mass %, Mn: less than 0.5 mass %, P: less than 0.001 mass %, S: less than 0.001 mass %, and Al: less than 0.005 mass %, so the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, and the depth at which Al is detected in 0.005% or more are found and the depth of the smallest value among these values is designated as D2. The thickness of the B layer is made the average value obtained by finding (D2−D1) for N=3. However, the percentage which is shown here is based on the display of the XPS system. The measurement method is not limited. In addition to X-ray photoelectron spectroscopy (XPS), glow discharge spectrometry (GDS), secondary ion mass spectrometry (SIMS), time-of-flight type secondary ion mass spectrometry (TOF-SIMS), TEM, or another analysis means may be used.

Figure 2:
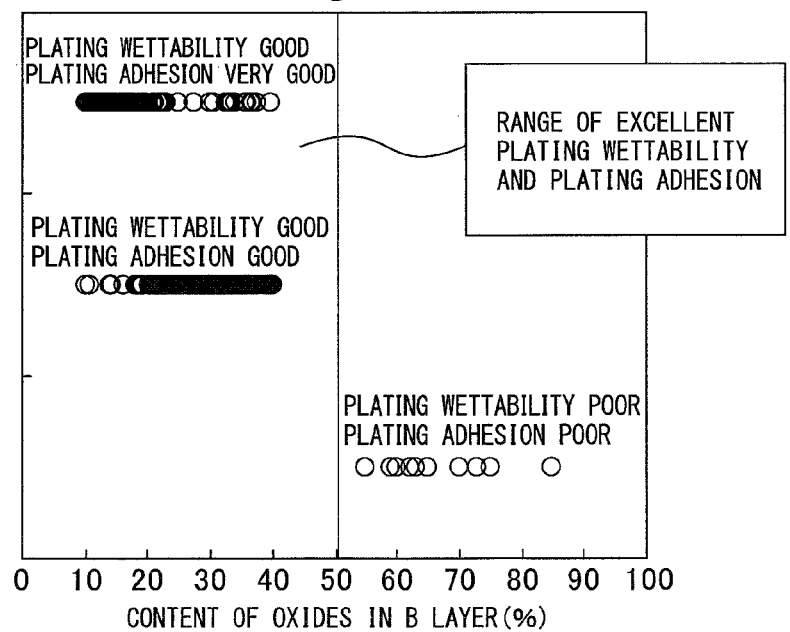
FIG. 2 shows the relationship of the content of oxides of the B layer and the plating wettability/adhesion obtained from the results of the later explained Examples A1 to A72, B1 to B72, C1 to C72, D1 to D72, E1 to E72, F1 to F72, and G1 to G72 and Comparative Examples H1 to H12.

By recrystallizing and annealing the steel sheet which is hot dip galvanized of the present invention, one or more types of oxides of Fe, Si, Mn, P, S, and Al are formed right under the steel sheet surface. As shown in FIG. 2, if the total of the contents of these in the B layer of the hot dip galvanized steel sheet of the present invention becomes 50% or more, the plating wettability and the plating adhesion fall. Therefore, the total of these oxides in the B layer is less than 50%, preferably less than 25%.

The one or more types of oxides of Fe, Si, Mn, P, S, and Al referred to here is not particularly limited to the following, but, as specific examples, FeO, $Fe_2O_3$, $Fe_3O_4$, MnO, $MnO_2$, $Mn_2O_3$, $Mn_3O_4$, $SiO_2$, $P_2O_5$, $Al_2O_3$, and $SO_2$ as single oxides and respective nonstoichiometric compositions of single oxides or $FeSiO_3$, $Fe_2SiO_4$, $MnSiO_3$, $Mn_2SiO_4$, $AlMnO_3$, $Fe_2PO_3$, and $Mn_2PO_3$ as composite oxides and respective nonstoichiometric compositions of composite oxides may be mentioned. The total of the rates of content is found, in the same way as the above-mentioned measurement of thickness of the B layer, by sputtering the surface of the hot dip galvanized steel sheet while analyzing the composition by an X-ray photoelectron spectroscope (XPS) in the depth direction, totaling the average values of the concentrations by mass of cations of Fe, Si, Mn, P, S, and Al which are measured from the depth at which Zn is no longer detected (D1) to the depth of the smallest value (D2) among the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, and the depth at which Al is detected in 0.005% or more, further adding the average value of the concentration by mass of anions of 0, and averaging the result for N=3 measurement results. The measurement method is not particularly limited. In accordance with need, glow discharge spectrometry (GDS), secondary ion mass spectrometry (SIMS), time-of-flight type secondary ion mass spectrometry (TOF-SIMS), TEM, or another analysis means may be used.

Furthermore, in the B layer, the contents of C, Si, Mn, P, S, and Al not in oxides being suppressed is also important for improving the plating wettability and plating adhesion. This is because if decreasing the C, Si, Mn, P, S, and Al which are added to the steel sheet of the base material right under the steel sheet surface to raise the ratio of Fe, the reactivity of the steel sheet and plating rises, the plating becomes easily wetted, and the adhesion between plating and base material rises. In addition, this is because, regarding the C, Si, Mn, P, S, and Al not in oxides present at the steel sheet surface of the base material, if the oxides which are present on the surface of the bath contact the steel sheet of the base material when dipping the steel sheet in the plating bath and treating the plating layer, the Si, Mn, P, S, and Al oxidize and reduce the reactivity of the steel sheet and plating, so decreasing the C, Si, Mn, P, S, and Al not in oxides is effective for improvement of the plating wettability and the plating adhesion. A drop in the plating wettability and adhesion is recognized with a content of C of the B layer of 0.05% or more or a content of Si of 0.1% or more, a content of Mn of 0.5% or more, a content of P of 0.001% or more, a content of S of 0.001% or more, and a content of Al of 0.005% or more, so preferably the content of C of the B layer is made less than 0.05%, the content of Si is made less than 0.1%, the content of Mn is made less than 0.5%, the content of P is made less than 0.001%, the content of S is made less than 0.001%, and the content of Al is made less than 0.005%. The contents of C, Si, Mn, P, S, and Al referred to here are found by sputtering the surface of the hot dip galvanized steel sheet while analyzing the composition by XPS in the depth direction and averaging, by the N=3 results of measurement, the average values of the concentrations by mass of C, Si, Mn, P, S, and Al which are measured from the depth at which Zn is no longer detected (D1) to the depth of the smallest value (D2) among the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, and the depth at which Al is detected in 0.005% or more. The measurement method is not particularly limited. In accordance with need, glow discharge spectrometry (GDS), secondary ion mass spectrometry (SIMS), time-of-flight type secondary ion mass spectrometry (TOF-SIMS), TEM, or other analysis means may be used.

Figure 3:
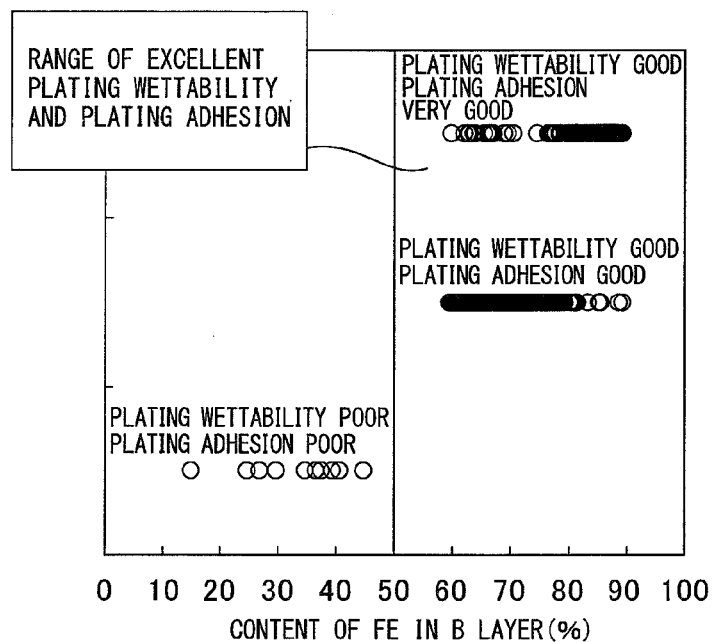
FIG. 3 shows the relationship of the Fe content of the B layer and the plating wettability/adhesion obtained from the results of the later explained Examples A1 to A72, B1 to B72, C1 to C72, D1 to D72, E1 to E72, F1 to F72, and G1 to G72 and Comparative Examples H1 to H12.

If the content of Fe not in oxides in the B layer, as shown in FIG. 3, is less than 50%, the wettability and adhesion with the A layer and the adhesion with the base material steel sheet fall. As a result, the plating wettability and the plating adhesion are made to fall, so the content of Fe not in oxides is 50% or more, preferably 70% or more. The content of Fe referred to here is found by sputtering the surface of the hot dip galvanized steel sheet while analyzing the composition by XPS in the depth direction and averaging, for N=3 measurement results, the average value of the concentration by mass of Fe which is measured from the depth at which Zn is no longer detected (D1) to the depth of the smallest value (D2) among the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, and the depth at which Al is detected in 0.005% or more. The measurement method is not particularly limited. In accordance with need, glow discharge spectrometry (GDS), secondary ion mass spectrometry (SIMS), time-of-flight type secondary ion mass spectrometry (TOF-SIMS), TEM, or other analysis means may be used.

A more preferable embodiment of the B layer will be explained next. This embodiment has as its object to secure the strength, improve the workability, etc. and is the case where one or more elements which are selected from Ti, Nb, Cr, Mo, Ni, Cu, Zr, V, W, B, Ca, and REM are contained in the steel sheet in respective amounts of 0.0001% to 1% as additional components.

The B layer between the hot dip galvanized layer constituted by the A layer and the base material steel sheet, as shown in FIG. 1, preferably has a thickness of 0.001 μm to 0.5 μm as explained above. More preferably, the B layer similarly has a thickness of 0.01 μm to 0.4 μm. The preferable thickness of the B layer referred to here is found as follows: The surface of the hot dip galvanized steel sheet is sputtered while XPS is used to analyze the composition in the depth direction, the depth at which Zn is no longer detected is designated as D1, the depth where C is detected in 0.05% or more or the depth at which Si is detected in 0.1% or more, the depth at which Mn is detected in 0.5% or more, the depth at which P is detected in 0.001% or more, the depth at which S is detected in 0.001% or more, the depth at which Al is detected in 0.005% or more, and the depth at which Ti, Nb, Cr, Mo, Ni, Cu, Zr, V, W, B, Ca, and REM are detected in 0.0001% or more are found, and the depth of the smallest value among these values is designated as D2. The thickness of the B layer is made the average value of (D2−D1) found for N=3. The measurement method is not particularly limited. In accordance with need, glow discharge spectrometry (GDS), secondary ion mass spectrometry (SIMS), time-of-flight type secondary ion mass spectrometry (TOF-SIMS), TEM, or other analysis means may be used.

Furthermore, by recrystallization and annealing of the steel sheet which is hot dip galvanized in the present invention, oxides of one or more of Fe, Si, Mn, Al, P, S, Ti, Nb, Cr, Mo, Ni, Cu, Zr, V, W, B, Ca, and REM are formed right under the steel sheet surface. As shown in FIG. 2, if the total of the rates of content in the By layer after hot dip galvanization of the present invention becomes 50% or more, the plating wettability and the plating adhesion fall, so the total is less than 50%, preferably less than 25%.

The oxides of the one or more elements which are selected from the Fe, Si, Mn, P, S, Al, Ti, Nb, Cr, Mo, Ni, Cu, Zr, V, W, B, Ca, and REM referred to here are not particularly limited to the following, but as specific examples, FeO, $Fe_2O_3$, $Fe_3O_4$, MnO, $MnO_2$, $Mn_2O_3$, $Mn_3O_4$, $SiO_2$, $P_2O_5$, $Al_2O_3$, $SO_2$, $TiO_2$, NbO, $Cr_2O_3$, $MoO_2$ NiO, CuO, $ZrO_2$, $V_2O_5$, $WO_2$, $B_2O_5$, and CaO as single oxides and respective nonstoichiometric compositions of single oxides or $FeSiO_3$, $Fe_2SiO_4$, $MnSIO_3$, $Mn_2SiO_4$, $AlMnO_3$, $Fe_2PO_3$, and $Mn_2PO_3$ as composite oxides and respective nonstoichiometric compositions of composite oxides may be mentioned. The total of the rates of content is found, in the same way as the above-mentioned measurement of thickness of the B layer, by sputtering the surface of the hot dip galvanized steel sheet while using an X-ray photoelectron spectroscope (XPS) to analyze the composition in the depth direction, totaling the average values of the respective concentrations of mass of cations of Fe, Si, Mn, Al, P, S, Ti, Nb, Cr, Mo, Ni, Cu, Zr, V, W, B, Ca, and REM which are measured from the depth at which Zn is no longer detected (D1) to the depth of the smallest value (D2) among the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, the depth at which Al is detected in 0.005% or more, and the depth at which Ti, Nb, Cr, Mo, Ni, Cu, Zr, V, W, B, Ca, REM are detected in 0.0001% or more, further adding the average value of the concentration of mass of 0 ions, and averaging the result for N=3 measurement results. The method of measurement is not particularly limited, but in accordance with need, glow discharge spectrometry (GDS), secondary ion mass spectrometry (SIMS), time-of-flight type secondary ion mass spectrometry (TOF-SIMS), TEM, or other analysis means may be used.

Furthermore, in the B layer, suppressing the contents of C, Si, Mn, P, S, Al, Ti, Nb, Cr, Mo, Ni, Cu, Zr, V, W, B, Ca, and REM not in oxides is also important for improving the plating wettability and the plating adhesion. This is because if reducing the C, Si, Mn, P, S, Al, Ti, Nb, Cr, Mo, Ni, Cu, Zr, V, W, B, Ca, and REM which are added to the steel sheet of the base material right under the steel sheet surface and raising the ratio of Fe, the reactivity of the steel sheet and the plating rises and the plating becomes easily wetted and the adhesion between the plating and the base material rises. In addition, this is because, regarding the C, Si, Mn, P, S, Al, Ti, Nb, Cr, Mo, Ni, Cu, Zr, V, W, B, Ca, and REM not in oxides present at the steel sheet surface of the base material, if the oxides which are present on the surface of the bath contact the steel sheet of the base material when dipping the steel sheet in the plating bath and treating the plating layer, the Si, Mn, P, S, Al, Ti, Nb, Cr, Mo, Ni, Cu, Zr, V, W, B, Ca, and REM oxidize and reduce the reactivity of the steel sheet and plating, so decreasing the C, Si, Mn, P, S, Al, Ti, Nb, Cr, Mo, Ni, Cu, Zr, V, W, B, Ca, and REM not in oxides is effective for improvement of the plating wettability and the plating adhesion. A drop in the plating wettability and adhesion is recognized when the B layer has a C content of 0.05% or more or Si content of 0.1% or more, Mn content of 0.5% or more, P content of 0.001% or more, S content of 0.001% or more, Al content of 0.005% or more, Ti, Nb, Cr, Mo, Ni, Cu, Zr, V, W, B, Ca, and REM content of 0.0001% or more, so the B layer preferably has a C content of less than 0.05%, Si content of less than 0.1%, Mn content of less than 0.5%, P content of less than 0.001%, S content of less than 0.001%, Al content of less than 0.005%, Ti, Nb, Cr, Mo, Ni, Cu, Zr, V, W, B, Ca, and REM content of less than 0.0001%. The contents of the C, Si, Mn, P, S, Al, Ti, Nb, Cr, Mo, Ni, Cu, Zr, V, W, B, Ca, and REM referred to here are found by sputtering the surface of the hot dip galvanized steel sheet while analyzing the composition by XPS in the depth direction and averaging, for N=3 measurement results, the average values of the respective concentrations of mass of C, Si, Mn, P, S, Al, Ti, Nb, Cr, Mo, Ni, Cu, Zr, V, W, B, Ca, and REM which are measured from the depth at which Zn is no longer detected to the depth of the smallest value (D2) among the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, the depth at which Al is detected in 0.005% or more, and the depth at which Ti, Nb, Cr, Mo, Ni, Cu, Zr, V, W, B, Ca, and REM are detected in 0.0001% or more. The method of measurement is not particularly limited. In accordance with need, glow discharge spectrometry (GDS), secondary ion mass spectrometry (SIMS), time-of-flight type secondary ion mass spectrometry (TOF-SIMS), TEM, or other analysis means may be used.

If the content of Fe not in oxides at the B layer, in the same way as above, is less than 50%, the wettability and adhesion with the A layer and the adhesion with the base material steel sheet falls and as a result the plating wettability and plating adhesion are decreased, so the content of Fe not in oxides is 50% or more, preferably 70% or more. The content of Fe referred to here is found by sputtering the surface of the hot dip galvanized steel sheet while using XPS to analyze the composition in the depth direction and averaging, for N=3 measurement results, the average value of the concentration by mass of Fe which is measured from the depth at which Zn is no longer detected (D1) to the depth of the smallest value (D2) among the depth at which C is detected in 0.05% or more or the depth at which Si is detected in 0.1% or more, the depth at which Mn is detected in 0.5% or more, the depth at which P is detected in 0.001% or more, the depth at which S is detected in 0.001% or more, the depth at which Al is detected in 0.005% or more, and the depth at which Ti, Nb, Cr, Mo, Ni, Cu, Zr, V, W, B, Ca, and REM are detected in 0.0001% or more. In particular, the method of measurement is not limited. In accordance with need, glow discharge spectrometry (GDS), secondary ion mass spectrometry (SIMS), time-of-flight type secondary ion mass spectrometry (TOF-SIMS), TEM, or other analysis means may be used.

Next, a method of production of hot dip galvanized steel sheet which is excellent in plating wettability and plating adhesion of the present invention will be explained.

As the method of production, one which works steel of predetermined components into cold rolled steel sheet using an ordinarily used method, then treats it to anneal and hot dip galvanize it in a continuous hot dip galvanization facility which is provided with a heating furnace and soaking furnace and is characterized by, in the heating furnace and soaking furnace which perform the annealing treatment, the temperature of the cold rolled steel sheet in the furnaces being 500° C. to 950° C. in temperature range and running the cold rolled steel sheet under the following conditions is important for producing the hot dip galvanized steel sheet of the present invention:

Heating furnace conditions: Using an all radiant tube type of heating furnace, heating the cold rolled steel sheet in the above temperature range for 10 seconds to 1000 seconds during which making the $\log(PH_2O/PH_2)$ of the value of the steam partial pressure ($PH_2O$) in the heating furnace divided by the hydrogen partial pressure ($PH_2$) =2 to 2, and the heating furnace having an atmosphere comprised of hydrogen in a hydrogen concentration of 1 vol % to 30 vol %, steam, and nitrogen;

Soaking furnace conditions: After the heating furnace, in the soaking furnace, soaking the cold rolled steel sheet in the above temperature range for 10 seconds to 1000 seconds during which making the $\log(PH_20/PH_2)$ of the value of the steam partial pressure ($PH_2O$) in the soaking furnace divided by the hydrogen partial pressure ($PH_2$) =5 to less than =2, and the soaking furnace having an atmosphere comprised of hydrogen in a hydrogen concentration of 1 vol % to 30 vol %, steam, and nitrogen.

In the method of production of the present invention, a continuous hot dip galvanization facility which is provided with an all radiant tube type heating furnace is used to perform treatment for annealing and treatment for giving a plating layer. An all radiant tube type heating furnace is resistant to roll pickup and is good in productivity of the annealing treatment.

Regarding the atmospheric conditions, the temperature of the running cold rolled steel sheet is preferably 500° C. to 950° C. in the production of hot dip galvanized steel sheet of the present invention. If less than 500° C., the Si, Mn, and C which are contained right under the steel sheet surface remain without sufficiently oxidizing, so the plating wettability and adhesion fall. If over 950° C., the economy of the production falls and the dispersion of Si, Mn, P, S, Al, Ti, Nb, Cr, Mo, Ni, Cu, Zr, V, W, B, Ca, and REM in the steel becomes faster. Since the steel sheet surface is formed with oxides, the plating wettability and adhesion fall. More preferably, the temperature is 600° C. to 850° C.

In the above temperature range of the heating furnace, the oxygen potential $\log(PH_2O/PH_2)$ is raised to make the C, Si, Mn, P, S, and Al which are contained right under the steel sheet surface oxidize. One or more elements which are selected from Si, Mn, P, S, Al, Ti, Nb, Cr, Mo, Ni, Cu, Zr, V, W, B, Ca, and REM form internal oxides right under the steel sheet surface. By C being released from the steel sheet, the steel sheet surface is decarburized. The internal oxides of the one or more elements which are selected from Si, Mn, P, S, Al, Ti, Nb, Cr, Mo, Ni, Cu, Zr, V, W, B, Ca, and REM referred to here are not particularly limited, but, as specific examples, $FeO$, $Fe_2O_3$, $Fe_3O_4$, $MnO$, $MnO_2$, $Mn_2O_3$, $Mn_3O_4$, $SiO_2$, $P_2O_5$, $Al_2O_3$, $SO_2$, $TiO_2$, $NbO$, $Cr_2O_3$, $MoO_2$, $NiO$, $CuO$, $ZrO_2$, $V_2O_5$, $WO_2$, $B_2O_5$, and $CaO$ as single oxides and respective nonstoichiometric compositions of single oxides or $FeSiO_3$, $Fe_2SiO_4$, $MnSiO_3$, $Mn_2SiO_4$, $AlMnO_3$, $Fe_2PO_3$, and $Mn_2PO_3$ as composite oxides and respective nonstoichiometric compositions of composite oxides which are internally oxidized may be mentioned.

Figure 4:
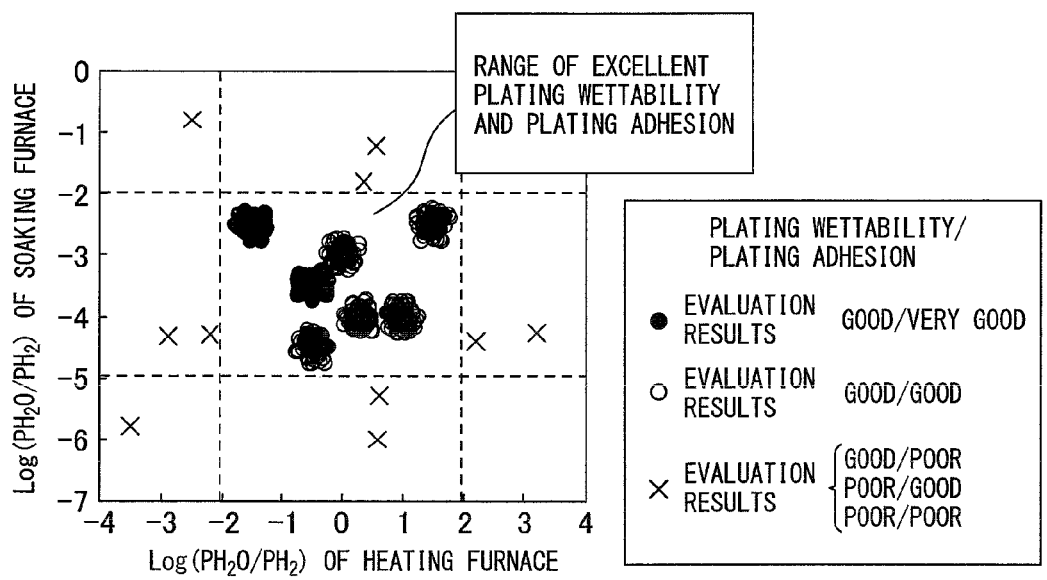
FIG. 4 shows the results of the plating wettability/plating adhesion which are determined by the relationship between the oxygen potential $\log(PH_2O/PH_2)$ of the heating furnace and the oxygen potential $\log(PH_2O/PH_2)$ of the soaking furnace obtained from the results of the later explained Examples A1 to A72, B1 to B72, C1 to C72, D1 to D72, E1 to E72, F1 to F72, and G1 to G72 and Comparative Examples H1 to H12.

With respect to the atmosphere in the heating furnace in the sheet temperature range, as shown in FIG. 4, a log ($PH_2O/PH_2$) in a nitrogen atmosphere which contains water and hydrogen is preferably −2 to 2 in the production of hot dip galvanized steel sheet of the present invention. If the $\log(PH_2O/PH_2)$ is less than −2, the oxidation reaction of C does not sufficiently proceed and, further, external oxides of one or more elements which are selected from Si, Mn, P, S, Al, Ti, Nb, Cr, Mo, Ni, Cu, Zr, V, W, B, Ca, and REM are formed at the steel sheet surface, so the plating wettability and adhesion fall. If $\log(PH_2O/PH_2)$ is over 2, Fe oxides are excessively formed at the steel sheet surface, so the plating wettability and adhesion fall. In addition, the internal oxidation of Si, Mn, P, S, Al, Ti, Nb, Cr, Mo, Ni, Cu, Zr, V, W, B, Ca, and REM is performed excessively right under the steel sheet surface whereby the internal stress of the steel sheet due to the internal oxides increases and the plating adhesion falls. More preferably, the log is −2 to 0.5. The external oxides of the one or more elements which are selected from Si, Mn, P, S, Al, Ti, Nb, Cr, Mo, Ni, Cu, Zr, V, W, B, Ca, and REM referred to here are not particularly limited to the following, but, as specific examples, FeO, $Fe_2O_3$, $Fe_3O_4$, MnO, $MnO_2$, $Mn_2O_3$, $Mn_3O_4$, $SiO_2$, $P_2O_5$, $Al_2O_3$, $SO_2$, $TiO_2$, NbO, $Cr_2O_3$, $MoO_2$, NiO, CuO, $ZrO_2$, $V_2O_5$, $WO_2$, $B_2O_5$, and CaO as single oxides and respective nonstoichiometric compositions of single oxides or $FeSiO_3$, $Fe_2SiO_4$, $MnSiO_3$, $Mn_2SiO_4$, $AlMnO_3$, $Fe_2PO_3$, and $Mn_2PO_3$ as composite oxides and respective nonstoichiometric compositions of composite oxides which are externally oxidized may be mentioned.

Figure 5:
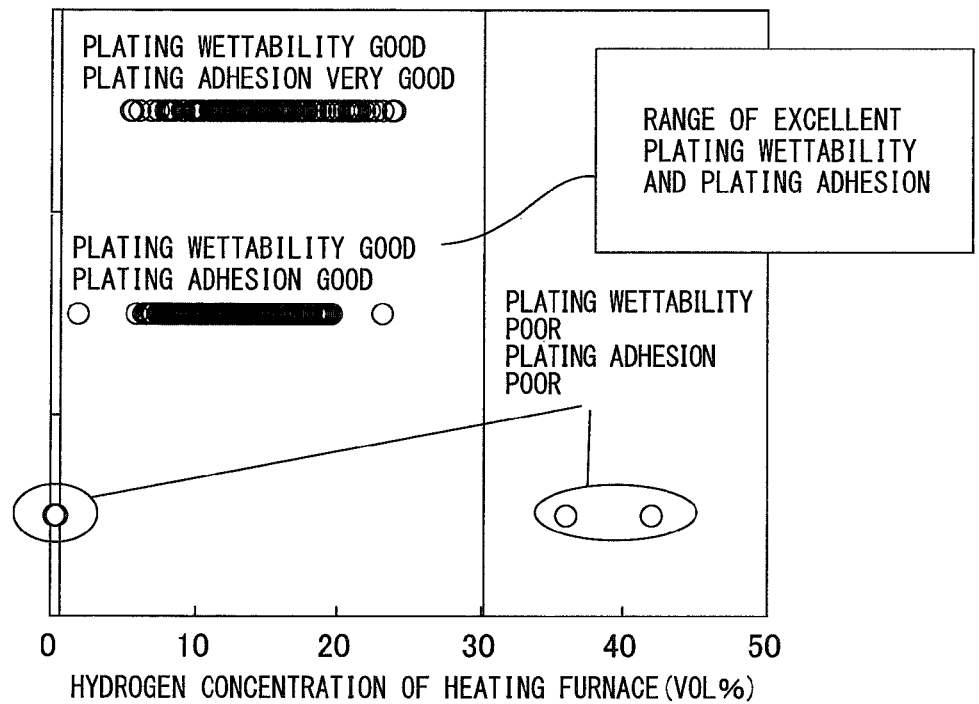
FIG. 5 shows the relationship between the hydrogen concentration of the heating furnace and plating wettability/plating adhesion obtained from the results of the later explained Examples A1 to A72, B1 to B72, C1 to C72, D1 to D72, E1 to E72, F1 to F72, and G1 to G72 and Comparative Examples H25 to H28.

Further, in the atmosphere in the heating furnace in the sheet temperature range, the hydrogen concentration, as shown in FIG. 5, is 1 vol % to 30 vol %. If the hydrogen concentration is less than 1 vol %, the ratio of nitrogen increases and a nitridation reaction occurs at the steel sheet surface, so the plating wettability or plating adhesion falls, while if over 30 vol %, the annealing treatment becomes inferior economically and, in addition, hydrogen forms a solid solution inside of the steel sheet whereby hydrogen embrittlement occurs and the plating adhesion falls.

Further, the heating time in the heating furnace in the sheet temperature range is preferably 10 seconds to 1000 seconds from the viewpoint of production of the hot dip galvanized steel sheet of the present invention. If less than 10 seconds, the amounts of oxidation of Si, Mn, and C are small, so the plating wettability and adhesion fall, while if over 1000 seconds, the productivity of the annealing treatment fall and the internal oxidation proceeds excessively right under the steel sheet surface, so internal stress occurs due to internal oxides and the plating adhesion falls. The time in the heating furnace referred to here is the time by which the cold rolled steel sheet runs in the temperature range of a sheet temperature of 500° C. to 950° C.

The speed of temperature rise in the heating furnace is not particularly limited, but if too slow, the productivity deteriorates. If too fast, the cost of the heating facility increases, so 0.5° C./s to 20° C./s is preferable.

The initial sheet temperature at the time of entry into the heating furnace is not particularly limited, but if too high, the steel sheet oxidizes, so the plating wettability and plating adhesion fall, while if too low, cost is incurred for cooling, so 0° C. to 200° C. is preferable.

After the heating furnace, next in the temperature range of the soaking furnace, by lowering the oxygen potential log $(PH_2O/PH_2)$, the Fe-based oxides of the steel sheet surface, specifically, FeO, $Fe_2O_3$, or $Fe_3O_4$ or the composite oxides of Fe and Si and Fe and Cr of $Fe_2SiO_4$, $FeSiO_3$, and $FeCr_2O_4$ are reduced. That is, before recrystallization and annealing, the steel sheet surface is formed with compounds which naturally oxidize in the atmosphere such as the Fe oxides of FeO, $Fe_2O_3$, and $Fe_3O_4$. Further, in the heating step, FeO, $Fe_2O_3$, and $Fe_3O_4$ increase and, in addition, the easily oxidizable elements Si and Cr are oxidized, so $Fe_2SiO_4$, $FeSiO_3$, and $FeCr_2O_4$ are formed. Therefore, before the soaking step, the steel sheet surface has compounds which obstruct the plating wettability and plating adhesion such as FeO, $Fe_2O_3$, $Fe_3O_4$, $FeSiO_3$, $Fe_2SiO_4$, and $FeCr_2O_4$. By reducing these oxides in the soaking step, the plating wettability and plating adhesion are improved.

The atmosphere in the soaking furnace in the sheet temperature range, as shown in FIG. 4, being a nitrogen atmosphere containing water and hydrogen in which the $\log(PH_2O/PH_2)$ is −5 to less than −2 is preferable in manufacture of the hot dip galvanized steel sheet of the present invention. If the $\log(PH_2O/PH_2)$ is less than −5, not only does the annealing treatment become poor in economy, but also the Si, Mn, P, S, Al, Ti, Nb, Cr, Mo, Ni, Cu, Zr, V, W, B, Ca, and REM right under the steel sheet which were internally oxidized in the heating step end up being reduced whereby the plating wettability and adhesion fall. If the $\log(PH_2O/PH_2)$ is −2 or more, the Fe-based oxides are not sufficiently reduced, so the plating wettability or adhesion falls. More preferably, the value is −4 to less than −2.

Figure 6:
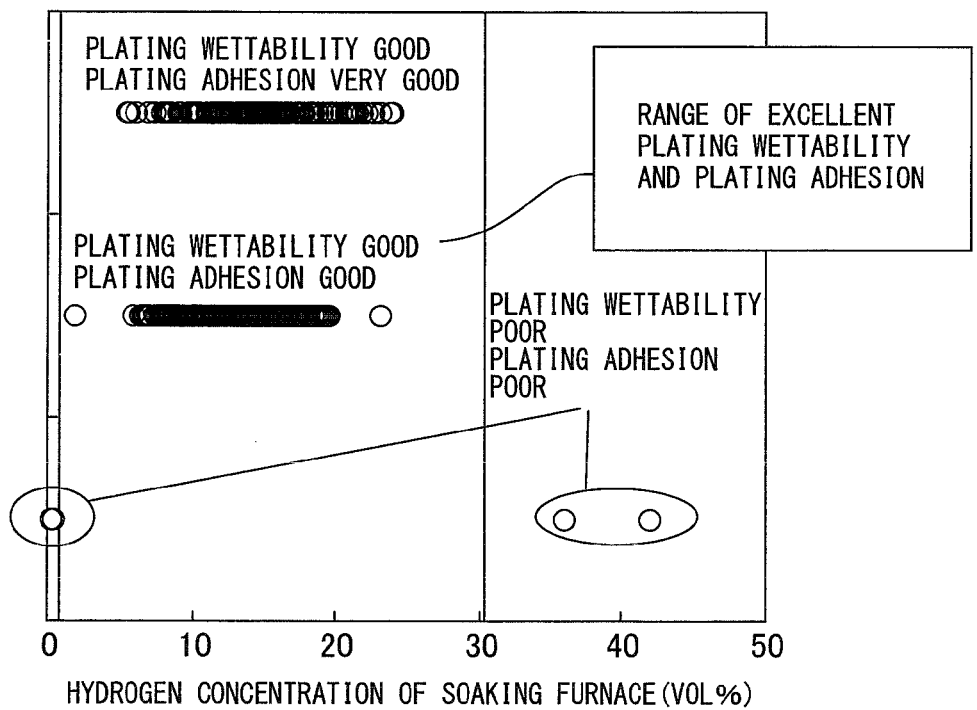
FIG. 6 shows the relationship between the hydrogen concentration of the soaking furnace and the plating wettability/plating adhesion as understood from the results of the later explained Examples A1 to A72, B1 to B72, C1 to C72, D1 to D72, E1 to E72, F1 to F72, and G1 to G72 and Comparative Examples H25 to H28.
Figure 7:
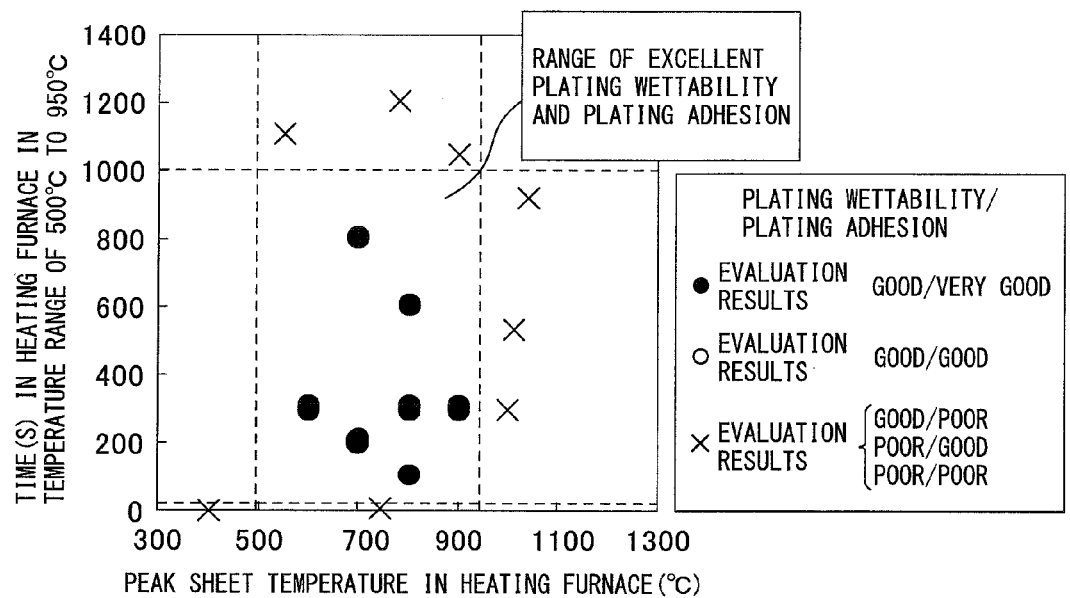
FIG. 7 shows the results of the plating wettability/plating adhesion which is determined by the relationship of the peak temperature of the cold rolled steel sheet in the heating furnace and the time in the temperature range of 500° C. to 950° C. which is obtained from the results of the later explained Examples A1 to A72, B1 to B72, C1 to C72, D1 to D72, E1 to E72, F1 to F72, and G1 to G72 and Comparative Examples H13 to H18 and H22 to H24.
Figure 8:
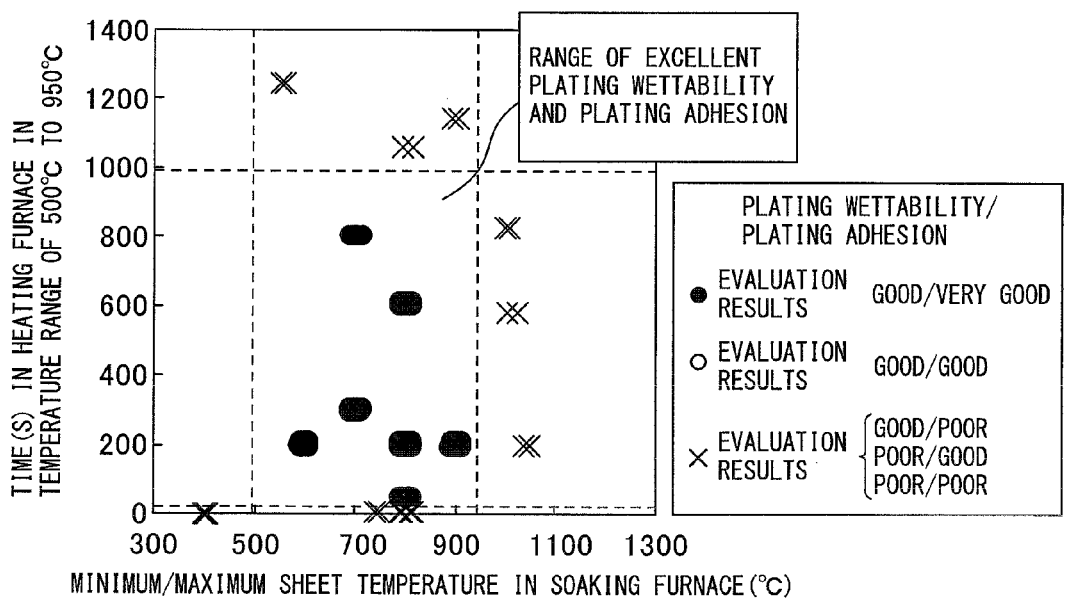
FIG. 8 shows the results of the plating wettability/plating adhesion which is determined by the relationship between the minimum and maximum sheet temperatures (sheet temperature range) at the soaking furnace and the time in the temperature range of 500° C. to 950° C. which is obtained from the results of the later explained Examples A1 to A72, B1 to B72, C1 to C72, D1 to D72, E1 to E72, F1 to F72, and G1 to G72 and Comparative Examples H13 to H24.

Further, in the atmosphere of the soaking furnace inside the above sheet temperature range, the hydrogen concentration, as shown in FIG. 6, is 1 vol % to 30 vol %. If the hydrogen concentration is less than 1 vol %, the ratio of the nitrogen increases and a nitridation reaction occurs at the steel sheet surface, so the plating wettability and the plating adhesion fall, while if over 30 vol %, the annealing treatment is inferior economically. Further, at the inside of the steel sheet, hydrogen forms a solid solution so hydrogen embrittlement occurs and the plating adhesion falls.

Further, the heating time in the above sheet temperature range of the soaking furnace is 10 seconds to 1000 seconds, but this is not preferable in production of hot dip galvanized steel sheet of the present invention. If less than 10 seconds, the Fe-based oxides are not sufficiently reduced. Further, if over 1000 seconds, the productivity of the annealing treatment falls and external oxides of Si and Mn are formed, so the plating wettability and adhesion fall. Further, in the soaking furnace, even if the sheet temperature is a constant temperature, the temperature may change in 500° C. to 950° C. in temperature range.

Individual control of the atmospheric conditions in the heating furnace and the soaking furnace of the continuous hot dip galvanization facility is a characteristic feature of the method of production of the hot dip galvanized steel sheet of the present invention. For individual control, it is necessary to charge the furnaces with nitrogen, steam, and hydrogen while controlling their concentrations. Further, the log $(PH_2O/PH_2)$ of the oxygen potential in the heating furnace has to be higher than the $\log(PH_2O/PH_2)$ of the oxygen potential in the soaking furnace. For this reason, when gas flows from the heating furnace toward the soaking furnace, it is sufficient to introduce an additional atmosphere of a higher hydrogen concentration or lower steam concentration than the inside of the heating furnace from between the heating furnace and the soaking furnace toward the soaking furnace. When gas flows from the soaking furnace toward the heating furnace, it is sufficient to introduce an additional atmosphere of a lower hydrogen concentration or higher steam concentration than the inside of the soaking furnace from between the heating furnace and soaking furnace toward the heating furnace.

After the steel sheet leaves the heating furnace and the soaking furnace, it can be run through the general ordinary steps until being dipped in the hot dip galvanization bath. For example, it can be run through a slow cooling step, rapid cooling step, overaging step, secondary cooling step, water quench step, reheating step, etc. alone or in any combination. It is also possible to similarly run it through general ordinary steps after dipping in a hot dip galvanization bath.

The steel sheet is run through the heating furnace and soaking furnace, then is cooled and, in accordance with need, held in temperature, is dipped in a hot dip galvanization bath where it is hot dip galvanized, then is treated for alloying in accordance with need.

With hot dip galvanization treatment, it is possible to use a hot dip galvanization bath which has a bath temperature of 440° C. to less than 550° C., a total of concentration of Al in the bath and concentration of cations of Al of 0.08% to 0.24%, and unavoidable impurities.

If the bath temperature is less than 440° C., the molten zinc in the bath may solidify, so this is unsuitable. If the bath temperature exceeds 550° C., the evaporation of the molten zinc at the bath surface becomes severe, the operating cost rises, and vaporized zinc sticks to the inside of the furnace, so there are problems in operation.

When plating hot dip galvanized steel sheet, if the total of the concentration of Al in the bath and the concentration of cations of Al becomes less than 0.08%, a large amount of ξ layers is formed and the plating adhesion falls, while if the total exceeds 0.24%, the Al which oxidizes in the bath or on the bath increases and the plating wettability falls.

When performing hot dip galvanization treatment, then alloying treatment, the alloying treatment is optimally performed at 440° C. to 600° C. If less than 440° C., the alloying proceeds slow. If over 600° C., due to the alloying, a hard, brittle Zn—Fe alloy layer is overly formed at the interface with the steel sheet, and the plating adhesion deteriorates. Further, if over 600° C., the residual austenite phase of the steel sheet breaks down, so the balance of strength and ductility of the steel sheet also deteriorates.

EXAMPLES

Below, examples will be used to specifically explain the present invention.

After the usual casting, hot rolling, pickling, and cold rolling, Test Materials (TM) 1 to 72 of 1 mm thickness cold rolled sheets which are shown in Table 1 were treated for annealing and treated to give plating layers by a continuous hot dip galvanization facility provided with an all radiant tube type heating furnace of a relatively high productivity heating method with little roll pickup as explained above. By using an all radiant tube type of furnace, as explained above, there is little roll pickup and the productivity is also good.

TABLE 1

Composition and Thickness of Cold Rolled Steel Sheet

Composition of steel sheet [wt %]

| No. | C | Si | Mn | P | S | Al | Ti | Cr | Mo | Ni | Cu | Zr | V | W | B | Ca | Ce |
|---|---|---|---|---|---|---|---|---|---|---|---|---|---|---|---|---|---|
| TM1 | 0.05 | 0.3 | 0.5 | 0.010 | 0.002 | 0.04 | | | | | | | | | | | |
| TM2 | 0.15 | 0.3 | 0.5 | 0.006 | 0.005 | 0.02 | | | | | | | | | | | |
| TM3 | 0.25 | 0.3 | 0.5 | 0.002 | 0.002 | 0.01 | | | | | | | | | | | |
| TM4 | 0.35 | 0.3 | 0.5 | 0.002 | 0.007 | 0.08 | | | | | | | | | | | |
| TM5 | 0.45 | 0.3 | 0.5 | 0.006 | 0.012 | 0.07 | | | | | | | | | | | |
| TM6 | 0.05 | 1.0 | 0.5 | 0.005 | 0.002 | 0.04 | | | | | | | | | | | |
| TM7 | 0.15 | 1.0 | 0.5 | 0.011 | 0.007 | 0.08 | | | | | | | | | | | |
| TM8 | 0.25 | 1.0 | 0.5 | 0.002 | 0.014 | 0.03 | | | | | | | | | | | |
| TM9 | 0.35 | 1.0 | 0.5 | 0.013 | 0.004 | 0.08 | | | | | | | | | | | |
| TM10 | 0.45 | 1.0 | 0.5 | 0.001 | 0.004 | 0.08 | | | | | | | | | | | |
| TM11 | 0.05 | 2.0 | 0.5 | 0.009 | 0.016 | 0.02 | | | | | | | | | | | |
| TM12 | 0.15 | 2.0 | 0.5 | 0.007 | 0.011 | 0.07 | | | | | | | | | | | |
| TM13 | 0.25 | 2.0 | 0.5 | 0.010 | 0.005 | 0.05 | | | | | | | | | | | |
| TM14 | 0.35 | 2.0 | 0.5 | 0.009 | 0.011 | 0.08 | | | | | | | | | | | |
| TM15 | 0.45 | 2.0 | 0.5 | 0.018 | 0.016 | 0.03 | | | | | | | | | | | |
| TM16 | 0.05 | 3.0 | 0.5 | 0.018 | 0.018 | 0.10 | | | | | | | | | | | |
| TM17 | 0.15 | 3.0 | 0.5 | 0.006 | 0.007 | 0.02 | | | | | | | | | | | |
| TM18 | 0.25 | 3.0 | 0.5 | 0.004 | 0.007 | 0.01 | | | | | | | | | | | |
| TM19 | 0.35 | 3.0 | 0.5 | 0.009 | 0.010 | 0.10 | | | | | | | | | | | |
| TM20 | 0.45 | 3.0 | 0.5 | 0.001 | 0.009 | 0.06 | | | | | | | | | | | |
| TM21 | 0.05 | 1.0 | 2.0 | 0.012 | 0.001 | 0.04 | | | | | | | | | | | |
| TM22 | 0.15 | 1.0 | 2.0 | 0.014 | 0.015 | 0.03 | | | | | | | | | | | |
| TM23 | 0.25 | 1.0 | 2.0 | 0.020 | 0.014 | 0.01 | | | | | | | | | | | |
| TM24 | 0.35 | 1.0 | 2.0 | 0.019 | 0.008 | 0.05 | | | | | | | | | | | |
| TM25 | 0.45 | 1.0 | 2.0 | 0.006 | 0.009 | 0.05 | | | | | | | | | | | |
| TM26 | 0.05 | 2.0 | 2.0 | 0.020 | 0.007 | 0.03 | | | | | | | | | | | |
| TM27 | 0.15 | 2.0 | 2.0 | 0.011 | 0.006 | 0.05 | | | | | | | | | | | |
| TM28 | 0.25 | 2.0 | 2.0 | 0.004 | 0.017 | 0.08 | | | | | | | | | | | |
| TM29 | 0.35 | 2.0 | 2.0 | 0.016 | 0.013 | 0.05 | | | | | | | | | | | |
| TM30 | 0.45 | 2.0 | 2.0 | 0.019 | 0.016 | 0.02 | | | | | | | | | | | |
| TM31 | 0.05 | 3.0 | 2.0 | 0.002 | 0.006 | 0.02 | | | | | | | | | | | |
| TM32 | 0.15 | 3.0 | 2.0 | 0.019 | 0.013 | 0.02 | | | | | | | | | | | |
| TM33 | 0.25 | 3.0 | 2.0 | 0.011 | 0.014 | 0.01 | | | | | | | | | | | |
| TM34 | 0.35 | 3.0 | 2.0 | 0.014 | 0.009 | 0.06 | | | | | | | | | | | |
| TM35 | 0.45 | 3.0 | 2.0 | 0.001 | 0.005 | 0.07 | | | | | | | | | | | |
| TM36 | 0.05 | 1.0 | 4.0 | 0.019 | 0.020 | 0.04 | | | | | | | | | | | |
| TM37 | 0.15 | 1.0 | 4.0 | 0.012 | 0.014 | 0.05 | | | | | | | | | | | |
| TM38 | 0.25 | 1.0 | 4.0 | 0.015 | 0.009 | 0.02 | | | | | | | | | | | |
| TM39 | 0.35 | 1.0 | 4.0 | 0.014 | 0.009 | 0.00 | | | | | | | | | | | |
| TM40 | 0.45 | 1.0 | 4.0 | 0.008 | 0.017 | 0.04 | | | | | | | | | | | |
| TM41 | 0.05 | 2.0 | 4.0 | 0.014 | 0.010 | 0.04 | | | | | | | | | | | |
| TM42 | 0.15 | 2.0 | 4.0 | 0.014 | 0.012 | 0.05 | | | | | | | | | | | |

TABLE 1-continued

Composition and Thickness of Cold Rolled Steel Sheet

Composition of steel sheet [wt %]

| No. | C | Si | Mn | P | S | Al | Ti | Cr | Mo | Ni | Cu | Zr | V | W | B | Ca | Ce |
|---|---|---|---|---|---|---|---|---|---|---|---|---|---|---|---|---|---|
| TM43 | 0.25 | 2.0 | 4.0 | 0.016 | 0.011 | 0.01 | | | | | | | | | | | |
| TM44 | 0.35 | 2.0 | 4.0 | 0.013 | 0.015 | 0.10 | | | | | | | | | | | |
| TM45 | 0.45 | 2.0 | 4.0 | 0.016 | 0.004 | 0.04 | | | | | | | | | | | |
| TM46 | 0.05 | 3.0 | 4.0 | 0.008 | 0.017 | 0.05 | | | | | | | | | | | |
| TM47 | 0.15 | 3.0 | 4.0 | 0.008 | 0.017 | 0.04 | | | | | | | | | | | |
| TM48 | 0.25 | 3.0 | 4.0 | 0.011 | 0.002 | 0.01 | | | | | | | | | | | |
| TM49 | 0.35 | 3.0 | 4.0 | 0.010 | 0.020 | 0.07 | | | | | | | | | | | |
| TM50 | 0.45 | 3.0 | 4.0 | 0.013 | 0.002 | 0.01 | | | | | | | | | | | |
| TM51 | 0.15 | 1.0 | 2.0 | 0.019 | 0.004 | 0.05 | 0.02 | | | | | | | | | | |
| TM52 | 0.15 | 1.0 | 2.0 | 0.019 | 0.020 | 0.05 | | 0.10 | | | | | | | | | |
| TM53 | 0.15 | 1.0 | 2.0 | 0.019 | 0.013 | 0.05 | | | 0.10 | | | | | | | | |
| TM54 | 0.15 | 1.0 | 2.0 | 0.019 | 0.019 | 0.05 | | | | 0.10 | | | | | | | |
| TM55 | 0.15 | 1.0 | 2.0 | 0.019 | 0.012 | 0.05 | | | | | 0.10 | | | | | | |
| TM56 | 0.15 | 1.0 | 2.0 | 0.019 | 0.009 | 0.05 | | | | | | 0.10 | | | | | |
| TM57 | 0.15 | 1.0 | 2.0 | 0.019 | 0.019 | 0.05 | | | | | | | 0.10 | | | | |
| TM58 | 0.15 | 1.0 | 2.0 | 0.019 | 0.019 | 0.05 | | | | | | | | 0.10 | | | |
| TM59 | 0.15 | 1.0 | 2.0 | 0.019 | 0.006 | 0.05 | | | | | | | | | 0.001 | | |
| TM60 | 0.15 | 1.0 | 2.0 | 0.019 | 0.002 | 0.05 | | | | | | | | | | 0.002 | |
| TM61 | 0.15 | 1.0 | 2.0 | 0.019 | 0.020 | 0.05 | | | | | | | | | | | 0.02 |
| TM62 | 0.05 | 0.3 | 0.5 | 0.010 | 0.002 | 0.04 | 0.02 | | | | | | | | | | |
| TM63 | 0.05 | 0.3 | 0.5 | 0.010 | 0.002 | 0.04 | | 0.10 | | | | | | | | | |
| TM64 | 0.05 | 0.3 | 0.5 | 0.010 | 0.002 | 0.04 | | | 0.10 | | | | | | | | |
| TM65 | 0.05 | 0.3 | 0.5 | 0.010 | 0.002 | 0.04 | | | | 0.10 | | | | | | | |
| TM66 | 0.05 | 0.3 | 0.5 | 0.010 | 0.002 | 0.04 | | | | | 0.10 | | | | | | |
| TM67 | 0.05 | 0.3 | 0.5 | 0.010 | 0.002 | 0.04 | | | | | | 0.10 | | | | | |
| TM68 | 0.05 | 0.3 | 0.5 | 0.010 | 0.002 | 0.04 | | | | | | | 0.10 | | | | |
| TM69 | 0.05 | 0.3 | 0.5 | 0.010 | 0.002 | 0.04 | | | | | | | | 0.10 | | | |
| TM70 | 0.05 | 0.3 | 0.5 | 0.010 | 0.002 | 0.04 | | | | | | | | | 0.001 | | |
| TM71 | 0.05 | 0.3 | 0.5 | 0.010 | 0.002 | 0.04 | | | | | | | | | | 0.002 | |
| TM72 | 0.05 | 0.3 | 0.5 | 0.010 | 0.002 | 0.04 | | | | | | | | | | | 0.02 |

The heating furnace and the soaking furnace are respectively charged with atmospheres of nitrogen gas containing hydrogen and steam. The conditions at the heating furnace and the soaking furnace and the log ($PH_2O/PH_2$) of the ratio of steam partial pressure and hydrogen partial pressure and hydrogen concentration of the furnaces are shown in Tables 2 to 7. The comparative examples are shown in Table 8.

Table 2

Recrystallization and Annealing Conditions, Surface Structure, Plating Wettability, and Plating Adhesion

| | | Recrystallization and annealing conditions | | | | | | | | | | |
|---|---|---|---|---|---|---|---|---|---|---|---|---|
| | | Heating furnace | | | | Soaking furnace | | | | | | Oxides in B layer and contents of elements |
| Level | Cold rolled steel sheet | Peak sheet temp. [° C.] | O potential log$PH_2O/PH_2$ | H conc. [vol %] | Time in 500° C. to 950° C. temp. range [s] | Sheet temp. range [° C.] | O potential log$PH_2O/PH_2$ | H conc. [vol %] | Time in 500° C. to 950° C. temp. range [s] | A layer thick. [μm] | B layer thick. [μm] | Oxide content [%] | Fe content [%] |
|---|---|---|---|---|---|---|---|---|---|---|---|---|---|
| A1 | TM1 | 804 | −0.3 | 10 | 296 | 798 to 815 | −3.3 | 10 | 193 | 27 | 0.148 | 15 | 85 |
| A2 | TM2 | 803 | −0.6 | 16 | 299 | 797 to 812 | −3.6 | 16 | 194 | 49 | 0.131 | 19 | 81 |
| A3 | TM3 | 802 | −0.5 | 16 | 292 | 796 to 813 | −3.5 | 16 | 200 | 49 | 0.165 | 14 | 86 |
| A4 | TM4 | 803 | −0.5 | 17 | 303 | 797 to 814 | −3.6 | 17 | 199 | 47 | 0.096 | 22 | 78 |
| A5 | TM5 | 802 | −0.3 | 10 | 309 | 792 to 812 | −3.5 | 10 | 201 | 37 | 0.130 | 15 | 85 |
| A6 | TM6 | 804 | −0.8 | 9 | 301 | 791 to 813 | −3.4 | 9 | 208 | 23 | 0.077 | 19 | 81 |
| A7 | TM7 | 803 | −0.4 | 14 | 303 | 792 to 815 | −3.5 | 14 | 193 | 38 | 0.123 | 14 | 86 |
| A8 | TM8 | 801 | −0.5 | 6 | 304 | 798 to 811 | −3.5 | 6 | 204 | 23 | 0.149 | 19 | 81 |
| A9 | TM9 | 802 | −0.6 | 12 | 302 | 794 to 814 | −3.3 | 12 | 206 | 49 | 0.135 | 21 | 79 |
| A10 | TM10 | 803 | −0.5 | 15 | 304 | 796 to 808 | −3.7 | 15 | 203 | 82 | 0.027 | 20 | 80 |
| A11 | TM11 | 804 | −0.7 | 10 | 306 | 790 to 810 | −3.7 | 10 | 196 | 73 | 0.059 | 23 | 77 |
| A12 | TM12 | 801 | −0.5 | 16 | 293 | 798 to 808 | −3.4 | 16 | 205 | 39 | 0.086 | 22 | 78 |
| A13 | TM13 | 803 | −0.5 | 19 | 298 | 796 to 806 | −3.4 | 19 | 203 | 29 | 0.173 | 18 | 82 |
| A14 | TM14 | 805 | −0.5 | 18 | 304 | 797 to 806 | −3.6 | 18 | 197 | 35 | 0.149 | 18 | 82 |
| A15 | TM15 | 803 | −0.4 | 13 | 300 | 799 to 814 | −3.5 | 13 | 194 | 28 | 0.072 | 18 | 82 |
| A16 | TM16 | 803 | −0.6 | 12 | 306 | 790 to 814 | −3.6 | 12 | 206 | 32 | 0.054 | 22 | 78 |
| A17 | TM17 | 800 | −0.6 | 13 | 296 | 797 to 812 | −3.5 | 13 | 193 | 51 | 0.134 | 23 | 77 |

TABLE 2-continued

Recrystallization and Annealing Conditions, Surface Structure, Plating Wettability, and Plating Adhesion

| | | | | | | | | | | | | | |
|---|---|---|---|---|---|---|---|---|---|---|---|---|---|
| A18 | TM18 | 804 | −0.5 | 10 | 297 | 791 to 811 | −3.6 | 10 | 198 | 74 | 0.109 | 22 | 78 |
| A19 | TM19 | 801 | −0.5 | 8 | 293 | 795 to 809 | −3.6 | 8 | 197 | 42 | 0.106 | 16 | 84 |
| A20 | TM20 | 805 | −0.5 | 14 | 307 | 791 to 814 | −3.6 | 14 | 193 | 84 | 0.032 | 20 | 80 |
| A21 | TM21 | 803 | −0.4 | 15 | 304 | 800 to 815 | −3.4 | 15 | 197 | 63 | 0.094 | 16 | 84 |
| A22 | TM22 | 800 | −0.4 | 7 | 299 | 796 to 810 | −3.6 | 7 | 202 | 73 | 0.171 | 22 | 78 |
| A23 | TM23 | 804 | −0.5 | 16 | 300 | 798 to 813 | −3.7 | 16 | 199 | 39 | 0.151 | 17 | 83 |
| A24 | TM24 | 802 | −0.5 | 10 | 301 | 792 to 809 | −3.4 | 10 | 202 | 85 | 0.034 | 15 | 85 |
| A25 | TM25 | 802 | −0.6 | 15 | 296 | 797 to 813 | −3.3 | 15 | 200 | 45 | 0.139 | 19 | 81 |
| A26 | TM26 | 801 | −0.7 | 14 | 306 | 795 to 807 | −3.3 | 14 | 201 | 20 | 0.067 | 18 | 82 |
| A27 | TM27 | 801 | −0.3 | 18 | 299 | 800 to 809 | −3.3 | 18 | 196 | 65 | 0.092 | 19 | 81 |
| A28 | TM28 | 805 | −0.5 | 8 | 299 | 798 to 812 | −3.4 | 8 | 195 | 16 | 0.100 | 14 | 86 |
| A29 | TM29 | 803 | −0.5 | 12 | 306 | 797 to 814 | −3.3 | 12 | 205 | 89 | 0.088 | 14 | 86 |
| A30 | TM30 | 803 | −0.5 | 12 | 299 | 792 to 806 | −3.7 | 12 | 202 | 22 | 0.168 | 22 | 78 |
| A31 | TM31 | 801 | −0.4 | 15 | 306 | 794 to 808 | −3.4 | 15 | 206 | 59 | 0.139 | 16 | 84 |
| A32 | TM32 | 804 | −0.6 | 16 | 298 | 795 to 806 | −3.4 | 16 | 205 | 28 | 0.052 | 17 | 83 |
| A33 | TM33 | 803 | −0.4 | 15 | 299 | 797 to 814 | −3.4 | 15 | 209 | 18 | 0.072 | 15 | 85 |
| A34 | TM34 | 805 | −0.5 | 14 | 305 | 798 to 808 | −3.5 | 14 | 204 | 78 | 0.043 | 14 | 86 |
| A35 | TM35 | 803 | −0.6 | 8 | 302 | 792 to 809 | −3.4 | 8 | 207 | 61 | 0.030 | 21 | 79 |
| A36 | TM36 | 803 | −0.6 | 10 | 300 | 790 to 808 | −3.4 | 10 | 206 | 36 | 0.081 | 16 | 84 |
| A37 | TM37 | 804 | −0.6 | 14 | 305 | 796 to 807 | −3.4 | 14 | 198 | 82 | 0.088 | 16 | 84 |
| A38 | TM38 | 804 | −0.6 | 15 | 293 | 797 to 806 | −3.4 | 15 | 197 | 67 | 0.145 | 14 | 86 |
| A39 | TM39 | 804 | −0.6 | 18 | 304 | 798 to 810 | −3.4 | 18 | 198 | 30 | 0.038 | 17 | 83 |
| A40 | TM40 | 800 | −0.3 | 10 | 297 | 799 to 809 | −3.3 | 10 | 198 | 89 | 0.087 | 15 | 85 |
| A41 | TM41 | 803 | −0.4 | 12 | 304 | 792 to 814 | −3.5 | 12 | 198 | 35 | 0.157 | 16 | 84 |
| A42 | TM42 | 802 | −0.4 | 11 | 301 | 793 to 813 | −3.4 | 11 | 200 | 60 | 0.104 | 20 | 80 |
| A43 | TM43 | 802 | −0.7 | 13 | 297 | 796 to 808 | −3.4 | 13 | 200 | 55 | 0.094 | 16 | 84 |
| A44 | TM44 | 802 | −0.3 | 15 | 302 | 792 to 813 | −3.5 | 15 | 199 | 59 | 0.074 | 19 | 81 |
| A45 | TM45 | 803 | −0.3 | 18 | 304 | 797 to 813 | −3.6 | 18 | 199 | 63 | 0.098 | 14 | 86 |
| A46 | TM46 | 802 | −0.3 | 5 | 302 | 792 to 806 | −3.6 | 5 | 199 | 19 | 0.155 | 17 | 83 |
| A47 | TM47 | 804 | −0.5 | 13 | 307 | 799 to 815 | −3.5 | 13 | 200 | 86 | 0.179 | 15 | 85 |
| A48 | TM48 | 805 | −0.5 | 16 | 297 | 793 to 807 | −3.6 | 16 | 197 | 50 | 0.148 | 16 | 84 |
| A49 | TM49 | 804 | −0.7 | 17 | 309 | 791 to 812 | −3.6 | 17 | 200 | 68 | 0.069 | 21 | 79 |
| A50 | TM50 | 801 | −0.7 | 13 | 305 | 798 to 810 | −3.6 | 13 | 204 | 81 | 0.179 | 19 | 81 |
| A51 | TM51 | 801 | −0.3 | 7 | 299 | 795 to 813 | −3.5 | 7 | 209 | 13 | 0.136 | 19 | 81 |
| A52 | TM52 | 804 | −0.6 | 16 | 293 | 794 to 813 | −3.5 | 16 | 198 | 63 | 0.176 | 22 | 78 |
| A53 | TM53 | 804 | −0.7 | 10 | 300 | 799 to 807 | −3.5 | 10 | 205 | 55 | 0.039 | 16 | 84 |
| A54 | TM54 | 802 | −0.2 | 17 | 301 | 797 to 807 | −3.4 | 17 | 209 | 15 | 0.078 | 18 | 82 |
| A55 | TM55 | 801 | −0.4 | 14 | 299 | 792 to 814 | −3.4 | 14 | 193 | 88 | 0.102 | 18 | 82 |
| A56 | TM56 | 805 | −0.7 | 17 | 303 | 797 to 811 | −3.5 | 17 | 194 | 75 | 0.116 | 16 | 84 |
| A57 | TM57 | 804 | −0.5 | 14 | 294 | 791 to 814 | −3.6 | 14 | 205 | 17 | 0.069 | 14 | 86 |
| A58 | TM58 | 804 | −0.3 | 19 | 303 | 794 to 812 | −3.5 | 19 | 203 | 58 | 0.109 | 17 | 83 |
| A59 | TM59 | 800 | −0.5 | 13 | 299 | 790 to 805 | −3.3 | 13 | 196 | 58 | 0.110 | 22 | 78 |
| A60 | TM60 | 802 | −0.3 | 9 | 296 | 799 to 811 | −3.7 | 9 | 202 | 20 | 0.114 | 16 | 84 |
| A61 | TM61 | 803 | −0.4 | 11 | 299 | 799 to 814 | −3.5 | 11 | 205 | 73 | 0.151 | 22 | 78 |
| A62 | TM62 | 803 | −0.6 | 12 | 297 | 790 to 812 | −3.6 | 12 | 205 | 73 | 0.112 | 18 | 82 |
| A63 | TM63 | 802 | −0.3 | 9 | 299 | 796 to 806 | −3.4 | 9 | 199 | 14 | 0.071 | 14 | 86 |
| A64 | TM64 | 803 | −0.5 | 8 | 304 | 797 to 807 | −3.4 | 8 | 196 | 29 | 0.115 | 19 | 81 |
| A65 | TM65 | 804 | −0.5 | 14 | 292 | 796 to 813 | −3.6 | 14 | 199 | 79 | 0.034 | 14 | 86 |
| A66 | TM66 | 803 | −0.6 | 16 | 301 | 797 to 813 | −3.6 | 16 | 194 | 31 | 0.027 | 13 | 87 |
| A67 | TM67 | 800 | −0.5 | 12 | 293 | 791 to 815 | −3.6 | 12 | 204 | 45 | 0.076 | 16 | 84 |
| A68 | TM68 | 804 | −0.4 | 9 | 297 | 796 to 809 | −3.5 | 9 | 199 | 22 | 0.135 | 15 | 85 |
| A69 | TM69 | 805 | −0.5 | 12 | 294 | 800 to 808 | −3.4 | 12 | 195 | 22 | 0.064 | 20 | 80 |
| A70 | TM70 | 803 | −0.5 | 17 | 302 | 799 to 808 | −3.4 | 17 | 200 | 14 | 0.180 | 22 | 78 |
| A71 | TM71 | 804 | −0.7 | 9 | 303 | 791 to 813 | −3.3 | 9 | 201 | 56 | 0.135 | 22 | 78 |
| A72 | TM72 | 802 | −0.3 | 10 | 295 | 793 to 805 | −3.5 | 10 | 202 | 42 | 0.133 | 14 | 86 |

| Level | Cold rolled steel sheet | C content [%] | Si content [%] | Mn content [%] | P content [%] | S content [%] | Al content [%] | Ti, Nb, Cr, Mo, Ni, Cu, Zr, V, W, B, Ca content [%] | Alloying treatment | Evaluation Wettability | Adhesion | Remarks |
|---|---|---|---|---|---|---|---|---|---|---|---|---|
| A1 | TM1 | 0.0005 | 0.0001 | 0.0007 | 0.0001 | 0.0005 | 0.0009 | | Yes | Good | Very good | Inv. ex. |
| A2 | TM2 | 0.0003 | 0.0006 | 0.0000 | 0.0009 | 0.0006 | 0.0007 | | Yes | Good | Good | Inv. ex. |
| A3 | TM3 | 0.0003 | 0.0006 | 0.0003 | 0.0003 | 0.0010 | 0.0010 | | Yes | Good | Very good | Inv. ex. |
| A4 | TM4 | 0.0002 | 0.0009 | 0.0005 | 0.0010 | 0.0008 | 0.0007 | | Yes | Good | Good | Inv. ex. |
| A5 | TM5 | 0.0008 | 0.0006 | 0.0005 | 0.0004 | 0.0004 | 0.0007 | | Yes | Good | Very good | Inv. ex. |
| A6 | TM6 | 0.0007 | 0.0007 | 0.0004 | 0.0009 | 0.0005 | 0.0008 | | Yes | Good | Very good | Inv. ex. |
| A7 | TM7 | 0.0006 | 0.0009 | 0.0004 | 0.0004 | 0.0010 | 0.0008 | | Yes | Good | Very good | Inv. ex. |
| A8 | TM8 | 0.0000 | 0.0002 | 0.0002 | 0.0006 | 0.0005 | 0.0010 | | Yes | Good | Very good | Inv. ex. |
| A9 | TM9 | 0.0010 | 0.0007 | 0.0009 | 0.0000 | 0.0005 | 0.0007 | | Yes | Good | Very good | Inv. ex. |
| A10 | TM10 | 0.0005 | 0.0005 | 0.0005 | 0.0006 | 0.0003 | 0.0009 | | No | Good | Very good | Inv. ex. |

Table 2-continued

Recrystallization and Annealing Conditions, Surface Structure, Plating Wettability, and Plating Adhesion

| ID | TM | | | | | | | | | | |
|---|---|---|---|---|---|---|---|---|---|---|---|
| A11 | TM11 | 0.0008 | 0.0006 | 0.0003 | 0.0007 | 0.0001 | 0.0003 | | Yes | Good | Very good | Inv. ex. |
| A12 | TM12 | 0.0005 | 0.0005 | 0.0005 | 0.0008 | 0.0001 | 0.0001 | | Yes | Good | Very good | Inv. ex. |
| A13 | TM13 | 0.0005 | 0.0004 | 0.0008 | 0.0006 | 0.0001 | 0.0001 | | Yes | Good | Very good | Inv. ex. |
| A14 | TM14 | 0.0008 | 0.0002 | 0.0004 | 0.0002 | 0.0007 | 0.0006 | | Yes | Good | Very good | Inv. ex. |
| A15 | TM15 | 0.0010 | 0.0006 | 0.0008 | 0.0003 | 0.0009 | 0.0004 | | Yes | Good | Very good | Inv. ex. |
| A16 | TM16 | 0.0004 | 0.0002 | 0.0002 | 0.0002 | 0.0007 | 0.0006 | | Yes | Good | Very good | Inv. ex. |
| A17 | TM17 | 0.0000 | 0.0005 | 0.0007 | 0.0003 | 0.0004 | 0.0009 | | Yes | Good | Very good | Inv. ex. |
| A18 | TM18 | 0.0002 | 0.0003 | 0.0003 | 0.0001 | 0.0010 | 0.0002 | | Yes | Good | Good | Inv. ex. |
| A19 | TM19 | 0.0006 | 0.0003 | 0.0002 | 0.0002 | 0.0001 | 0.0000 | | Yes | Good | Very good | Inv. ex. |
| A20 | TM20 | 0.0008 | 0.0002 | 0.0000 | 0.0009 | 0.0010 | 0.0004 | | No | Good | Good | Inv. ex. |
| A21 | TM21 | 0.0004 | 0.0008 | 0.0003 | 0.0007 | 0.0003 | 0.0008 | | Yes | Good | Very good | Inv. ex. |
| A22 | TM22 | 0.0006 | 0.0005 | 0.0001 | 0.0002 | 0.0005 | 0.0007 | | Yes | Good | Very good | Inv. ex. |
| A23 | TM23 | 0.0001 | 0.0003 | 0.0008 | 0.0009 | 0.0003 | 0.0005 | | Yes | Good | Very good | Inv. ex. |
| A24 | TM24 | 0.0003 | 0.0001 | 0.0005 | 0.0004 | 0.0006 | 0.0006 | | Yes | Good | Very good | Inv. ex. |
| A25 | TM25 | 0.0002 | 0.0006 | 0.0004 | 0.0000 | 0.0006 | 0.0009 | | Yes | Good | Very good | Inv. ex. |
| A26 | TM26 | 0.0009 | 0.0000 | 0.0010 | 0.0008 | 0.0002 | 0.0005 | | Yes | Good | Very good | Inv. ex. |
| A27 | TM27 | 0.0004 | 0.0008 | 0.0006 | 0.0009 | 0.0004 | 0.0000 | | Yes | Good | Very good | Inv. ex. |
| A28 | TM28 | 0.0009 | 0.0008 | 0.0008 | 0.0006 | 0.0001 | 0.0001 | | Yes | Good | Very good | Inv. ex. |
| A29 | TM29 | 0.0008 | 0.0008 | 0.0005 | 0.0003 | 0.0007 | 0.0008 | | Yes | Good | Very good | Inv. ex. |
| A30 | TM30 | 0.0007 | 0.0007 | 0.0004 | 0.0001 | 0.0006 | 0.0003 | | No | Good | Very good | Inv. ex. |
| A31 | TM31 | 0.0008 | 0.0000 | 0.0002 | 0.0006 | 0.0004 | 0.0008 | | Yes | Good | Very good | Inv. ex. |
| A32 | TM32 | 0.0003 | 0.0008 | 0.0003 | 0.0001 | 0.0007 | 0.0003 | | Yes | Good | Very good | Inv. ex. |
| A33 | TM33 | 0.0002 | 0.0006 | 0.0005 | 0.0003 | 0.0004 | 0.0000 | | Yes | Good | Very good | Inv. ex. |
| A34 | TM34 | 0.0001 | 0.0007 | 0.0002 | 0.0008 | 0.0003 | 0.0003 | | Yes | Good | Very good | Inv. ex. |
| A35 | TM35 | 0.0003 | 0.0007 | 0.0003 | 0.0004 | 0.0001 | 0.0000 | | Yes | Good | Very good | Inv. ex. |
| A36 | TM36 | 0.0009 | 0.0001 | 0.0002 | 0.0006 | 0.0008 | 0.0002 | | Yes | Good | Very good | Inv. ex. |
| A37 | TM37 | 0.0006 | 0.0008 | 0.0007 | 0.0007 | 0.0009 | 0.0008 | | Yes | Good | Very good | Inv. ex. |
| A38 | TM38 | 0.0010 | 0.0009 | 0.0005 | 0.0008 | 0.0007 | 0.0001 | | Yes | Good | Very good | Inv. ex. |
| A39 | TM39 | 0.0005 | 0.0003 | 0.0001 | 0.0004 | 0.0002 | 0.0004 | | Yes | Good | Very good | Inv. ex. |
| A40 | TM40 | 0.0008 | 0.0000 | 0.0005 | 0.0001 | 0.0004 | 0.0004 | | No | Good | Very good | Inv. ex. |
| A41 | TM41 | 0.0006 | 0.0005 | 0.0002 | 0.0010 | 0.0001 | 0.0000 | | Yes | Good | Very good | Inv. ex. |
| A42 | TM42 | 0.0007 | 0.0000 | 0.0001 | 0.0003 | 0.0005 | 0.0008 | | Yes | Good | Very good | Inv. ex. |
| A43 | TM43 | 0.0009 | 0.0010 | 0.0004 | 0.0003 | 0.0003 | 0.0008 | | Yes | Good | Very good | Inv. ex. |
| A44 | TM44 | 0.0002 | 0.0001 | 0.0008 | 0.0010 | 0.0008 | 0.0001 | | Yes | Good | Very good | Inv. ex. |
| A45 | TM45 | 0.0009 | 0.0007 | 0.0008 | 0.0001 | 0.0001 | 0.0006 | | Yes | Good | Very good | Inv. ex. |
| A46 | TM46 | 0.0003 | 0.0005 | 0.0010 | 0.0010 | 0.0002 | 0.0005 | | Yes | Good | Very good | Inv. ex. |
| A47 | TM47 | 0.0004 | 0.0006 | 0.0006 | 0.0004 | 0.0003 | 0.0004 | | Yes | Good | Very good | Inv. ex. |
| A48 | TM48 | 0.0010 | 0.0005 | 0.0003 | 0.0008 | 0.0009 | 0.0004 | | Yes | Good | Very good | Inv. ex. |
| A49 | TM49 | 0.0003 | 0.0002 | 0.0005 | 0.0003 | 0.0002 | 0.0010 | | Yes | Good | Very good | Inv. ex. |
| A50 | TM50 | 0.0003 | 0.0008 | 0.0006 | 0.0000 | 0.0005 | 0.0010 | | No | Good | Very good | Inv. ex. |
| A51 | TM51 | 0.0008 | 0.0009 | 0.0007 | 0.0009 | 0.0001 | 0.0010 | 0.00003 | Yes | Good | Good | Inv. ex. |
| A52 | TM52 | 0.0008 | 0.0008 | 0.0002 | 0.0009 | 0.0008 | 0.0001 | 0.00008 | Yes | Good | Very good | Inv. ex. |
| A53 | TM53 | 0.0002 | 0.0009 | 0.0005 | 0.0004 | 0.0005 | 0.0000 | 0.00004 | Yes | Good | Very good | Inv. ex. |
| A54 | TM54 | 0.0008 | 0.0005 | 0.0009 | 0.0007 | 0.0007 | 0.0007 | 0.00010 | Yes | Good | Good | Inv. ex. |
| A55 | TM55 | 0.0008 | 0.0002 | 0.0006 | 0.0001 | 0.0007 | 0.0003 | 0.00001 | Yes | Good | Very good | Inv. ex. |
| A56 | TM56 | 0.0006 | 0.0008 | 0.0008 | 0.0006 | 0.0004 | 0.0002 | 0.00005 | Yes | Good | Very good | Inv. ex. |
| A57 | TM57 | 0.0006 | 0.0001 | 0.0009 | 0.0009 | 0.0009 | 0.0004 | 0.00006 | Yes | Good | Very good | Inv. ex. |
| A58 | TM58 | 0.0001 | 0.0004 | 0.0003 | 0.0002 | 0.0000 | 0.0000 | 0.00003 | Yes | Good | Very good | Inv. ex. |
| A59 | TM59 | 0.0004 | 0.0000 | 0.0003 | 0.0008 | 0.0003 | 0.0006 | 0.00005 | Yes | Good | Very good | Inv. ex. |
| A60 | TM60 | 0.0007 | 0.0002 | 0.0008 | 0.0002 | 0.0007 | 0.0000 | 0.00008 | No | Good | Very good | Inv. ex. |
| A61 | TM61 | 0.0004 | 0.0008 | 0.0007 | 0.0001 | 0.0004 | 0.0004 | 0.00004 | Yes | Good | Very good | Inv. ex. |
| A62 | TM62 | 0.0001 | 0.0002 | 0.0002 | 0.0009 | 0.0008 | 0.0006 | 0.00010 | Yes | Good | Good | Inv. ex. |
| A63 | TM63 | 0.0006 | 0.0009 | 0.0005 | 0.0002 | 0.0010 | 0.0005 | 0.00005 | Yes | Good | Very good | Inv. ex. |
| A64 | TM64 | 0.0003 | 0.0002 | 0.0007 | 0.0001 | 0.0009 | 0.0000 | 0.00010 | Yes | Good | Very good | Inv. ex. |
| A65 | TM65 | 0.0010 | 0.0004 | 0.0003 | 0.0007 | 0.0006 | 0.0009 | 0.00003 | Yes | Good | Very good | Inv. ex. |
| A66 | TM66 | 0.0007 | 0.0010 | 0.0005 | 0.0001 | 0.0010 | 0.0004 | 0.00008 | Yes | Good | Very good | Inv. ex. |
| A67 | TM67 | 0.0006 | 0.0009 | 0.0009 | 0.0005 | 0.0006 | 0.0001 | 0.00008 | Yes | Good | Very good | Inv. ex. |
| A68 | TM68 | 0.0000 | 0.0009 | 0.0009 | 0.0001 | 0.0004 | 0.0004 | 0.00002 | Yes | Good | Very good | Inv. ex. |
| A69 | TM69 | 0.0009 | 0.0008 | 0.0010 | 0.0006 | 0.0002 | 0.0008 | 0.00004 | Yes | Good | Very good | Inv. ex. |
| A70 | TM70 | 0.0002 | 0.0008 | 0.0008 | 0.0003 | 0.0003 | 0.0009 | 0.00004 | No | Good | Very good | Inv. ex. |
| A71 | TM71 | 0.0001 | 0.0002 | 0.0010 | 0.0007 | 0.0000 | 0.0006 | 0.00003 | Yes | Good | Very good | Inv. ex. |
| A72 | TM72 | 0.0000 | 0.0007 | 0.0002 | 0.0009 | 0.0009 | 0.0008 | 0.00005 | Yes | Good | Very good | Inv. ex. |

TABLE 3

Recrystallization and Annealing Conditions, Surface Structure, Plating Wettability, and Plating Adhesion

| | | Recrystallization and annealing conditions | | | | | | | | | Oxides in B layer and contents of elements | |
|---|---|---|---|---|---|---|---|---|---|---|---|---|
| | | Heating furnace | | | | Soaking furnace | | | | | | |
| Level | Cold rolled steel sheet | Peak sheet temp. [°C] | O potential logPH$_2$O/PH$_2$ | H conc. [vol %] | Time in 500°C to 950°C temp. range [s] | Sheet temp. range [°C] | O potential logPH$_2$O/PH$_2$ | H conc. [vol %] | Time in 500°C to 950°C temp. range [s] | A layer thick. [μm] | B layer thick. [μm] | Oxide content [%] | Fe content [%] |
| B1 | TM1 | 801 | −0.3 | 11 | 605 | 793 to 813 | −3.0 | 11 | 601 | 88 | 0.236 | 22 | 78 |
| B2 | TM2 | 803 | −0.1 | 8 | 602 | 791 to 811 | −3.2 | 8 | 607 | 80 | 0.122 | 23 | 77 |
| B3 | TM3 | 800 | −0.1 | 9 | 602 | 800 to 813 | −2.9 | 9 | 607 | 16 | 0.216 | 39 | 61 |
| B4 | TM4 | 803 | −0.1 | 17 | 603 | 790 to 814 | −3.1 | 17 | 608 | 68 | 0.239 | 40 | 60 |
| B5 | TM5 | 804 | 0.3 | 19 | 602 | 798 to 811 | −2.9 | 19 | 602 | 19 | 0.227 | 36 | 64 |
| B6 | TM6 | 803 | −0.1 | 16 | 603 | 799 to 808 | −3.1 | 16 | 605 | 29 | 0.151 | 28 | 72 |
| B7 | TM7 | 802 | 0.1 | 16 | 605 | 791 to 809 | −3.1 | 16 | 609 | 64 | 0.289 | 23 | 77 |
| B8 | TM8 | 801 | 0.1 | 13 | 604 | 793 to 814 | −3.1 | 13 | 606 | 74 | 0.181 | 23 | 77 |
| B9 | TM9 | 804 | 0.0 | 14 | 600 | 791 to 806 | −2.8 | 14 | 604 | 13 | 0.331 | 36 | 64 |
| B10 | TM10 | 805 | 0.2 | 12 | 603 | 794 to 805 | −3.0 | 12 | 602 | 64 | 0.235 | 30 | 70 |
| B11 | TM11 | 804 | −0.1 | 10 | 601 | 799 to 806 | −3.0 | 10 | 603 | 19 | 0.184 | 31 | 69 |
| B12 | TM12 | 801 | 0.0 | 12 | 600 | 795 to 809 | −3.1 | 12 | 602 | 76 | 0.029 | 24 | 76 |
| B13 | TM13 | 803 | 0.0 | 18 | 602 | 799 to 812 | −2.9 | 18 | 609 | 41 | 0.229 | 32 | 68 |
| B14 | TM14 | 802 | 0.1 | 10 | 601 | 793 to 808 | −3.0 | 10 | 606 | 21 | 0.012 | 24 | 76 |
| B15 | TM15 | 803 | −0.2 | 12 | 603 | 799 to 814 | −3.0 | 12 | 605 | 84 | 0.273 | 33 | 67 |
| B16 | TM16 | 802 | 0.0 | 15 | 604 | 790 to 813 | −3.0 | 15 | 605 | 34 | 0.176 | 20 | 80 |
| B17 | TM17 | 802 | 0.0 | 13 | 602 | 796 to 807 | −2.9 | 13 | 603 | 78 | 0.316 | 32 | 68 |
| B18 | TM18 | 804 | 0.1 | 10 | 602 | 793 to 809 | −2.9 | 10 | 603 | 86 | 0.056 | 25 | 75 |
| B19 | TM19 | 804 | 0.0 | 14 | 604 | 792 to 811 | −3.0 | 14 | 606 | 76 | 0.136 | 35 | 65 |
| B20 | TM20 | 801 | 0.1 | 19 | 603 | 795 to 806 | −3.0 | 19 | 606 | 83 | 0.072 | 39 | 61 |
| B21 | TM21 | 802 | −0.1 | 13 | 601 | 793 to 811 | −2.9 | 13 | 600 | 69 | 0.025 | 22 | 78 |
| B22 | TM22 | 800 | 0.0 | 10 | 601 | 798 to 809 | −3.1 | 10 | 608 | 53 | 0.169 | 25 | 75 |
| B23 | TM23 | 801 | 0.1 | 15 | 604 | 792 to 810 | −3.1 | 15 | 609 | 30 | 0.336 | 25 | 75 |
| B24 | TM24 | 801 | −0.2 | 13 | 605 | 791 to 808 | −3.1 | 13 | 605 | 37 | 0.131 | 22 | 78 |
| B25 | TM25 | 802 | −0.1 | 10 | 604 | 793 to 814 | −3.0 | 10 | 607 | 44 | 0.147 | 26 | 74 |
| B26 | TM26 | 801 | 0.1 | 11 | 603 | 795 to 807 | −2.9 | 11 | 601 | 50 | 0.306 | 31 | 69 |
| B27 | TM27 | 804 | 0.1 | 9 | 601 | 791 to 809 | −2.8 | 9 | 602 | 38 | 0.258 | 27 | 73 |
| B28 | TM28 | 805 | 0.0 | 13 | 603 | 795 to 813 | −2.7 | 13 | 605 | 49 | 0.277 | 24 | 76 |
| B29 | TM29 | 802 | 0.1 | 9 | 604 | 799 to 809 | −3.1 | 9 | 609 | 19 | 0.216 | 29 | 71 |
| B30 | TM30 | 800 | −0.1 | 13 | 603 | 790 to 814 | −3.0 | 13 | 608 | 87 | 0.134 | 26 | 74 |
| B31 | TM31 | 805 | 0.0 | 14 | 603 | 796 to 808 | −3.0 | 14 | 601 | 63 | 0.253 | 23 | 77 |
| B32 | TM32 | 803 | 0.1 | 11 | 605 | 794 to 815 | −3.0 | 11 | 605 | 80 | 0.329 | 35 | 65 |
| B33 | TM33 | 802 | −0.2 | 13 | 602 | 794 to 814 | −3.1 | 13 | 601 | 72 | 0.300 | 34 | 66 |
| B34 | TM34 | 803 | 0.0 | 19 | 601 | 794 to 814 | −3.1 | 19 | 601 | 14 | 0.269 | 31 | 69 |
| B35 | TM35 | 802 | −0.1 | 12 | 605 | 795 to 815 | −2.7 | 12 | 600 | 46 | 0.062 | 33 | 67 |
| B36 | TM36 | 805 | 0.0 | 14 | 604 | 796 to 814 | −3.0 | 14 | 603 | 29 | 0.087 | 33 | 67 |
| B37 | TM37 | 805 | 0.2 | 9 | 605 | 799 to 810 | −3.2 | 9 | 602 | 26 | 0.133 | 23 | 77 |
| B38 | TM38 | 802 | −0.1 | 14 | 605 | 795 to 810 | −3.2 | 14 | 610 | 28 | 0.197 | 26 | 74 |
| B39 | TM39 | 801 | −0.1 | 16 | 600 | 791 to 808 | −2.8 | 16 | 601 | 31 | 0.283 | 30 | 70 |
| B40 | TM40 | 801 | −0.2 | 15 | 601 | 799 to 811 | −2.8 | 15 | 602 | 64 | 0.202 | 33 | 67 |
| B41 | TM41 | 803 | 0.1 | 12 | 604 | 797 to 814 | −2.8 | 12 | 605 | 66 | 0.189 | 23 | 77 |
| B42 | TM42 | 804 | 0.0 | 12 | 603 | 790 to 811 | −2.9 | 12 | 606 | 84 | 0.076 | 36 | 64 |
| B43 | TM43 | 800 | 0.1 | 16 | 603 | 792 to 813 | −3.0 | 16 | 601 | 51 | 0.169 | 33 | 67 |
| B44 | TM44 | 804 | 0.0 | 16 | 600 | 799 to 806 | −3.0 | 16 | 607 | 49 | 0.318 | 27 | 73 |
| B45 | TM45 | 802 | 0.1 | 12 | 605 | 797 to 805 | −2.8 | 12 | 603 | 33 | 0.139 | 37 | 63 |
| B46 | TM46 | 801 | −0.1 | 16 | 600 | 792 to 808 | −3.0 | 16 | 601 | 27 | 0.163 | 27 | 73 |
| B47 | TM47 | 804 | 0.2 | 13 | 601 | 790 to 812 | −3.0 | 13 | 604 | 44 | 0.191 | 36 | 64 |
| B48 | TM48 | 801 | 0.2 | 13 | 602 | 797 to 810 | −3.1 | 13 | 601 | 19 | 0.209 | 27 | 73 |
| B49 | TM49 | 802 | 0.1 | 15 | 604 | 791 to 812 | −2.8 | 15 | 606 | 40 | 0.103 | 22 | 78 |
| B50 | TM50 | 804 | 0.0 | 11 | 601 | 798 to 814 | −3.0 | 11 | 600 | 37 | 0.308 | 38 | 62 |
| B51 | TM51 | 801 | 0.0 | 10 | 601 | 794 to 807 | −3.1 | 10 | 603 | 24 | 0.300 | 34 | 66 |
| B52 | TM52 | 804 | −0.1 | 7 | 600 | 792 to 811 | −3.0 | 7 | 604 | 81 | 0.307 | 27 | 73 |
| B53 | TM53 | 804 | −0.2 | 8 | 605 | 798 to 812 | −2.8 | 8 | 601 | 60 | 0.175 | 28 | 72 |
| B54 | TM54 | 804 | −0.1 | 16 | 601 | 799 to 810 | −3.2 | 16 | 602 | 46 | 0.266 | 21 | 79 |
| B55 | TM55 | 805 | 0.0 | 15 | 601 | 800 to 806 | −2.9 | 15 | 610 | 52 | 0.154 | 34 | 66 |
| B56 | TM56 | 804 | 0.0 | 7 | 602 | 797 to 806 | −2.8 | 7 | 604 | 28 | 0.344 | 34 | 66 |
| B57 | TM57 | 802 | 0.1 | 12 | 602 | 797 to 812 | −3.0 | 12 | 604 | 70 | 0.096 | 29 | 71 |
| B58 | TM58 | 800 | 0.1 | 11 | 605 | 794 to 808 | −2.8 | 11 | 610 | 89 | 0.030 | 25 | 75 |
| B59 | TM59 | 800 | 0.0 | 11 | 602 | 797 to 809 | −2.8 | 11 | 603 | 57 | 0.100 | 29 | 71 |
| B60 | TM60 | 803 | 0.3 | 18 | 603 | 791 to 813 | −2.8 | 18 | 604 | 36 | 0.267 | 33 | 67 |
| B61 | TM61 | 802 | −0.1 | 12 | 604 | 793 to 810 | −3.0 | 12 | 604 | 40 | 0.294 | 33 | 67 |
| B62 | TM62 | 801 | −0.2 | 16 | 603 | 797 to 809 | −3.1 | 16 | 604 | 40 | 0.103 | 35 | 65 |
| B63 | TM63 | 805 | 0.0 | 11 | 602 | 793 to 805 | −3.1 | 11 | 603 | 84 | 0.165 | 23 | 77 |
| B64 | TM64 | 803 | 0.1 | 7 | 604 | 791 to 806 | −3.0 | 7 | 609 | 39 | 0.148 | 26 | 74 |

TABLE 3-continued

Recrystallization and Annealing Conditions, Surface Structure, Plating Wettability, and Plating Adhesion

| | | | | | | | | | | | | | |
|---|---|---|---|---|---|---|---|---|---|---|---|---|---|
| B65 | TM65 | 804 | 0.2 | 14 | 601 | 798 to 811 | −3.1 | 14 | 608 | 65 | 0.213 | 35 | 65 |
| B66 | TM66 | 804 | 0.1 | 16 | 603 | 798 to 814 | −3.2 | 16 | 600 | 10 | 0.075 | 31 | 69 |
| B67 | TM67 | 804 | 0.0 | 16 | 601 | 798 to 812 | −2.9 | 16 | 609 | 55 | 0.031 | 38 | 62 |
| B68 | TM68 | 801 | −0.1 | 12 | 601 | 792 to 814 | −2.9 | 12 | 605 | 89 | 0.305 | 33 | 67 |
| B69 | TM69 | 802 | −0.1 | 11 | 601 | 792 to 806 | −2.9 | 11 | 607 | 64 | 0.187 | 27 | 73 |
| B70 | TM70 | 802 | 0.1 | 11 | 605 | 791 to 809 | −3.0 | 11 | 608 | 77 | 0.197 | 28 | 72 |
| B71 | TM71 | 802 | 0.0 | 12 | 600 | 793 to 810 | −3.0 | 12 | 608 | 71 | 0.149 | 33 | 67 |
| B72 | TM72 | 804 | −0.1 | 12 | 605 | 796 to 812 | −3.2 | 12 | 603 | 17 | 0.237 | 31 | 69 |

| | | Oxides in B layer and contents of elements | | | | | | | | | |
|---|---|---|---|---|---|---|---|---|---|---|---|
| Level | Cold rolled steel sheet | C content [%] | Si content [%] | Mn content [%] | P content [%] | S content [%] | Al content [%] | Ti, Nb, Cr, Mo, Ni, Cu, Zr, V, W, B, Ca content [%] | Alloying treatment | Evaluation Wettability | Adhesion | Remarks |
| B1 | TM1 | 0.0003 | 0.0007 | 0.0007 | 0.0009 | 0.0001 | 0.0003 | | Yes | Good | Good | Inv. ex. |
| B2 | TM2 | 0.0002 | 0.0004 | 0.0004 | 0.0010 | 0.0003 | 0.0001 | | Yes | Good | Good | Inv. ex. |
| B3 | TM3 | 0.0003 | 0.0009 | 0.0008 | 0.0003 | 0.0007 | 0.0001 | | Yes | Good | Good | Inv. ex. |
| B4 | TM4 | 0.0005 | 0.0005 | 0.0009 | 0.0008 | 0.0001 | 0.0007 | | Yes | Good | Very good | Inv. ex. |
| B5 | TM5 | 0.0007 | 0.0002 | 0.0003 | 0.0002 | 0.0006 | 0.0001 | | Yes | Good | Good | Inv. ex. |
| B6 | TM6 | 0.0007 | 0.0005 | 0.0004 | 0.0009 | 0.0008 | 0.0007 | | Yes | Good | Good | Inv. ex. |
| B7 | TM7 | 0.0003 | 0.0009 | 0.0008 | 0.0006 | 0.0000 | 0.0008 | | Yes | Good | Good | Inv. ex. |
| B8 | TM8 | 0.0008 | 0.0007 | 0.0001 | 0.0003 | 0.0004 | 0.0004 | | Yes | Good | Good | Inv. ex. |
| B9 | TM9 | 0.0005 | 0.0003 | 0.0007 | 0.0004 | 0.0000 | 0.0004 | | Yes | Good | Good | Inv. ex. |
| B10 | TM10 | 0.0005 | 0.0003 | 0.0009 | 0.0007 | 0.0009 | 0.0008 | | No | Good | Good | Inv. ex. |
| B11 | TM11 | 0.0002 | 0.0002 | 0.0006 | 0.0002 | 0.0010 | 0.0000 | | Yes | Good | Good | Inv. ex. |
| B12 | TM12 | 0.0002 | 0.0005 | 0.0006 | 0.0010 | 0.0009 | 0.0009 | | Yes | Good | Good | Inv. ex. |
| B13 | TM13 | 0.0002 | 0.0004 | 0.0006 | 0.0010 | 0.0005 | 0.0000 | | Yes | Good | Good | Inv. ex. |
| B14 | TM14 | 0.0002 | 0.0001 | 0.0010 | 0.0009 | 0.0006 | 0.0008 | | Yes | Good | Good | Inv. ex. |
| B15 | TM15 | 0.0006 | 0.0006 | 0.0005 | 0.0006 | 0.0005 | 0.0005 | | Yes | Good | Good | Inv. ex. |
| B16 | TM16 | 0.0005 | 0.0003 | 0.0005 | 0.0008 | 0.0002 | 0.0009 | | Yes | Good | Good | Inv. ex. |
| B17 | TM17 | 0.0007 | 0.0009 | 0.0008 | 0.0000 | 0.0004 | 0.0004 | | Yes | Good | Good | Inv. ex. |
| B18 | TM18 | 0.0008 | 0.0004 | 0.0001 | 0.0007 | 0.0002 | 0.0003 | | Yes | Good | Very good | Inv. ex. |
| B19 | TM19 | 0.0009 | 0.0001 | 0.0007 | 0.0007 | 0.0002 | 0.0004 | | Yes | Good | Good | Inv. ex. |
| B20 | TM20 | 0.0008 | 0.0001 | 0.0002 | 0.0008 | 0.0002 | 0.0006 | | No | Good | Good | Inv. ex. |
| B21 | TM21 | 0.0006 | 0.0001 | 0.0000 | 0.0009 | 0.0008 | 0.0004 | | Yes | Good | Good | Inv. ex. |
| B22 | TM22 | 0.0005 | 0.0001 | 0.0004 | 0.0009 | 0.0007 | 0.0001 | | Yes | Good | Good | Inv. ex. |
| B23 | TM23 | 0.0005 | 0.0004 | 0.0007 | 0.0007 | 0.0002 | 0.0007 | | Yes | Good | Good | Inv. ex. |
| B24 | TM24 | 0.0005 | 0.0003 | 0.0003 | 0.0002 | 0.0006 | 0.0002 | | Yes | Good | Good | Inv. ex. |
| B25 | TM25 | 0.0004 | 0.0004 | 0.0001 | 0.0008 | 0.0008 | 0.0005 | | Yes | Good | Good | Inv. ex. |
| B26 | TM26 | 0.0008 | 0.0003 | 0.0005 | 0.0006 | 0.0009 | 0.0007 | | Yes | Good | Good | Inv. ex. |
| B27 | TM27 | 0.0001 | 0.0010 | 0.0010 | 0.0009 | 0.0007 | 0.0008 | | Yes | Good | Good | Inv. ex. |
| B28 | TM28 | 0.0008 | 0.0009 | 0.0000 | 0.0005 | 0.0009 | 0.0006 | | Yes | Good | Good | Inv. ex. |
| B29 | TM29 | 0.0008 | 0.0010 | 0.0006 | 0.0008 | 0.0005 | 0.0001 | | Yes | Good | Good | Inv. ex. |
| B30 | TM30 | 0.0002 | 0.0007 | 0.0009 | 0.0000 | 0.0005 | 0.0002 | | No | Good | Good | Inv. ex. |
| B31 | TM31 | 0.0005 | 0.0005 | 0.0010 | 0.0001 | 0.0001 | 0.0001 | | Yes | Good | Good | Inv. ex. |
| B32 | TM32 | 0.0008 | 0.0008 | 0.0004 | 0.0009 | 0.0003 | 0.0009 | | Yes | Good | Good | Inv. ex. |
| B33 | TM33 | 0.0000 | 0.0003 | 0.0010 | 0.0005 | 0.0004 | 0.0008 | | Yes | Good | Good | Inv. ex. |
| B34 | TM34 | 0.0008 | 0.0001 | 0.0010 | 0.0001 | 0.0001 | 0.0003 | | Yes | Good | Good | Inv. ex. |
| B35 | TM35 | 0.0001 | 0.0005 | 0.0007 | 0.0004 | 0.0005 | 0.0003 | | Yes | Good | Good | Inv. ex. |
| B36 | TM36 | 0.0009 | 0.0000 | 0.0008 | 0.0008 | 0.0007 | 0.0007 | | Yes | Good | Good | Inv. ex. |
| B37 | TM37 | 0.0001 | 0.0008 | 0.0005 | 0.0003 | 0.0005 | 0.0009 | | Yes | Good | Good | Inv. ex. |
| B38 | TM38 | 0.0004 | 0.0005 | 0.0007 | 0.0003 | 0.0008 | 0.0002 | | Yes | Good | Good | Inv. ex. |
| B39 | TM39 | 0.0003 | 0.0002 | 0.0009 | 0.0008 | 0.0004 | 0.0004 | | Yes | Good | Good | Inv. ex. |
| B40 | TM40 | 0.0009 | 0.0007 | 0.0001 | 0.0009 | 0.0004 | 0.0004 | | No | Good | Good | Inv. ex. |
| B41 | TM41 | 0.0005 | 0.0002 | 0.0008 | 0.0006 | 0.0007 | 0.0007 | | Yes | Good | Very good | Inv. ex. |
| B42 | TM42 | 0.0003 | 0.0005 | 0.0009 | 0.0001 | 0.0003 | 0.0009 | | Yes | Good | Good | Inv. ex. |
| B43 | TM43 | 0.0004 | 0.0004 | 0.0007 | 0.0001 | 0.0003 | 0.0008 | | Yes | Good | Very good | Inv. ex. |
| B44 | TM44 | 0.0009 | 0.0007 | 0.0004 | 0.0005 | 0.0010 | 0.0007 | | Yes | Good | Good | Inv. ex. |
| B45 | TM45 | 0.0006 | 0.0003 | 0.0001 | 0.0008 | 0.0007 | 0.0005 | | Yes | Good | Good | Inv. ex. |
| B46 | TM46 | 0.0005 | 0.0000 | 0.0002 | 0.0003 | 0.0006 | 0.0009 | | Yes | Good | Good | Inv. ex. |
| B47 | TM47 | 0.0008 | 0.0008 | 0.0003 | 0.0002 | 0.0002 | 0.0007 | | Yes | Good | Good | Inv. ex. |
| B48 | TM48 | 0.0002 | 0.0006 | 0.0004 | 0.0001 | 0.0008 | 0.0003 | | Yes | Good | Good | Inv. ex. |
| B49 | TM49 | 0.0005 | 0.0000 | 0.0005 | 0.0000 | 0.0009 | 0.0003 | | Yes | Good | Good | Inv. ex. |
| B50 | TM50 | 0.0008 | 0.0002 | 0.0002 | 0.0008 | 0.0008 | 0.0002 | | No | Good | Good | Inv. ex. |
| B51 | TM51 | 0.0001 | 0.0008 | 0.0009 | 0.0008 | 0.0002 | 0.0006 | 0.00002 | Yes | Good | Good | Inv. ex. |
| B52 | TM52 | 0.0009 | 0.0004 | 0.0007 | 0.0008 | 0.0003 | 0.0005 | 0.00006 | Yes | Good | Good | Inv. ex. |
| B53 | TM53 | 0.0002 | 0.0000 | 0.0004 | 0.0009 | 0.0007 | 0.0008 | 0.00005 | Yes | Good | Good | Inv. ex. |
| B54 | TM54 | 0.0000 | 0.0001 | 0.0001 | 0.0007 | 0.0008 | 0.0003 | 0.00001 | Yes | Good | Good | Inv. ex. |
| B55 | TM55 | 0.0008 | 0.0006 | 0.0008 | 0.0001 | 0.0001 | 0.0008 | 0.00006 | Yes | Good | Good | Inv. ex. |
| B56 | TM56 | 0.0001 | 0.0002 | 0.0002 | 0.0005 | 0.0005 | 0.0005 | 0.00002 | Yes | Good | Good | Inv. ex. |
| B57 | TM57 | 0.0000 | 0.0009 | 0.0003 | 0.0007 | 0.0001 | 0.0010 | 0.00004 | Yes | Good | Good | Inv. ex. |

TABLE 3-continued

Recrystallization and Annealing Conditions, Surface Structure, Plating Wettability, and Plating Adhesion

| | | | | | | | | | | | | |
|---|---|---|---|---|---|---|---|---|---|---|---|---|
| B58 | TM58 | 0.0008 | 0.0000 | 0.0008 | 0.0004 | 0.0003 | 0.0009 | 0.00002 | Yes | Good | Good | Inv. ex. |
| B59 | TM59 | 0.0008 | 0.0003 | 0.0005 | 0.0001 | 0.0009 | 0.0001 | 0.00009 | Yes | Good | Good | Inv. ex. |
| B60 | TM60 | 0.0007 | 0.0009 | 0.0003 | 0.0003 | 0.0007 | 0.0000 | 0.00003 | No | Good | Good | Inv. ex. |
| B61 | TM61 | 0.0006 | 0.0003 | 0.0003 | 0.0009 | 0.0007 | 0.0010 | 0.00004 | Yes | Good | Good | Inv. ex. |
| B62 | TM62 | 0.0004 | 0.0003 | 0.0008 | 0.0001 | 0.0005 | 0.0000 | 0.00009 | Yes | Good | Good | Inv. ex. |
| B63 | TM63 | 0.0007 | 0.0009 | 0.0007 | 0.0006 | 0.0007 | 0.0005 | 0.00010 | Yes | Good | Good | Inv. ex. |
| B64 | TM64 | 0.0005 | 0.0001 | 0.0008 | 0.0003 | 0.0007 | 0.0005 | 0.00004 | Yes | Good | Good | Inv. ex. |
| B65 | TM65 | 0.0002 | 0.0004 | 0.0008 | 0.0008 | 0.0002 | 0.0005 | 0.00001 | Yes | Good | Good | Inv. ex. |
| B66 | TM66 | 0.0005 | 0.0005 | 0.0006 | 0.0010 | 0.0009 | 0.0003 | 0.00009 | Yes | Good | Good | Inv. ex. |
| B67 | TM67 | 0.0008 | 0.0006 | 0.0009 | 0.0000 | 0.0002 | 0.0010 | 0.00003 | Yes | Good | Good | Inv. ex. |
| B68 | TM68 | 0.0008 | 0.0006 | 0.0009 | 0.0007 | 0.0008 | 0.0002 | 0.00006 | Yes | Good | Very good | Inv. ex. |
| B69 | TM69 | 0.0003 | 0.0010 | 0.0009 | 0.0001 | 0.0009 | 0.0010 | 0.00004 | Yes | Good | Good | Inv. ex. |
| B70 | TM70 | 0.0004 | 0.0007 | 0.0009 | 0.0005 | 0.0007 | 0.0001 | 0.00003 | No | Good | Good | Inv. ex. |
| B71 | TM71 | 0.0006 | 0.0000 | 0.0006 | 0.0002 | 0.0002 | 0.0005 | 0.00003 | Yes | Good | Good | Inv. ex. |
| B72 | TM72 | 0.0008 | 0.0008 | 0.0008 | 0.0008 | 0.0007 | 0.0001 | 0.00005 | Yes | Good | Good | Inv. ex. |

TABLE 4

Recrystallization and Annealing Conditions, Surface Structure, Plating Wettability, and Plating Adhesion

| | | Recrystallization and annealing conditions | | | | | | | | | | | | |
|---|---|---|---|---|---|---|---|---|---|---|---|---|---|---|
| | | Heating furnace | | | | Soaking furnace | | | | | | Oxides in B layer and contents of elements | | | |
| Level | Cold rolled steel sheet | Peak sheet temp. [° C.] | O potential logPH$_2$O/PH$_2$ | H conc. [vol %] | Time in 500° C. to 950° C. temp. range [s] | Sheet temp. range [° C.] | O potential logPH$_2$O/PH$_2$ | H conc. [vol %] | Time in 500° C. to 950° C. temp. range [s] | A layer thick. [μm] | B layer thick. [μm] | Oxide content [%] | Fe content [%] | C content [%] | Si content [%] |
| C1 | TM1 | 903 | −1.5 | 23 | 306 | 894 to 910 | −2.4 | 23 | 204 | 79 | 0.294 | 13 | 87 | 0.0006 | 0.0002 |
| C2 | TM2 | 900 | −1.4 | 19 | 300 | 892 to 911 | −2.6 | 19 | 205 | 41 | 0.258 | 16 | 84 | 0.0001 | 0.0010 |
| C3 | TM3 | 902 | −1.6 | 21 | 303 | 894 to 912 | −2.6 | 21 | 202 | 49 | 0.153 | 19 | 81 | 0.0000 | 0.0003 |
| C4 | TM4 | 902 | −1.4 | 14 | 300 | 896 to 907 | −2.4 | 14 | 203 | 45 | 0.026 | 17 | 83 | 0.0009 | 0.0008 |
| C5 | TM5 | 902 | −1.3 | 14 | 296 | 895 to 907 | −2.5 | 14 | 200 | 86 | 0.284 | 14 | 86 | 0.0008 | 0.0005 |
| C6 | TM6 | 905 | −1.4 | 13 | 298 | 898 to 907 | −2.7 | 13 | 197 | 66 | 0.274 | 12 | 88 | 0.0004 | 0.0008 |
| C7 | TM7 | 901 | −1.6 | 12 | 293 | 891 to 913 | −2.3 | 12 | 203 | 34 | 0.184 | 18 | 82 | 0.0009 | 0.0009 |
| C8 | TM8 | 900 | −1.5 | 15 | 294 | 895 to 914 | −2.6 | 15 | 194 | 59 | 0.235 | 19 | 81 | 0.0003 | 0.0010 |
| C9 | TM9 | 901 | −1.7 | 19 | 302 | 893 to 912 | −2.5 | 19 | 203 | 80 | 0.144 | 19 | 81 | 0.0003 | 0.0005 |
| C10 | TM10 | 901 | −1.4 | 24 | 295 | 898 to 909 | −2.6 | 24 | 206 | 88 | 0.111 | 14 | 86 | 0.0001 | 0.0007 |
| C11 | TM11 | 902 | −1.6 | 18 | 297 | 892 to 914 | −2.4 | 18 | 199 | 15 | 0.247 | 19 | 81 | 0.0007 | 0.0005 |
| C12 | TM12 | 902 | −1.5 | 17 | 298 | 895 to 911 | −2.4 | 17 | 206 | 79 | 0.193 | 16 | 84 | 0.0001 | 0.0009 |
| C13 | TM13 | 900 | −1.4 | 12 | 297 | 896 to 908 | −2.7 | 12 | 194 | 60 | 0.115 | 14 | 86 | 0.0005 | 0.0005 |
| C14 | TM14 | 901 | −1.8 | 21 | 309 | 892 to 911 | −2.5 | 21 | 197 | 21 | 0.185 | 17 | 83 | 0.0003 | 0.0007 |
| C15 | TM15 | 902 | −1.6 | 15 | 304 | 895 to 915 | −2.7 | 15 | 199 | 32 | 0.169 | 14 | 86 | 0.0001 | 0.0006 |
| C16 | TM16 | 901 | −1.4 | 14 | 295 | 894 to 913 | −2.5 | 14 | 201 | 65 | 0.136 | 11 | 89 | 0.0005 | 0.0006 |
| C17 | TM17 | 904 | −1.6 | 16 | 297 | 894 to 907 | −2.6 | 16 | 207 | 30 | 0.116 | 16 | 84 | 0.0003 | 0.0006 |
| C18 | TM18 | 901 | −1.4 | 18 | 304 | 897 to 909 | −2.8 | 18 | 200 | 58 | 0.205 | 16 | 84 | 0.0010 | 0.0006 |
| C19 | TM19 | 904 | −1.6 | 23 | 303 | 895 to 907 | −2.4 | 23 | 200 | 74 | 0.067 | 11 | 89 | 0.0004 | 0.0010 |
| C20 | TM20 | 902 | −1.7 | 10 | 302 | 892 to 909 | −2.4 | 10 | 200 | 12 | 0.291 | 10 | 90 | 0.0009 | 0.0006 |
| C21 | TM21 | 900 | −1.3 | 20 | 303 | 397 to 906 | −2.6 | 20 | 201 | 54 | 0.145 | 15 | 85 | 0.0005 | 0.0001 |
| C22 | TM22 | 903 | −1.5 | 20 | 301 | 900 to 911 | −2.5 | 20 | 202 | 23 | 0.236 | 14 | 86 | 0.0002 | 0.0010 |
| C23 | TM23 | 904 | −1.5 | 20 | 304 | 897 to 914 | −2.5 | 20 | 201 | 27 | 0.271 | 12 | 88 | 0.0003 | 0.0006 |
| C24 | TM24 | 902 | −1.5 | 18 | 301 | 897 to 910 | −2.6 | 18 | 196 | 64 | 0.179 | 20 | 80 | 0.0006 | 0.0008 |
| C25 | TM25 | 903 | −1.4 | 22 | 300 | 895 to 907 | −2.5 | 22 | 207 | 79 | 0.257 | 10 | 90 | 0.0004 | 0.0009 |
| C26 | TM26 | 904 | −1.3 | 24 | 295 | 899 to 907 | −2.7 | 24 | 204 | 61 | 0.231 | 17 | 83 | 0.0008 | 0.0001 |
| C27 | TM27 | 903 | −1.7 | 18 | 303 | 897 to 906 | −2.6 | 18 | 200 | 60 | 0.120 | 11 | 89 | 0.0006 | 0.0003 |
| C28 | TM28 | 901 | −1.6 | 20 | 300 | 896 to 908 | −2.5 | 20 | 202 | 86 | 0.099 | 13 | 87 | 0.0010 | 0.0008 |
| C29 | TM29 | 900 | −1.4 | 20 | 299 | 899 to 911 | −2.4 | 20 | 205 | 22 | 0.201 | 13 | 87 | 0.0001 | 0.0001 |
| C30 | TM30 | 901 | −1.5 | 16 | 298 | 898 to 913 | −2.3 | 16 | 197 | 40 | 0.163 | 12 | 88 | 0.0003 | 0.0002 |
| C31 | TM31 | 903 | −1.5 | 15 | 301 | 897 to 911 | −2.6 | 15 | 200 | 11 | 0.198 | 12 | 88 | 0.0001 | 0.0003 |
| C32 | TM32 | 904 | −1.7 | 13 | 297 | 896 to 906 | −2.6 | 13 | 194 | 36 | 0.179 | 15 | 85 | 0.0006 | 0.0008 |
| C33 | TM33 | 901 | −1.5 | 16 | 299 | 896 to 907 | −2.5 | 16 | 197 | 42 | 0.289 | 19 | 81 | 0.0008 | 0.0008 |
| C34 | TM34 | 904 | −1.7 | 11 | 305 | 892 to 910 | −2.5 | 11 | 201 | 37 | 0.127 | 16 | 84 | 0.0006 | 0.0005 |
| C35 | TM35 | 902 | −1.7 | 14 | 303 | 893 to 908 | −2.5 | 14 | 199 | 22 | 0.228 | 11 | 89 | 0.0002 | 0.0004 |
| C36 | TM36 | 904 | −1.7 | 17 | 299 | 897 to 906 | −2.6 | 17 | 204 | 48 | 0.193 | 15 | 85 | 0.0007 | 0.0003 |
| C37 | TM37 | 904 | −1.6 | 20 | 292 | 898 to 911 | −2.4 | 20 | 205 | 46 | 0.015 | 19 | 81 | 0.0009 | 0.0000 |
| C38 | TM38 | 903 | −1.6 | 15 | 296 | 899 to 913 | −2.6 | 15 | 207 | 86 | 0.023 | 12 | 88 | 0.0002 | 0.0001 |
| C39 | TM39 | 901 | −1.7 | 21 | 300 | 894 to 912 | −2.5 | 21 | 207 | 47 | 0.036 | 18 | 82 | 0.0001 | 0.0008 |
| C40 | TM40 | 903 | −1.5 | 20 | 302 | 891 to 914 | −2.4 | 20 | 204 | 78 | 0.049 | 16 | 84 | 0.0003 | 0.0004 |
| C41 | TM41 | 905 | −1.7 | 23 | 300 | 897 to 908 | −2.3 | 23 | 198 | 29 | 0.095 | 12 | 88 | 0.0003 | 0.0009 |

TABLE 4-continued

Recrystallization and Annealing Conditions, Surface Structure, Plating Wettability, and Plating Adhesion

| | | | | | | | | | | | | | | |
|---|---|---|---|---|---|---|---|---|---|---|---|---|---|---|
| C42 | TM42 | 902 | −1.6 | 18 | 299 | 898 to 911 | −2.6 | 18 | 198 | 45 | 0.144 | 17 | 83 | 0.0004 | 0.0010 |
| C43 | TM43 | 901 | −1.3 | 19 | 294 | 897 to 912 | −2.5 | 19 | 208 | 73 | 0.021 | 10 | 90 | 0.0009 | 0.0003 |
| C44 | TM44 | 903 | −1.6 | 21 | 303 | 890 to 909 | −2.6 | 21 | 193 | 68 | 0.048 | 14 | 86 | 0.0005 | 0.0002 |
| C45 | TM45 | 903 | −1.5 | 21 | 297 | 897 to 911 | −2.7 | 21 | 194 | 25 | 0.113 | 13 | 87 | 0.0005 | 0.0010 |
| C46 | TM46 | 903 | −1.4 | 18 | 306 | 893 to 908 | −2.5 | 18 | 200 | 48 | 0.288 | 19 | 81 | 0.0002 | 0.0003 |
| C47 | TM47 | 901 | −1.4 | 15 | 306 | 895 to 909 | −2.6 | 15 | 200 | 25 | 0.219 | 16 | 84 | 0.0005 | 0.0001 |
| C48 | TM48 | 904 | −1.6 | 16 | 300 | 894 to 909 | −2.6 | 16 | 196 | 25 | 0.068 | 14 | 86 | 0.0009 | 0.0002 |
| C49 | TM49 | 902 | −1.6 | 14 | 297 | 898 to 905 | −2.5 | 14 | 200 | 29 | 0.034 | 18 | 82 | 0.0000 | 0.0009 |
| C50 | TM50 | 903 | −1.5 | 16 | 294 | 899 to 905 | −2.4 | 16 | 200 | 34 | 0.199 | 17 | 83 | 0.0004 | 0.0000 |
| C51 | TM51 | 903 | −1.3 | 11 | 299 | 893 to 910 | −2.6 | 11 | 196 | 85 | 0.169 | 15 | 85 | 0.0002 | 0.0000 |
| C52 | TM52 | 900 | −1.4 | 15 | 299 | 891 to 909 | −2.5 | 15 | 203 | 29 | 0.193 | 19 | 81 | 0.0009 | 0.0002 |
| C53 | TM53 | 904 | −1.3 | 15 | 307 | 893 to 915 | −2.5 | 15 | 192 | 18 | 0.209 | 19 | 81 | 0.0004 | 0.0005 |
| C54 | TM54 | 901 | −1.5 | 17 | 299 | 891 to 910 | −2.8 | 17 | 203 | 78 | 0.192 | 13 | 87 | 0.0002 | 0.0002 |
| C55 | TM55 | 902 | −1.6 | 17 | 293 | 893 to 911 | −2.6 | 17 | 200 | 83 | 0.015 | 19 | 81 | 0.0005 | 0.0008 |
| C56 | TM56 | 901 | −1.3 | 18 | 298 | 899 to 909 | −2.4 | 18 | 203 | 31 | 0.241 | 12 | 80 | 0.0003 | 0.0005 |
| C57 | TM57 | 901 | −1.6 | 21 | 298 | 892 to 911 | −2.6 | 21 | 199 | 44 | 0.110 | 18 | 82 | 0.0007 | 0.0009 |
| C58 | TM58 | 901 | −1.7 | 15 | 302 | 891 to 910 | −2.6 | 15 | 197 | 54 | 0.172 | 18 | 82 | 0.0010 | 0.0002 |
| C59 | TM59 | 901 | −1.3 | 22 | 301 | 893 to 912 | −2.3 | 22 | 203 | 69 | 0.035 | 12 | 88 | 0.0000 | 0.0005 |
| C60 | TM60 | 901 | −1.5 | 22 | 295 | 892 to 906 | −2.7 | 22 | 205 | 72 | 0.201 | 10 | 90 | 0.0003 | 0.0004 |
| C61 | TM61 | 901 | −1.5 | 18 | 301 | 899 to 914 | −2.3 | 18 | 203 | 43 | 0.296 | 11 | 89 | 0.0009 | 0.0009 |
| C62 | TM62 | 901 | −1.5 | 12 | 305 | 891 to 908 | −2.6 | 12 | 205 | 34 | 0.131 | 12 | 88 | 0.0002 | 0.0002 |
| C63 | TM63 | 903 | −1.5 | 18 | 300 | 895 to 914 | −2.5 | 18 | 196 | 75 | 0.295 | 13 | 87 | 0.0010 | 0.0004 |
| C64 | TM64 | 901 | −1.3 | 18 | 298 | 898 to 910 | −2.6 | 18 | 202 | 14 | 0.093 | 13 | 87 | 0.0005 | 0.0008 |
| C65 | TM65 | 901 | −1.4 | 15 | 302 | 893 to 908 | −2.7 | 15 | 203 | 49 | 0.119 | 10 | 90 | 0.0007 | 0.0004 |
| C66 | TM66 | 903 | −1.6 | 16 | 297 | 899 to 912 | −2.5 | 16 | 196 | 24 | 0.179 | 15 | 85 | 0.0003 | 0.0008 |
| C67 | TM67 | 904 | −1.5 | 23 | 298 | 895 to 907 | −2.5 | 23 | 192 | 77 | 0.078 | 14 | 86 | 0.0007 | 0.0001 |
| C68 | TM68 | 903 | −1.5 | 19 | 302 | 900 to 913 | −2.6 | 19 | 201 | 74 | 0.109 | 13 | 87 | 0.0000 | 0.0009 |
| C69 | TM69 | 903 | −1.3 | 19 | 294 | 891 to 912 | −2.6 | 19 | 194 | 54 | 0.021 | 14 | 86 | 0.0000 | 0.0000 |
| C70 | TM70 | 903 | −1.5 | 13 | 303 | 893 to 907 | −2.5 | 13 | 196 | 56 | 0.190 | 19 | 81 | 0.0007 | 0.0003 |
| C71 | TM71 | 902 | −1.5 | 13 | 300 | 896 to 913 | −2.4 | 13 | 199 | 23 | 0.258 | 14 | 86 | 0.0001 | 0.0002 |
| C72 | TM72 | 900 | −1.4 | 21 | 293 | 895 to 911 | −2.7 | 21 | 203 | 74 | 0.131 | 16 | 84 | 0.0004 | 0.0001 |

| Level | Cold rolled steel sheet | Mn content [%] | P content [%] | S content [%] | Al content [%] | Ti, Nb, Cr, Mo, Ni, Cu, Zr, V, W, B, Ca content [%] | Alloying treatment | Evaluation Wettability | Adhesion | Remarks |
|---|---|---|---|---|---|---|---|---|---|---|
| C1 | TM1 | 0.0001 | 0.0008 | 0.0002 | 0.0004 | | Yes | Good | Very good | Inv. ex. |
| C2 | TM2 | 0.0001 | 0.0003 | 0.0010 | 0.0004 | | Yes | Good | Very good | Inv. ex. |
| C3 | TM3 | 0.0004 | 0.0003 | 0.0006 | 0.0002 | | Yes | Good | Very good | Inv. ex. |
| C4 | TM4 | 0.0010 | 0.0009 | 0.0009 | 0.0006 | | Yes | Good | Very good | Inv. ex. |
| C5 | TM5 | 0.0010 | 0.0001 | 0.0009 | 0.0004 | | Yes | Good | Good | Inv. ex. |
| C6 | TM6 | 0.0001 | 0.0002 | 0.0002 | 0.0008 | | Yes | Good | Very good | Inv. ex. |
| C7 | TM7 | 0.0003 | 0.0006 | 0.0004 | 0.0001 | | Yes | Good | Very good | Inv. ex. |
| C8 | TM8 | 0.0004 | 0.0010 | 0.0003 | 0.0005 | | Yes | Good | Very good | Inv. ex. |
| C9 | TM9 | 0.0007 | 0.0001 | 0.0005 | 0.0004 | | Yes | Good | Very good | Inv. ex. |
| C10 | TM10 | 0.0000 | 0.0007 | 0.0003 | 0.0006 | | No | Good | Very good | Inv. ex. |
| C11 | TM11 | 0.0008 | 0.0002 | 0.0009 | 0.0000 | | Yes | Good | Very good | Inv. ex. |
| C12 | TM12 | 0.0006 | 0.0007 | 0.0009 | 0.0007 | | Yes | Good | Good | Inv. ex. |
| C13 | TM13 | 0.0001 | 0.0004 | 0.0006 | 0.0010 | | Yes | Good | Very good | Inv. ex. |
| C14 | TM14 | 0.0002 | 0.0007 | 0.0006 | 0.0001 | | Yes | Good | Very good | Inv. ex. |
| C15 | TM15 | 0.0009 | 0.0005 | 0.0008 | 0.0008 | | Yes | Good | Very good | Inv. ex. |
| C16 | TM16 | 0.0000 | 0.0006 | 0.0010 | 0.0009 | | Yes | Good | Very good | Inv. ex. |
| C17 | TM17 | 0.0005 | 0.0005 | 0.0007 | 0.0010 | | Yes | Good | Very good | Inv. ex. |
| C18 | TM18 | 0.0007 | 0.0006 | 0.0006 | 0.0008 | | Yes | Good | Very good | Inv. ex. |
| C19 | TM19 | 0.0003 | 0.0006 | 0.0007 | 0.0001 | | Yes | Good | Good | Inv. ex. |
| C20 | TM20 | 0.0002 | 0.0008 | 0.0007 | 0.0006 | | No | Good | Very good | Inv. ex. |
| C21 | TM21 | 0.0002 | 0.0003 | 0.0005 | 0.0008 | | Yes | Good | Very good | Inv. ex. |
| C22 | TM22 | 0.0008 | 0.0002 | 0.0006 | 0.0001 | | Yes | Good | Good | Inv. ex. |
| C23 | TM23 | 0.0002 | 0.0001 | 0.0004 | 0.0007 | | Yes | Good | Very good | Inv. ex. |
| C24 | TM24 | 0.0006 | 0.0003 | 0.0006 | 0.0005 | | Yes | Good | Very good | Inv. ex. |
| C25 | TM25 | 0.0008 | 0.0004 | 0.0004 | 0.0008 | | Yes | Good | Very good | Inv. ex. |
| C26 | TM26 | 0.0006 | 0.0008 | 0.0009 | 0.0007 | | Yes | Good | Very good | Inv. ex. |
| C27 | TM27 | 0.0001 | 0.0008 | 0.0000 | 0.0004 | | Yes | Good | Very good | Inv. ex. |
| C28 | TM28 | 0.0008 | 0.0008 | 0.0009 | 0.0009 | | Yes | Good | Very good | Inv. ex. |
| C29 | TM29 | 0.0007 | 0.0006 | 0.0005 | 0.0005 | | Yes | Good | Very good | Inv. ex. |
| C30 | TM30 | 0.0001 | 0.0001 | 0.0006 | 0.0000 | | No | Good | Very good | Inv. ex. |
| C31 | TM31 | 0.0005 | 0.0002 | 0.0010 | 0.0006 | | Yes | Good | Very good | Inv. ex. |
| C32 | TM32 | 0.0006 | 0.0004 | 0.0010 | 0.0009 | | Yes | Good | Very good | Inv. ex. |
| C33 | TM33 | 0.0002 | 0.0007 | 0.0000 | 0.0006 | | Yes | Good | Very good | Inv. ex. |
| C34 | TM34 | 0.0008 | 0.0007 | 0.0009 | 0.0000 | | Yes | Good | Very good | Inv. ex. |

TABLE 4-continued

Recrystallization and Annealing Conditions, Surface Structure, Plating Wettability, and Plating Adhesion

| | | | | | | | | | | |
|---|---|---|---|---|---|---|---|---|---|---|
| C35 | TM35 | 0.0005 | 0.0002 | 0.0007 | 0.0001 | | Yes | Good | Very good | Inv. ex. |
| C36 | TM36 | 0.0004 | 0.0003 | 0.0003 | 0.0005 | | Yes | Good | Very good | Inv. ex. |
| C37 | TM37 | 0.0006 | 0.0003 | 0.0006 | 0.0005 | | Yes | Good | Very good | Inv. ex. |
| C38 | TM38 | 0.0003 | 0.0007 | 0.0005 | 0.0002 | | Yes | Good | Very good | Inv. ex. |
| C39 | TM39 | 0.0003 | 0.0006 | 0.0006 | 0.0008 | | Yes | Good | Very good | Inv. ex. |
| C40 | TM40 | 0.0008 | 0.0001 | 0.0004 | 0.0006 | | No | Good | Very good | Inv. ex. |
| C41 | TM41 | 0.0001 | 0.0004 | 0.0002 | 0.0002 | | Yes | Good | Very good | Inv. ex. |
| C42 | TM42 | 0.0005 | 0.0009 | 0.0002 | 0.0003 | | Yes | Good | Very good | Inv. ex. |
| C43 | TM43 | 0.0004 | 0.0002 | 0.0004 | 0.0007 | | Yes | Good | Very good | Inv. ex. |
| C44 | TM44 | 0.0007 | 0.0006 | 0.0006 | 0.0003 | | Yes | Good | Very good | Inv. ex. |
| C45 | TM45 | 0.0000 | 0.0005 | 0.0009 | 0.0000 | | Yes | Good | Very good | Inv. ex. |
| C46 | TM46 | 0.0009 | 0.0005 | 0.0003 | 0.0004 | | Yes | Good | Very good | Inv. ex. |
| C47 | TM47 | 0.0002 | 0.0003 | 0.0005 | 0.0008 | | Yes | Good | Very good | Inv. ex. |
| C48 | TM48 | 0.0003 | 0.0010 | 0.0003 | 0.0007 | | Yes | Good | Very good | Inv. ex. |
| C49 | TM49 | 0.0005 | 0.0003 | 0.0007 | 0.0004 | | Yes | Good | Very good | Inv. ex. |
| C50 | TM50 | 0.0003 | 0.0004 | 0.0001 | 0.0003 | | No | Good | Very good | Inv. ex. |
| C51 | TM51 | 0.0003 | 0.0004 | 0.0001 | 0.0003 | 0.00007 | Yes | Good | Very good | Inv. ex. |
| C52 | TM52 | 0.0007 | 0.0003 | 0.0006 | 0.0002 | 0.00006 | Yes | Good | Very good | Inv. ex. |
| C53 | TM53 | 0.0009 | 0.0010 | 0.0009 | 0.0003 | 0.00010 | Yes | Good | Good | Inv. ex. |
| C54 | TM54 | 0.0010 | 0.0003 | 0.0001 | 0.0007 | 0.00008 | Yes | Good | Very good | Inv. ex. |
| C55 | TM55 | 0.0007 | 0.0003 | 0.0003 | 0.0003 | 0.00006 | Yes | Good | Very good | Inv. ex. |
| C56 | TM56 | 0.0007 | 0.0002 | 0.0004 | 0.0001 | 0.00002 | Yes | Good | Very good | Inv. ex. |
| C57 | TM57 | 0.0003 | 0.0004 | 0.0004 | 0.0009 | 0.00008 | Yes | Good | Very good | Inv. ex. |
| C58 | TM58 | 0.0009 | 0.0000 | 0.0003 | 0.0001 | 0.00005 | Yes | Good | Very good | Inv. ex. |
| C59 | TM59 | 0.0009 | 0.0003 | 0.0008 | 0.0002 | 0.00008 | Yes | Good | Very good | Inv. ex. |
| C60 | TM60 | 0.0005 | 0.0008 | 0.0005 | 0.0001 | 0.00005 | No | Good | Very good | Inv. ex. |
| C61 | TM61 | 0.0000 | 0.0001 | 0.0001 | 0.0002 | 0.00007 | Yes | Good | Very good | Inv. ex. |
| C62 | TM62 | 0.0003 | 0.0005 | 0.0010 | 0.0006 | 0.00000 | Yes | Good | Very good | Inv. ex. |
| C63 | TM63 | 0.0001 | 0.0001 | 0.0005 | 0.0003 | 0.00005 | Yes | Good | Very good | Inv. ex. |
| C64 | TM64 | 0.0006 | 0.0003 | 0.0008 | 0.0008 | 0.00001 | Yes | Good | Very good | Inv. ex. |
| C65 | TM65 | 0.0004 | 0.0010 | 0.0009 | 0.0001 | 0.00002 | Yes | Good | Good | Inv. ex. |
| C66 | TM66 | 0.0010 | 0.0006 | 0.0008 | 0.0002 | 0.00009 | Yes | Good | Very good | Inv. ex. |
| C67 | TM67 | 0.0005 | 0.0003 | 0.0001 | 0.0001 | 0.00002 | Yes | Good | Very good | Inv. ex. |
| C68 | TM68 | 0.0006 | 0.0003 | 0.0004 | 0.0003 | 0.00001 | Yes | Good | Very good | Inv. ex. |
| C69 | TM69 | 0.0006 | 0.0005 | 0.0000 | 0.0007 | 0.00000 | Yes | Good | Very good | Inv. ex. |
| C70 | TM70 | 0.0007 | 0.0002 | 0.0008 | 0.0006 | 0.00006 | No | Good | Very good | Inv. ex. |
| C71 | TM71 | 0.0008 | 0.0006 | 0.0009 | 0.0005 | 0.00006 | Yes | Good | Very good | Inv. ex. |
| C72 | TM72 | 0.0003 | 0.0009 | 0.0006 | 0.0004 | 0.00007 | Yes | Good | Very good | Inv. ex. |

TABLE 5

Recrystallization and Annealing Conditions, Surface Structure, Plating Wettability, and Plating Adhesion

| | | Recrystallization and annealing conditions | | | | | | | | | | | |
|---|---|---|---|---|---|---|---|---|---|---|---|---|---|
| | | Heating furnace | | | | Soaking furnace | | | | | | Oxides in B layer and contents of elements | |
| Level | Cold rolled steel sheet | Peak sheet temp. [° C.] | O potential logPH$_2$O/PH$_2$ | H conc. [vol %] | Time in 500° C. to 950° C. temp. range [s] | Sheet temp. range [° C.] | O potential logPH$_2$O/PH$_2$ | H conc. [vol %] | Time in 500° C. to 950° C. temp. range [s] | A layer thick. [μm] | B layer thick. [μm] | Oxide content [%] | Fe content [%] |
| D1 | TM1 | 604 | −0.5 | 11 | 303 | 395 to 604 | −4.5 | 11 | 201 | 63 | 0.019 | 36 | 64 |
| D2 | TM2 | 605 | −0.3 | 13 | 304 | 591 to 602 | −4.6 | 13 | 202 | 70 | 0.083 | 37 | 63 |
| D3 | TM3 | 601 | −0.8 | 10 | 299 | 597 to 608 | −4.6 | 10 | 205 | 61 | 0.005 | 34 | 66 |
| D4 | TM4 | 605 | −0.7 | 11 | 307 | 596 to 601 | −4.5 | 11 | 195 | 41 | 0.046 | 23 | 77 |
| D5 | TM5 | 605 | −0.4 | 11 | 295 | 591 to 607 | −4.4 | 11 | 196 | 40 | 0.056 | 36 | 64 |
| D6 | TM6 | 604 | −0.5 | 10 | 298 | 598 to 603 | −4.5 | 10 | 201 | 54 | 0.084 | 22 | 78 |
| D7 | TM7 | 602 | −0.6 | 15 | 295 | 596 to 607 | −4.5 | 15 | 199 | 37 | 0.029 | 28 | 72 |
| D8 | TM8 | 603 | −0.4 | 16 | 299 | 597 to 603 | −4.5 | 16 | 196 | 31 | 0.062 | 29 | 71 |
| D9 | TM9 | 601 | −0.4 | 11 | 303 | 591 to 603 | −4.4 | 11 | 195 | 22 | 0.071 | 35 | 65 |
| D10 | TM10 | 601 | −0.2 | 11 | 308 | 590 to 609 | −4.5 | 11 | 204 | 64 | 0.059 | 33 | 67 |
| D11 | TM11 | 604 | −0.4 | 9 | 296 | 598 to 610 | −4.5 | 9 | 198 | 37 | 0.041 | 34 | 66 |
| D12 | TM12 | 605 | −0.4 | 11 | 301 | 597 to 609 | −4.4 | 11 | 197 | 64 | 0.071 | 25 | 75 |
| D13 | TM13 | 603 | −0.7 | 15 | 304 | 600 to 605 | −4.4 | 15 | 202 | 78 | 0.042 | 31 | 69 |
| D14 | TM14 | 604 | −0.6 | 19 | 299 | 599 to 601 | −4.3 | 19 | 202 | 54 | 0.030 | 23 | 77 |
| D15 | TM15 | 603 | −0.3 | 17 | 301 | 597 to 606 | −4.5 | 17 | 199 | 84 | 0.099 | 24 | 76 |
| D16 | TM16 | 601 | −0.7 | 18 | 294 | 597 to 609 | −4.5 | 18 | 204 | 32 | 0.080 | 38 | 62 |
| D17 | TM17 | 602 | −0.5 | 9 | 291 | 600 to 603 | −4.4 | 9 | 204 | 24 | 0.100 | 30 | 70 |
| D18 | TM18 | 601 | −0.5 | 17 | 308 | 597 to 601 | −4.3 | 17 | 200 | 25 | 0.091 | 29 | 71 |

TABLE 5-continued

Recrystallization and Annealing Conditions, Surface Structure, Plating Wettability, and Plating Adhesion

| | | | | | | | | | | | | |
|---|---|---|---|---|---|---|---|---|---|---|---|---|
| D19 | TM19 | 604 | −0.6 | 16 | 301 | 597 to 606 | −4.4 | 16 | 202 | 69 | 0.038 | 33 | 66 |
| D20 | TM20 | 602 | −0.6 | 12 | 295 | 596 to 606 | −4.7 | 12 | 192 | 17 | 0.075 | 33 | 67 |
| D21 | TM21 | 604 | −0.6 | 9 | 300 | 597 to 602 | −4.5 | 9 | 199 | 45 | 0.075 | 26 | 74 |
| D22 | TM22 | 605 | −0.6 | 14 | 293 | 594 to 603 | −4.5 | 14 | 194 | 70 | 0.017 | 22 | 78 |
| D23 | TM23 | 601 | −0.4 | 12 | 301 | 591 to 607 | −4.7 | 12 | 200 | 8 | 0.012 | 28 | 72 |
| D24 | TM24 | 602 | −0.5 | 17 | 297 | 595 to 606 | −4.6 | 17 | 200 | 42 | 0.002 | 24 | 76 |
| D25 | TM25 | 602 | −0.6 | 11 | 306 | 590 to 607 | −4.4 | 11 | 194 | 50 | 0.085 | 23 | 77 |
| D26 | TM26 | 603 | −0.6 | 19 | 299 | 594 to 601 | −4.5 | 19 | 209 | 50 | 0.041 | 37 | 63 |
| D27 | TM27 | 602 | −0.4 | 14 | 297 | 590 to 609 | −4.4 | 14 | 199 | 24 | 0.032 | 32 | 68 |
| D28 | TM28 | 603 | −0.4 | 17 | 293 | 595 to 605 | −4.5 | 17 | 202 | 75 | 0.041 | 37 | 63 |
| D29 | TM29 | 601 | −0.6 | 8 | 301 | 600 to 607 | −4.5 | 8 | 202 | 11 | 0.012 | 34 | 66 |
| D30 | TM30 | 601 | −0.3 | 6 | 295 | 597 to 600 | −4.5 | 6 | 200 | 55 | 0.058 | 33 | 67 |
| D31 | TM31 | 601 | −0.6 | 9 | 294 | 593 to 609 | −4.4 | 9 | 204 | 76 | 0.050 | 39 | 61 |
| D32 | TM32 | 601 | −0.6 | 18 | 302 | 593 to 602 | −4.3 | 18 | 206 | 54 | 0.002 | 37 | 63 |
| D33 | TM33 | 600 | −0.3 | 14 | 295 | 597 to 605 | −4.5 | 14 | 199 | 46 | 0.011 | 33 | 67 |
| D34 | TM34 | 601 | −0.4 | 12 | 297 | 592 to 609 | −4.7 | 12 | 206 | 65 | 0.020 | 32 | 68 |
| D35 | TM35 | 602 | −0.3 | 17 | 303 | 597 to 602 | −4.6 | 17 | 203 | 58 | 0.022 | 32 | 68 |
| D36 | TM36 | 601 | −0.3 | 18 | 305 | 593 to 610 | −4.5 | 18 | 199 | 72 | 0.094 | 33 | 67 |
| D37 | TM37 | 602 | −0.7 | 14 | 297 | 597 to 607 | −4.4 | 14 | 206 | 9 | 0.004 | 31 | 69 |
| D38 | TM38 | 605 | −0.5 | 12 | 303 | 594 to 603 | −4.8 | 12 | 205 | 26 | 0.010 | 32 | 68 |
| D39 | TM39 | 602 | −0.4 | 17 | 293 | 590 to 605 | −4.6 | 17 | 195 | 7 | 0.044 | 36 | 64 |
| D40 | TM40 | 604 | −0.3 | 12 | 302 | 600 to 608 | −4.3 | 12 | 195 | 78 | 0.046 | 22 | 78 |
| D41 | TM41 | 603 | −0.5 | 7 | 300 | 597 to 607 | −4.6 | 7 | 204 | 67 | 0.078 | 23 | 77 |
| D42 | TM42 | 603 | −0.3 | 13 | 300 | 599 to 601 | −4.8 | 13 | 202 | 57 | 0.081 | 29 | 71 |
| D43 | TM43 | 605 | −0.4 | 15 | 303 | 597 to 605 | −4.3 | 15 | 196 | 72 | 0.084 | 35 | 65 |
| D44 | TM44 | 602 | −0.3 | 12 | 296 | 598 to 604 | −4.5 | 12 | 199 | 21 | 0.025 | 36 | 64 |
| D45 | TM45 | 604 | −0.3 | 9 | 296 | 599 to 602 | −4.7 | 9 | 203 | 38 | 0.094 | 39 | 61 |
| D46 | TM46 | 604 | −0.5 | 13 | 299 | 592 to 607 | −4.4 | 13 | 200 | 74 | 0.027 | 34 | 66 |
| D47 | TM47 | 604 | −0.5 | 16 | 308 | 590 to 607 | −4.5 | 16 | 203 | 26 | 0.050 | 37 | 63 |
| D48 | TM48 | 602 | −0.5 | 12 | 302 | 593 to 607 | −4.4 | 12 | 196 | 46 | 0.064 | 32 | 68 |
| D49 | TM49 | 603 | −0.4 | 11 | 293 | 591 to 606 | −4.5 | 11 | 209 | 46 | 0.075 | 37 | 63 |
| D50 | TM50 | 601 | −0.5 | 7 | 298 | 593 to 609 | −4.6 | 7 | 193 | 75 | 0.070 | 40 | 60 |
| D51 | TM51 | 600 | −0.5 | 11 | 296 | 597 to 604 | −4.5 | 11 | 201 | 77 | 0.001 | 35 | 65 |
| D52 | TM52 | 601 | −0.6 | 8 | 301 | 591 to 604 | −4.2 | 8 | 202 | 73 | 0.024 | 37 | 63 |
| D53 | TM53 | 604 | −0.5 | 13 | 298 | 591 to 607 | −4.4 | 13 | 206 | 72 | 0.013 | 22 | 78 |
| D54 | TM54 | 600 | −0.7 | 12 | 300 | 600 to 608 | −4.6 | 12 | 202 | 58 | 0.099 | 32 | 68 |
| D55 | TM55 | 602 | −0.4 | 17 | 295 | 594 to 607 | −4.5 | 17 | 196 | 67 | 0.069 | 34 | 66 |
| D56 | TM56 | 603 | −0.6 | 19 | 298 | 594 to 608 | −4.7 | 19 | 200 | 25 | 0.017 | 35 | 65 |
| D57 | TM57 | 601 | −0.7 | 9 | 306 | 600 to 607 | −4.6 | 9 | 199 | 20 | 0.018 | 37 | 63 |
| D58 | TM58 | 603 | −0.5 | 9 | 295 | 595 to 608 | −4.7 | 9 | 208 | 40 | 0.028 | 35 | 65 |
| D59 | TM59 | 601 | −0.4 | 19 | 307 | 595 to 600 | −4.4 | 19 | 205 | 78 | 0.025 | 32 | 68 |
| D60 | TM60 | 602 | −0.5 | 10 | 308 | 594 to 604 | −4.4 | 10 | 193 | 44 | 0.075 | 28 | 72 |
| D61 | TM61 | 604 | −0.3 | 13 | 304 | 590 to 603 | −4.5 | 13 | 198 | 12 | 0.014 | 26 | 74 |
| D62 | TM62 | 603 | −0.5 | 10 | 298 | 600 to 608 | −4.3 | 10 | 206 | 61 | 0.033 | 36 | 64 |
| D63 | TM63 | 604 | −0.4 | 9 | 302 | 598 to 603 | −4.6 | 9 | 199 | 71 | 0.002 | 34 | 66 |
| D64 | TM64 | 601 | −0.6 | 10 | 306 | 595 to 610 | −4.8 | 10 | 196 | 42 | 0.071 | 22 | 78 |
| D65 | TM65 | 604 | −0.6 | 10 | 299 | 598 to 602 | −4.4 | 10 | 202 | 33 | 0.078 | 33 | 67 |
| D66 | TM66 | 600 | −0.4 | 14 | 299 | 597 to 604 | −4.3 | 14 | 198 | 22 | 0.098 | 30 | 70 |
| D67 | TM67 | 603 | −0.5 | 14 | 300 | 596 to 604 | −4.5 | 14 | 198 | 43 | 0.092 | 32 | 68 |
| D68 | TM68 | 603 | −0.6 | 13 | 297 | 595 to 604 | −4.5 | 13 | 199 | 50 | 0.058 | 30 | 70 |
| D69 | TM69 | 604 | −0.6 | 16 | 298 | 600 to 609 | −4.5 | 16 | 199 | 70 | 0.044 | 36 | 64 |
| D70 | TM70 | 605 | −0.5 | 17 | 304 | 593 to 608 | −4.3 | 17 | 200 | 54 | 0.092 | 21 | 79 |
| D71 | TM71 | 601 | −0.4 | 11 | 295 | 598 to 608 | −4.7 | 11 | 197 | 10 | 0.022 | 40 | 60 |
| D72 | TM72 | 601 | −0.5 | 14 | 304 | 597 to 600 | −4.6 | 14 | 208 | 63 | 0.063 | 28 | 72 |

| | | Oxides in B layer and contents of elements | | | | | | | | |
|---|---|---|---|---|---|---|---|---|---|---|
| Level | Cold rolled steel sheet | C content [%] | Si content [%] | Mn content [%] | P content [%] | S content [%] | Al content [%] | Ti, Nb, Cr, Mo, Ni, Cu, Zr, V, W, B, Ca content | Alloying treatment | Evaluation | | Remarks |
| | | | | | | | | | | Wettability | Adhesion | |
| D1 | TM1 | 0.0001 | 0.0003 | 0.0008 | 0.0003 | 0.0010 | 0.0001 | | Yes | Good | Good | Inv. ex. |
| D2 | TM2 | 0.0008 | 0.0006 | 0.0002 | 0.0006 | 0.0010 | 0.0000 | | Yes | Good | Good | Inv. ex. |
| D3 | TM3 | 0.0005 | 0.0004 | 0.0004 | 0.0001 | 0.0004 | 0.0006 | | Yes | Good | Good | Inv. ex. |
| D4 | TM4 | 0.0005 | 0.0003 | 0.0002 | 0.0004 | 0.0007 | 0.0006 | | Yes | Good | Good | Inv. ex. |
| D5 | TM5 | 0.0004 | 0.0002 | 0.0008 | 0.0001 | 0.0001 | 0.0001 | | Yes | Good | Very good | Inv. ex. |
| D6 | TM6 | 0.0010 | 0.0001 | 0.0009 | 0.0009 | 0.0004 | 0.0010 | | Yes | Good | Good | Inv. ex. |
| D7 | TM7 | 0.0004 | 0.0003 | 0.0007 | 0.0007 | 0.0001 | 0.0000 | | Yes | Good | Good | Inv. ex. |
| D8 | TM8 | 0.0002 | 0.0002 | 0.0007 | 0.0006 | 0.0002 | 0.0009 | | Yes | Good | Good | Inv. ex. |
| D9 | TM9 | 0.0007 | 0.0008 | 0.0004 | 0.0000 | 0.0001 | 0.0001 | | Yes | Good | Good | Inv. ex. |
| D10 | TM10 | 0.0009 | 0.0002 | 0.0001 | 0.0003 | 0.0001 | 0.0002 | | No | Good | Good | Inv. ex. |

TABLE 5-continued

Recrystallization and Annealing Conditions, Surface Structure, Plating Wettability, and Plating Adhesion

| | | | | | | | | | | | |
|---|---|---|---|---|---|---|---|---|---|---|---|
| D11 | TM11 | 0.0010 | 0.0004 | 0.0008 | 0.0002 | 0.0010 | 0.0004 | Yes | Good | Good | Inv. ex. |
| D12 | TM12 | 0.0005 | 0.0001 | 0.0002 | 0.0005 | 0.0002 | 0.0008 | Yes | Good | Good | Inv. ex. |
| D13 | TM13 | 0.0000 | 0.0003 | 0.0008 | 0.0005 | 0.0006 | 0.0003 | Yes | Good | Good | Inv. ex. |
| D14 | TM14 | 0.0003 | 0.0005 | 0.0004 | 0.0007 | 0.0008 | 0.0002 | Yes | Good | Good | Inv. ex. |
| D15 | TM15 | 0.0006 | 0.0002 | 0.0007 | 0.0004 | 0.0001 | 0.0001 | Yes | Good | Good | Inv. ex. |
| D16 | TM16 | 0.0008 | 0.0003 | 0.0005 | 0.0004 | 0.0005 | 0.0008 | Yes | Good | Good | Inv. ex. |
| D17 | TM17 | 0.0001 | 0.0010 | 0.0001 | 0.0006 | 0.0000 | 0.0003 | Yes | Good | Good | Inv. ex. |
| D18 | TM18 | 0.0006 | 0.0006 | 0.0008 | 0.0002 | 0.0007 | 0.0009 | Yes | Good | Good | Inv. ex. |
| D19 | TM19 | 0.0007 | 0.0005 | 0.0004 | 0.0008 | 0.0010 | 0.0002 | Yes | Good | Good | Inv. ex. |
| D20 | TM20 | 0.0008 | 0.0010 | 0.0004 | 0.0008 | 0.0003 | 0.0010 | No | Good | Good | Inv. ex. |
| D21 | TM21 | 0.0006 | 0.0009 | 0.0007 | 0.0007 | 0.0007 | 0.0003 | Yes | Good | Good | Inv. ex. |
| D22 | TM22 | 0.0007 | 0.0003 | 0.0005 | 0.0006 | 0.0005 | 0.0006 | Yes | Good | Good | Inv. ex. |
| D23 | TM23 | 0.0001 | 0.0009 | 0.0000 | 0.0005 | 0.0010 | 0.0004 | Yes | Good | Good | Inv. ex. |
| D24 | TM24 | 0.0009 | 0.0010 | 0.0002 | 0.0002 | 0.0003 | 0.0008 | Yes | Good | Good | Inv. ex. |
| D25 | TM25 | 0.0003 | 0.0003 | 0.0006 | 0.0006 | 0.0008 | 0.0001 | Yes | Good | Good | Inv. ex. |
| D26 | TM26 | 0.0009 | 0.0006 | 0.0004 | 0.0003 | 0.0007 | 0.0001 | Yes | Good | Good | Inv. ex. |
| D27 | TM27 | 0.0005 | 0.0008 | 0.0009 | 0.0001 | 0.0001 | 0.0003 | Yes | Good | Good | Inv. ex. |
| D28 | TM28 | 0.0010 | 0.0009 | 0.0002 | 0.0005 | 0.0004 | 0.0004 | Yes | Good | Good | Inv. ex. |
| D29 | TM29 | 0.0005 | 0.0005 | 0.0002 | 0.0007 | 0.0003 | 0.0001 | Yes | Good | Good | Inv. ex. |
| D30 | TM30 | 0.0006 | 0.0007 | 0.0002 | 0.0010 | 0.0008 | 0.0001 | No | Good | Good | Inv. ex. |
| D31 | TM31 | 0.0010 | 0.0008 | 0.0003 | 0.0006 | 0.0001 | 0.0007 | Yes | Good | Good | Inv. ex. |
| D32 | TM32 | 0.0008 | 0.0006 | 0.0010 | 0.0010 | 0.0002 | 0.0006 | Yes | Good | Very good | Inv. ex. |
| D33 | TM33 | 0.0006 | 0.0004 | 0.0007 | 0.0000 | 0.0000 | 0.0009 | Yes | Good | Good | Inv. ex. |
| D34 | TM34 | 0.0008 | 0.0004 | 0.0005 | 0.0002 | 0.0001 | 0.0002 | Yes | Good | Good | Inv. ex. |
| D35 | TM35 | 0.0009 | 0.0006 | 0.0008 | 0.0001 | 0.0004 | 0.0001 | Yes | Good | Good | Inv. ex. |
| D36 | TM36 | 0.0004 | 0.0006 | 0.0008 | 0.0009 | 0.0003 | 0.0005 | Yes | Good | Good | Inv. ex. |
| D37 | TM37 | 0.0003 | 0.0004 | 0.0000 | 0.0008 | 0.0007 | 0.0002 | Yes | Good | Good | Inv. ex. |
| D38 | TM38 | 0.0003 | 0.0002 | 0.0003 | 0.0001 | 0.0005 | 0.0006 | Yes | Good | Good | Inv. ex. |
| D39 | TM39 | 0.0005 | 0.0009 | 0.0004 | 0.0004 | 0.0007 | 0.0008 | Yes | Good | Good | Inv. ex. |
| D40 | TM40 | 0.0000 | 0.0003 | 0.0009 | 0.0001 | 0.0004 | 0.0004 | No | Good | Good | Inv. ex. |
| D41 | TM41 | 0.0001 | 0.0005 | 0.0001 | 0.0003 | 0.0002 | 0.0003 | Yes | Good | Good | Inv. ex. |
| D42 | TM42 | 0.0007 | 0.0009 | 0.0008 | 0.0004 | 0.0007 | 0.0002 | Yes | Good | Good | Inv. ex. |
| D43 | TM43 | 0.0010 | 0.0003 | 0.0007 | 0.0009 | 0.0010 | 0.0005 | Yes | Good | Good | Inv. ex. |
| D44 | TM44 | 0.0002 | 0.0008 | 0.0007 | 0.0007 | 0.0001 | 0.0004 | Yes | Good | Very good | Inv. ex. |
| D45 | TM45 | 0.0002 | 0.0006 | 0.0010 | 0.0007 | 0.0008 | 0.0009 | Yes | Good | Good | Inv. ex. |
| D46 | TM46 | 0.0006 | 0.0001 | 0.0006 | 0.0005 | 0.0007 | 0.0006 | Yes | Good | Good | Inv. ex. |
| D47 | TM47 | 0.0002 | 0.0005 | 0.0009 | 0.0009 | 0.0004 | 0.0009 | Yes | Good | Goad | Inv. ex. |
| D48 | TM48 | 0.0009 | 0.0002 | 0.0006 | 0.0001 | 0.0010 | 0.0003 | Yes | Good | Good | Inv. ex. |
| D49 | TM49 | 0.0002 | 0.0009 | 0.0005 | 0.0010 | 0.0001 | 0.0006 | Yes | Good | Very good | Inv. ex. |
| D50 | TM50 | 0.0003 | 0.0007 | 0.0007 | 0.0005 | 0.0001 | 0.0003 | | No | Good | Good | Inv. ex. |
| D51 | TM51 | 0.0003 | 0.0009 | 0.0005 | 0.0009 | 0.0008 | 0.0009 | 0.00006 Yes | Good | Good | Inv. ex. |
| D52 | TM52 | 0.0010 | 0.0001 | 0.0001 | 0.0005 | 0.0009 | 0.0008 | 0.00009 Yes | Good | Good | Inv. ex. |
| D53 | TM53 | 0.0003 | 0.0001 | 0.0004 | 0.0002 | 0.0003 | 0.0003 | 0.00006 Yes | Good | Good | Inv. ex. |
| D54 | TM54 | 0.0007 | 0.0005 | 0.0007 | 0.0000 | 0.0003 | 0.0003 | 0.00000 Yes | Good | Good | Inv. ex. |
| D55 | TM55 | 0.0001 | 0.0004 | 0.0009 | 0.0001 | 0.0005 | 0.0000 | 0.00005 Yes | Good | Good | Inv. ex. |
| D56 | TM56 | 0.0000 | 0.0004 | 0.0006 | 0.0001 | 0.0002 | 0.0002 | 0.00004 Yes | Good | Good | Inv. ex. |
| D57 | TM57 | 0.0005 | 0.0006 | 0.0008 | 0.0006 | 0.0004 | 0.0009 | 0.00005 Yes | Good | Good | Inv. ex. |
| D58 | TM58 | 0.0007 | 0.0006 | 0.0005 | 0.0007 | 0.0001 | 0.0003 | 0.00004 Yes | Good | Good | Inv. ex. |
| D59 | TM59 | 0.0008 | 0.0005 | 0.0003 | 0.0010 | 0.0000 | 0.0000 | 0.00002 Yes | Good | Good | Inv. ex. |
| D60 | TM60 | 0.0008 | 0.0007 | 0.0004 | 0.0006 | 0.0005 | 0.0003 | 0.00004 No | Good | Good | Inv. ex. |
| D61 | TM61 | 0.0004 | 0.0007 | 0.0006 | 0.0005 | 0.0002 | 0.0010 | 0.00008 Yes | Good | Good | Inv. ex. |
| D62 | TM62 | 0.0004 | 0.0005 | 0.0007 | 0.0005 | 0.0003 | 0.0008 | 0.00004 Yes | Good | Good | Inv. ex. |
| D63 | TM63 | 0.0008 | 0.0000 | 0.0000 | 0.0002 | 0.0008 | 0.0004 | 0.00000 Yes | Good | Good | Inv. ex. |
| D64 | TM64 | 0.0009 | 0.0009 | 0.0001 | 0.0010 | 0.0003 | 0.0003 | 0.00000 Yes | Good | Good | Inv. ex. |
| D65 | TM65 | 0.0008 | 0.0009 | 0.0010 | 0.0009 | 0.0001 | 0.0005 | 0.00004 Yes | Good | Good | Inv. ex. |
| D66 | TM66 | 0.0004 | 0.0005 | 0.0005 | 0.0003 | 0.0008 | 0.0007 | 0.00001 Yes | Good | Good | Inv. ex. |
| D67 | TM67 | 0.0001 | 0.0006 | 0.0004 | 0.0008 | 0.0001 | 0.0000 | 0.00005 Yes | Good | Good | Inv. ex. |
| D68 | TM68 | 0.0003 | 0.0002 | 0.0008 | 0.0000 | 0.0009 | 0.0002 | 0.00010 Yes | Good | Very good | Inv. ex. |
| D69 | TM69 | 0.0004 | 0.0000 | 0.0007 | 0.0004 | 0.0006 | 0.0008 | 0.00001 Yes | Good | Good | Inv. ex. |
| D70 | TM70 | 0.0002 | 0.0006 | 0.0010 | 0.0003 | 0.0008 | 0.0002 | 0.00009 No | Good | Good | Inv. ex. |
| D71 | TM71 | 0.0003 | 0.0001 | 0.0002 | 0.0002 | 0.0001 | 0.0010 | 0.00003 Yes | Good | Good | Inv. ex. |
| D72 | TM72 | 0.0009 | 0.0009 | 0.0004 | 0.0004 | 0.0008 | 0.0009 | 0.00007 Yes | Good | Good | Inv. ex. |

TABLE 6

Recrystallization and Annealing Conditions, Surface Structure, Plating Wettability, and Plating Adhesion

| | | Recrystallization and annealing conditions | | | | | | | |
|---|---|---|---|---|---|---|---|---|---|
| | | Heating furnace | | | | Soaking furnace | | | |
| Level | Cold rolled steel sheet | Peak sheet temp. [° C.] | O potential $\log PH_2O/PH_2$ | H conc. [vol %] | Time in 500° C. to 950° C. temp. range [s] | Sheet temp. range [° C.] | O potential $\log PH_2O/PH_2$ | H conc. [vol %] | Time in 500° C. to 950° C. temp. range [s] |
| E1 | TM1 | 803 | 0.7 | 14 | 105 | 796 to 805 | −4.0 | 14 | 50 |
| E2 | TM2 | 805 | 1.1 | 9 | 101 | 793 to 808 | −4.2 | 9 | 50 |
| E3 | TM3 | 802 | 0.9 | 11 | 101 | 795 to 812 | −3.9 | 11 | 50 |
| E4 | TM4 | 801 | 1.1 | 8 | 102 | 791 to 814 | −4.1 | 8 | 50 |
| E5 | TM5 | 804 | 1.2 | 12 | 103 | 791 to 810 | −4.0 | 12 | 50 |
| E6 | TM6 | 804 | 1.0 | 12 | 101 | 799 to 814 | −3.8 | 12 | 50 |
| E7 | TM7 | 801 | 0.9 | 9 | 102 | 799 to 814 | −3.9 | 9 | 50 |
| E8 | TM8 | 801 | 0.8 | 8 | 101 | 795 to 808 | −4.2 | 8 | 50 |
| E9 | TM9 | 805 | 0.9 | 8 | 104 | 796 to 813 | −4.3 | 8 | 50 |
| E10 | TM10 | 804 | 1.1 | 8 | 102 | 794 to 807 | −4.0 | 8 | 50 |
| E11 | TM11 | 802 | 0.9 | 15 | 102 | 793 to 808 | −4.3 | 15 | 50 |
| E12 | TM12 | 803 | 1.2 | 9 | 103 | 799 to 814 | −4.0 | 9 | 50 |
| E13 | TM13 | 801 | 0.9 | 9 | 104 | 790 to 810 | −4.1 | 9 | 50 |
| E14 | TM14 | 804 | 1.2 | 9 | 101 | 798 to 807 | −3.9 | 9 | 50 |
| E15 | TM15 | 802 | 1.0 | 17 | 100 | 791 to 812 | −3.9 | 17 | 50 |
| E16 | TM16 | 804 | 1.1 | 11 | 103 | 799 to 812 | −4.2 | 11 | 50 |
| E17 | TM17 | 802 | 1.0 | 18 | 104 | 795 to 811 | −4.2 | 18 | 50 |
| E18 | TM18 | 804 | 1.0 | 9 | 104 | 798 to 808 | −4.3 | 9 | 50 |
| E19 | TM19 | 802 | 1.0 | 11 | 101 | 798 to 812 | −4.1 | 11 | 50 |
| E20 | TM20 | 802 | 1.1 | 11 | 104 | 794 to 805 | −3.8 | 11 | 50 |
| E21 | TM21 | 800 | 1.2 | 14 | 103 | 797 to 812 | −4.2 | 14 | 50 |
| E22 | TM22 | 805 | 1.0 | 12 | 101 | 800 to 806 | −4.0 | 12 | 50 |
| E23 | TM23 | 802 | 1.0 | 12 | 105 | 792 to 814 | −4.1 | 12 | 50 |
| E24 | TM24 | 800 | 1.1 | 12 | 103 | 797 to 808 | −4.1 | 12 | 50 |
| E25 | TM25 | 805 | 1.1 | 13 | 104 | 795 to 813 | −3.8 | 13 | 50 |
| E26 | TM26 | 801 | 0.9 | 7 | 101 | 799 to 811 | −4.0 | 7 | 50 |
| E27 | TM27 | 804 | 1.2 | 16 | 102 | 792 to 809 | −4.0 | 16 | 50 |
| E28 | TM28 | 803 | 0.9 | 17 | 103 | 795 to 812 | −3.9 | 17 | 50 |
| E29 | TM29 | 804 | 1.0 | 6 | 102 | 794 to 812 | −3.9 | 6 | 50 |
| E30 | TM30 | 801 | 1.1 | 8 | 100 | 791 to 811 | −4.1 | 8 | 50 |
| E31 | TM31 | 800 | 0.9 | 13 | 104 | 796 to 814 | −3.9 | 13 | 50 |
| E32 | TM32 | 801 | 0.9 | 12 | 104 | 791 to 812 | −4.2 | 12 | 50 |
| E33 | TM33 | 801 | 1.1 | 13 | 105 | 790 to 809 | −4.1 | 13 | 50 |
| E34 | TM34 | 801 | 1.1 | 14 | 103 | 797 to 810 | −3.9 | 14 | 50 |
| E35 | TM35 | 804 | 1.0 | 11 | 103 | 798 to 814 | −4.1 | 11 | 50 |
| E36 | TM36 | 804 | 0.9 | 12 | 104 | 791 to 810 | −3.8 | 12 | 50 |
| E37 | TM37 | 803 | 0.8 | 12 | 103 | 799 to 810 | −4.1 | 12 | 50 |
| E38 | TM38 | 804 | 1.0 | 16 | 105 | 794 to 814 | −4.2 | 16 | 50 |
| E39 | TM39 | 800 | 1.1 | 12 | 101 | 798 to 809 | −3.9 | 12 | 50 |
| E40 | TM40 | 801 | 1.1 | 8 | 102 | 798 to 810 | −4.2 | 8 | 50 |
| E41 | TM41 | 801 | 1.0 | 10 | 102 | 797 to 812 | −4.0 | 10 | 50 |
| E42 | TM42 | 803 | 0.9 | 12 | 101 | 795 to 813 | −3.9 | 12 | 50 |
| E43 | TM43 | 804 | 0.9 | 13 | 104 | 792 to 806 | −3.9 | 13 | 50 |
| E44 | TM44 | 803 | 1.0 | 15 | 103 | 791 to 807 | −3.8 | 15 | 50 |
| E45 | TM45 | 805 | 0.9 | 13 | 105 | 795 to 811 | −3.8 | 13 | 50 |
| E46 | TM46 | 803 | 1.0 | 13 | 103 | 798 to 810 | −4.1 | 13 | 50 |
| E47 | TM47 | 802 | 1.3 | 17 | 101 | 800 to 805 | −4.0 | 17 | 50 |
| E48 | TM48 | 804 | 0.9 | 15 | 104 | 795 to 806 | −4.1 | 15 | 50 |
| E49 | TM49 | 801 | 1.0 | 11 | 103 | 797 to 808 | −3.9 | 11 | 50 |
| E50 | TM50 | 804 | 1.1 | 11 | 100 | 797 to 810 | −4.1 | 11 | 50 |
| E51 | TM51 | 803 | 0.9 | 10 | 102 | 797 to 806 | −4.0 | 10 | 50 |
| E52 | TM52 | 805 | 1.1 | 10 | 103 | 791 to 811 | −4.2 | 10 | 50 |
| E53 | TM53 | 803 | 0.9 | 12 | 102 | 791 to 805 | −4.2 | 12 | 50 |
| E54 | TM54 | 805 | 0.8 | 10 | 103 | 798 to 814 | −3.8 | 10 | 50 |
| E55 | TM55 | 800 | 0.9 | 13 | 105 | 795 to 812 | −4.0 | 13 | 50 |
| E56 | TM56 | 801 | 0.9 | 13 | 104 | 796 to 812 | −4.0 | 13 | 50 |
| E57 | TM57 | 804 | 0.9 | 15 | 101 | 800 to 807 | −4.0 | 15 | 50 |
| E58 | TM58 | 803 | 1.2 | 9 | 102 | 797 to 808 | −4.1 | 9 | 50 |
| E59 | TM59 | 801 | 1.1 | 9 | 100 | 798 to 809 | −3.8 | 9 | 50 |
| E60 | TM60 | 803 | 0.8 | 10 | 105 | 798 to 808 | −4.2 | 10 | 50 |
| E61 | TM61 | 803 | 1.0 | 12 | 103 | 798 to 814 | −4.1 | 12 | 50 |
| E62 | TM62 | 802 | 1.0 | 11 | 101 | 792 to 811 | −3.8 | 11 | 50 |
| E63 | TM63 | 804 | 1.0 | 15 | 102 | 793 to 807 | −4.1 | 10 | 50 |
| E64 | TM64 | 800 | 1.0 | 10 | 104 | 799 to 809 | −4.0 | 10 | 50 |
| E65 | TM65 | 801 | 1.0 | 14 | 100 | 799 to 810 | −3.8 | 14 | 50 |
| E66 | TM66 | 802 | 0.9 | 12 | 105 | 798 to 806 | −3.9 | 12 | 50 |
| E67 | TM67 | 802 | 1.0 | 17 | 101 | 795 to 811 | −4.0 | 17 | 50 |
| E68 | TM68 | 803 | 0.8 | 17 | 104 | 793 to 815 | −3.8 | 17 | 50 |
| E69 | TM69 | 802 | 1.0 | 10 | 102 | 795 to 812 | −4.2 | 10 | 50 |

TABLE 6-continued

Recrystallization and Annealing Conditions, Surface Structure, Plating Wettability, and Plating Adhesion

| | | | | | | | | |
|---|---|---|---|---|---|---|---|---|
| E70 | TM70 | 800 | 1.2 | 15 | 103 | 793 to 814 | −4.1 | 15 | 50 |
| E71 | TM71 | 801 | 0.8 | 11 | 103 | 799 to 806 | −4.0 | 11 | 50 |
| E72 | TM72 | 803 | 1.0 | 10 | 101 | 796 to 306 | −4.0 | 10 | 50 |

| Level | Cold rolled steel sheet | A layer thick. [μm] | B layer thick. [μm] | Oxides in B layer and contents of elements |||||
|---|---|---|---|---|---|---|---|---|
| | | | | Oxide content [%] | Fe content [%] | C content [%] | Si content [%] | Mn content [%] | P content [%] |
| E1 | TM1 | 88 | 0.034 | 37 | 63 | 0.0004 | 0.0010 | 0.0001 | 0.0002 |
| E2 | TM2 | 66 | 0.178 | 28 | 72 | 0.0002 | 0.0008 | 0.0005 | 0.0005 |
| E3 | TM3 | 28 | 0.028 | 24 | 76 | 0.0009 | 0.0009 | 0.0007 | 0.0009 |
| E4 | TM4 | 76 | 0.182 | 27 | 73 | 0.0002 | 0.0010 | 0.0009 | 0.0001 |
| E5 | TM5 | 72 | 0.153 | 29 | 71 | 0.0002 | 0.0006 | 0.0002 | 0.0008 |
| E6 | TM6 | 11 | 0.198 | 37 | 63 | 0.0003 | 0.0006 | 0.0004 | 0.0007 |
| E7 | TM7 | 52 | 0.174 | 36 | 64 | 0.0001 | 0.0006 | 0.0010 | 0.0002 |
| E8 | TM8 | 76 | 0.110 | 37 | 63 | 0.0005 | 0.0004 | 0.0000 | 0.0010 |
| E9 | TM9 | 12 | 0.144 | 24 | 76 | 0.0000 | 0.0005 | 0.0008 | 0.0000 |
| E10 | TM10 | 43 | 0.127 | 20 | 80 | 0.0006 | 0.0002 | 0.0003 | 0.0004 |
| E11 | TM11 | 40 | 0.141 | 33 | 67 | 0.0009 | 0.0006 | 0.0009 | 0.0001 |
| E12 | TM12 | 83 | 0.084 | 27 | 73 | 0.0001 | 0.0007 | 0.0003 | 0.0006 |
| E13 | TM13 | 49 | 0.126 | 35 | 65 | 0.0003 | 0.0006 | 0.0008 | 0.0009 |
| E14 | TM14 | 20 | 0.022 | 28 | 72 | 0.0010 | 0.0002 | 0.0003 | 0.0009 |
| E15 | TM15 | 68 | 0.048 | 24 | 76 | 0.0006 | 0.0008 | 0.0005 | 0.0005 |
| E16 | TM16 | 83 | 0.038 | 23 | 77 | 0.0008 | 0.0006 | 0.0009 | 0.0006 |
| E17 | TM17 | 39 | 0.157 | 29 | 71 | 0.0001 | 0.0004 | 0.0010 | 0.0009 |
| E18 | TM18 | 62 | 0.010 | 32 | 68 | 0.0007 | 0.0009 | 0.0006 | 0.0005 |
| E19 | TM19 | 70 | 0.052 | 26 | 74 | 0.0007 | 0.0004 | 0.0001 | 0.0007 |
| E20 | TM20 | 57 | 0.022 | 21 | 79 | 0.0008 | 0.0005 | 0.0001 | 0.0004 |
| E21 | TM21 | 38 | 0.180 | 24 | 76 | 0.0007 | 0.0008 | 0.0004 | 0.0008 |
| E22 | TM22 | 44 | 0.154 | 28 | 72 | 0.0008 | 0.0006 | 0.0006 | 0.0004 |
| E23 | TM23 | 45 | 0.001 | 37 | 63 | 0.0006 | 0.0003 | 0.0002 | 0.0009 |
| E24 | TM24 | 41 | 0.158 | 34 | 66 | 0.0006 | 0.0003 | 0.0005 | 0.0008 |
| E25 | TM25 | 31 | 0.130 | 20 | 80 | 0.0007 | 0.0007 | 0.0001 | 0.0004 |
| E26 | TM26 | 70 | 0.198 | 39 | 61 | 0.0005 | 0.0000 | 0.0007 | 0.0001 |
| E27 | TM27 | 11 | 0.016 | 39 | 61 | 0.0009 | 0.0002 | 0.0004 | 0.0005 |
| E28 | TM28 | 52 | 0.157 | 29 | 71 | 0.0006 | 0.0001 | 0.0002 | 0.0001 |
| E29 | TM29 | 24 | 0.079 | 33 | 67 | 0.0010 | 0.0007 | 0.0008 | 0.0003 |
| E30 | TM30 | 15 | 0.118 | 31 | 69 | 0.0000 | 0.0002 | 0.0003 | 0.0005 |
| E31 | TM31 | 38 | 0.121 | 27 | 73 | 0.0002 | 0.0005 | 0.0007 | 0.0010 |
| E32 | TM32 | 63 | 0.152 | 21 | 79 | 0.0004 | 0.0008 | 0.0010 | 0.0001 |
| E33 | TM33 | 64 | 0.071 | 36 | 64 | 0.0008 | 0.0001 | 0.0000 | 0.0008 |
| E34 | TM34 | 57 | 0.074 | 33 | 67 | 0.0001 | 0.0006 | 0.0009 | 0.0001 |
| E35 | TM35 | 27 | 0.185 | 23 | 77 | 0.0007 | 0.0007 | 0.0010 | 0.0005 |
| E36 | TM36 | 17 | 0.147 | 24 | 76 | 0.0009 | 0.0004 | 0.0004 | 0.0008 |
| E37 | TM37 | 74 | 0.006 | 23 | 77 | 0.0004 | 0.0004 | 0.0009 | 0.0000 |
| E38 | TM38 | 77 | 0.162 | 31 | 69 | 0.0005 | 0.0007 | 0.0004 | 0.0007 |
| E39 | TM39 | 24 | 0.191 | 35 | 65 | 0.0010 | 0.0007 | 0.0004 | 0.0003 |
| E40 | TM40 | 17 | 0.081 | 28 | 72 | 0.0001 | 0.0001 | 0.0003 | 0.0009 |
| E41 | TM41 | 27 | 0.150 | 33 | 67 | 0.0005 | 0.0004 | 0.0008 | 0.0004 |
| E42 | TM42 | 61 | 0.047 | 36 | 64 | 0.0006 | 0.0008 | 0.0001 | 0.0002 |
| E43 | TM43 | 67 | 0.141 | 39 | 61 | 0.0006 | 0.0007 | 0.0010 | 0.0004 |
| E44 | TM44 | 89 | 0.059 | 24 | 76 | 0.0003 | 0.0004 | 0.0006 | 0.0008 |
| E45 | TM45 | 70 | 0.038 | 23 | 77 | 0.0004 | 0.0008 | 0.0006 | 0.0003 |
| E46 | TM46 | 25 | 0.153 | 24 | 76 | 0.0007 | 0.0004 | 0.0009 | 0.0009 |
| E47 | TM47 | 51 | 0.144 | 37 | 63 | 0.0008 | 0.0004 | 0.0005 | 0.0010 |
| E48 | TM48 | 44 | 0.159 | 22 | 78 | 0.0009 | 0.0007 | 0.0003 | 0.0003 |
| E49 | TM49 | 40 | 0.027 | 25 | 75 | 0.0008 | 0.0007 | 0.0004 | 0.0006 |
| E50 | TM50 | 34 | 0.073 | 34 | 66 | 0.0005 | 0.0001 | 0.0000 | 0.0005 |
| E51 | TM51 | 49 | 0.200 | 21 | 79 | 0.0004 | 0.0003 | 0.0008 | 0.0002 |
| E52 | TM52 | 31 | 0.127 | 36 | 64 | 0.0008 | 0.0002 | 0.0006 | 0.0006 |
| E53 | TM53 | 76 | 0.112 | 28 | 72 | 0.0003 | 0.0004 | 0.0002 | 0.0007 |
| E54 | TM54 | 76 | 0.099 | 40 | 60 | 0.0003 | 0.0007 | 0.0007 | 0.0005 |
| E55 | TM55 | 48 | 0.142 | 35 | 65 | 0.0010 | 0.0004 | 0.0006 | 0.0009 |
| E56 | TM56 | 77 | 0.131 | 20 | 72 | 0.0001 | 0.0009 | 0.0009 | 0.0008 |
| E57 | TM57 | 33 | 0.136 | 40 | 60 | 0.0004 | 0.0003 | 0.0001 | 0.0005 |
| E58 | TM58 | 62 | 0.193 | 27 | 73 | 0.0003 | 0.0007 | 0.0006 | 0.0001 |
| E59 | TM59 | 23 | 0.106 | 30 | 70 | 0.0002 | 0.0007 | 0.0002 | 0.0003 |
| E60 | TM60 | 17 | 0.014 | 35 | 65 | 0.0003 | 0.0006 | 0.0002 | 0.0004 |
| E61 | TM61 | 60 | 0.035 | 29 | 71 | 0.0005 | 0.0009 | 0.0002 | 0.0003 |
| E62 | TM62 | 66 | 0.062 | 20 | 80 | 0.0000 | 0.0007 | 0.0000 | 0.0004 |
| E63 | TM63 | 88 | 0.006 | 33 | 67 | 0.0006 | 0.0002 | 0.0001 | 0.0008 |
| E64 | TM64 | 72 | 0.068 | 31 | 69 | 0.0010 | 0.0005 | 0.0002 | 0.0006 |
| E65 | TM65 | 42 | 0.151 | 37 | 63 | 0.0000 | 0.0007 | 0.0001 | 0.0006 |
| E66 | TM66 | 11 | 0.108 | 34 | 66 | 0.0004 | 0.0005 | 0.0004 | 0.0004 |
| E67 | TM67 | 14 | 0.109 | 28 | 72 | 0.0003 | 0.0009 | 0.0009 | 0.0004 |
| E68 | TM68 | 31 | 0.004 | 27 | 73 | 0.0002 | 0.0007 | 0.0003 | 0.0002 |

TABLE 6-continued

Recrystallization and Annealing Conditions, Surface Structure, Plating Wettability, and Plating Adhesion

| | | | | | | | | | |
|---|---|---|---|---|---|---|---|---|---|
| E69 | TM69 | 79 | 0.142 | 39 | 61 | 0.0009 | 0.0010 | 0.0004 | 0.0009 |
| E70 | TM70 | 73 | 0.061 | 24 | 76 | 0.0001 | 0.0001 | 0.0005 | 0.0006 |
| E71 | TM71 | 68 | 0.114 | 37 | 63 | 0.0002 | 0.0004 | 0.0003 | 0.0006 |
| E72 | TM72 | 70 | 0.093 | 23 | 77 | 0.0009 | 0.0006 | 0.0006 | 0.0004 |

| | | Oxides in B layer and contents of elements | | | | Evaluation | | |
|---|---|---|---|---|---|---|---|---|
| Level | Cold rolled steel sheet | S content [%] | Al content [%] | Ti, Nb, Cr, Mo, Ni, Cu, Zr, V, W, B, Ca content [%] | Alloying treatment | Wettability | Adhesion | Remarks |
| E1 | TM1 | 0.0009 | 0.0010 | | Yes | Good | Very good | Inv. ex. |
| E2 | TM2 | 0.0001 | 0.0004 | | Yes | Good | Good | Inv. ex. |
| E3 | TM3 | 0.0009 | 0.0005 | | Yes | Good | Good | Inv. ex. |
| E4 | TM4 | 0.0003 | 0.0003 | | Yes | Good | Good | Inv. ex. |
| E5 | TM5 | 0.0005 | 0.0006 | | Yes | Good | Good | Inv. ex. |
| E6 | TM6 | 0.0002 | 0.0000 | | Yes | Good | Good | Inv. ex. |
| E7 | TM7 | 0.0009 | 0.0004 | | Yes | Good | Good | Inv. ex. |
| E8 | TM8 | 0.0009 | 0.0004 | | Yes | Good | Good | Inv. ex. |
| E9 | TM9 | 0.0005 | 0.0008 | | Yes | Good | Good | Inv. ex. |
| E10 | TM10 | 0.0010 | 0.0003 | | No | Good | Good | Inv. ex. |
| E11 | TM11 | 0.0008 | 0.0004 | | Yes | Good | Good | Inv. ex. |
| E12 | TM12 | 0.0009 | 0.0002 | | Yes | Good | Good | Inv. ex. |
| E13 | TM13 | 0.0007 | 0.0003 | | Yes | Good | Good | Inv. ex. |
| E14 | TM14 | 0.0009 | 0.0005 | | Yes | Good | Good | Inv. ex. |
| E15 | TM15 | 0.0000 | 0.0002 | | Yes | Good | Good | Inv. ex. |
| E16 | TM16 | 0.0001 | 0.0002 | | Yes | Good | Good | Inv. ex. |
| E17 | TM17 | 0.0006 | 0.0006 | | Yes | Good | Good | Inv. ex. |
| E18 | TM18 | 0.0004 | 0.0009 | | Yes | Good | Good | Inv. ex. |
| E19 | TM19 | 0.0005 | 0.0006 | | Yes | Good | Good | Inv. ex. |
| E20 | TM20 | 0.0006 | 0.0000 | | No | Good | Good | Inv. ex. |
| E21 | TM21 | 0.0006 | 0.0002 | | Yes | Good | Good | Inv. ex. |
| E22 | TM22 | 0.0004 | 0.0007 | | Yes | Good | Good | Inv. ex. |
| E23 | TM23 | 0.0006 | 0.0000 | | Yes | Good | Good | Inv. ex. |
| E24 | TM24 | 0.0001 | 0.0003 | | Yes | Good | Good | Inv. ex. |
| E25 | TM25 | 0.0002 | 0.0004 | | Yes | Good | Good | Inv. ex. |
| E26 | TM26 | 0.0006 | 0.0003 | | Yes | Good | Good | Inv. ex. |
| E27 | TM27 | 0.0005 | 0.0004 | | Yes | Good | Good | Inv. ex. |
| E28 | TM28 | 0.0003 | 0.0006 | | Yes | Good | Good | Inv. ex. |
| E29 | TM29 | 0.0009 | 0.0006 | | Yes | Good | Good | Inv. ex. |
| E30 | TM30 | 0.0007 | 0.0007 | | No | Good | Good | Inv. ex. |
| E31 | TM31 | 0.0000 | 0.0007 | | Yes | Good | Good | Inv. ex. |
| E32 | TM32 | 0.0008 | 0.0003 | | Yes | Good | Good | Inv. ex. |
| E33 | TM33 | 0.0002 | 0.0004 | | Yes | Good | Very good | Inv. ex. |
| E34 | TM34 | 0.0000 | 0.0001 | | Yes | Good | Good | Inv. ex. |
| E35 | TM35 | 0.0003 | 0.0009 | | Yes | Good | Good | Inv. ex. |
| E36 | TM36 | 0.0007 | 0.0003 | | Yes | Good | Good | Inv. ex. |
| E37 | TM37 | 0.0005 | 0.0002 | | Yes | Good | Good | Inv. ex. |
| E38 | TM38 | 0.0006 | 0.0002 | | Yes | Good | Good | Inv. ex. |
| E39 | TM39 | 0.0005 | 0.0008 | | Yes | Good | Good | Inv. ex. |
| E40 | TM40 | 0.0008 | 0.0005 | | No | Good | Good | Inv. ex. |
| E41 | TM41 | 0.0006 | 0.0008 | | Yes | Good | Good | Inv. ex. |
| E42 | TM42 | 0.0003 | 0.0003 | | Yes | Good | Good | Inv. ex. |
| E43 | TM43 | 0.0007 | 0.0007 | | Yes | Good | Good | Inv. ex. |
| E44 | TM44 | 0.0009 | 0.0005 | | Yes | Good | Good | Inv. ex. |
| E45 | TM45 | 0.0004 | 0.0003 | | Yes | Good | Good | Inv. ex. |
| E46 | TM46 | 0.0006 | 0.0003 | | Yes | Good | Good | Inv. ex. |
| E47 | TM47 | 0.0004 | 0.0002 | | Yes | Good | Good | Inv. ex. |
| E48 | TM48 | 0.0003 | 0.0008 | | Yes | Good | Good | Inv. ex. |
| E49 | TM49 | 0.0009 | 0.0002 | | Yes | Good | Good | Inv. ex. |
| E50 | TM50 | 0.0007 | 0.0006 | | No | Good | Good | Inv. ex. |
| E51 | TM51 | 0.0010 | 0.0009 | 0.00007 | Yes | Good | Good | Inv. ex. |
| E52 | TM52 | 0.0006 | 0.0001 | 0.00010 | Yes | Good | Good | Inv. ex. |
| E53 | TM53 | 0.0002 | 0.0004 | 0.00007 | Yes | Good | Good | Inv. ex. |
| E54 | TM54 | 0.0005 | 0.0008 | 0.00009 | Yes | Good | Good | Inv. ex. |
| E55 | TM55 | 0.0003 | 0.0009 | 0.00003 | Yes | Good | Good | Inv. ex. |
| E56 | TM56 | 0.0009 | 0.0009 | 0.00008 | Yes | Good | Good | Inv. ex. |
| E57 | TM57 | 0.0004 | 0.0005 | 0.00003 | Yes | Good | Good | Inv. ex. |
| E58 | TM58 | 0.0005 | 0.0010 | 0.00005 | Yes | Good | Good | Inv. ex. |
| E59 | TM59 | 0.0009 | 0.0004 | 0.00008 | Yes | Good | Good | Inv. ex. |
| E60 | TM60 | 0.0009 | 0.0007 | 0.00010 | No | Good | Good | Inv. ex. |
| E61 | TM61 | 0.0008 | 0.0006 | 0.00000 | Yes | Good | Good | Inv. ex. |
| E62 | TM62 | 0.0010 | 0.0003 | 0.00002 | Yes | Good | Good | Inv. ex. |

TABLE 6-continued

Recrystallization and Annealing Conditions, Surface Structure, Plating Wettability, and Plating Adhesion

| | | | | | | | | |
|---|---|---|---|---|---|---|---|---|
| E63 | TM63 | 0.0003 | 0.0000 | 0.00001 | Yes | Good | Very good | Inv. ex. |
| E64 | TM64 | 0.0000 | 0.0001 | 0.00003 | Yes | Good | Good | Inv. ex. |
| E65 | TM65 | 0.0008 | 0.0006 | 0.00004 | Yes | Good | Good | Inv. ex. |
| E66 | TM66 | 0.0006 | 0.0005 | 0.00008 | Yes | Good | Very good | Inv. ex. |
| E67 | TM67 | 0.0002 | 0.0009 | 0.00005 | Yes | Good | Good | Inv. ex. |
| E68 | TM68 | 0.0004 | 0.0009 | 0.00008 | Yes | Good | Good | Inv. ex. |
| E69 | TM69 | 0.0006 | 0.0009 | 0.00007 | Yes | Good | Good | Inv. ex. |
| E70 | TM70 | 0.0009 | 0.0003 | 0.00008 | No | Good | Good | Inv. ex. |
| E71 | TM71 | 0.0002 | 0.0001 | 0.00009 | Yes | Good | Good | Inv. ex. |
| E72 | TM72 | 0.0007 | 0.0003 | 0.00001 | Yes | Good | Good | Inv. ex. |

TABLE 7

Recrystallization and Annealing Conditions, Surface Structure, Plating Wettability, and Plating Adhesion

| | | Recrystallization and annealing conditions | | | | | | | | | | | |
|---|---|---|---|---|---|---|---|---|---|---|---|---|---|
| | | Heating furnace | | | | Soaking furnace | | | | | | Oxides in B layer and contents of elements | |
| Level | Cold rolled steel sheet | Peak sheet temp. [° C.] | O potential $\log PH_2O/PH_2$ | H conc. [vol %] | Time in 500° C. to 950° C. temp. range [s] | Sheet temp. range [° C.] | O potential $\log PH_2O/PH_2$ | H conc. [vol %] | Time in 500° C. to 950° C. temp. range [s] | A layer thick. [µm] | B layer thick. [µm] | Oxide content [%] | Fe content [%] | C content [%] |
| F1 | TM1 | 701 | 1.5 | 8 | 801 | 698 to 708 | −2.6 | 8 | 800 | 29 | 0.093 | 25 | 75 | 0.0005 |
| F2 | TM2 | 704 | 1.7 | 18 | 801 | 691 to 712 | −2.4 | 18 | 800 | 17 | 0.036 | 29 | 71 | 0.0009 |
| F3 | TM3 | 704 | 1.7 | 10 | 802 | 697 to 708 | −2.4 | 10 | 800 | 39 | 0.022 | 40 | 60 | 0.0004 |
| F4 | TM4 | 702 | 1.4 | 7 | 804 | 695 to 714 | −2.6 | 7 | 800 | 61 | 0.011 | 33 | 67 | 0.0003 |
| F5 | TM5 | 703 | 1.3 | 8 | 801 | 693 to 713 | −2.7 | 8 | 800 | 52 | 0.079 | 28 | 72 | 0.0009 |
| F6 | TM6 | 703 | 1.6 | 16 | 804 | 694 to 714 | −2.5 | 16 | 800 | 53 | 0.051 | 32 | 68 | 0.0003 |
| F7 | TM7 | 701 | 1.7 | 11 | 804 | 698 to 709 | −2.3 | 11 | 800 | 75 | 0.012 | 29 | 71 | 0.0004 |
| F8 | TM8 | 700 | 1.3 | 9 | 800 | 696 to 705 | −2.4 | 9 | 800 | 35 | 0.086 | 28 | 72 | 0.0002 |
| F9 | TM9 | 702 | 1.2 | 10 | 804 | 693 to 712 | −2.5 | 10 | 800 | 13 | 0.060 | 38 | 62 | 0.0003 |
| F10 | TM10 | 700 | 1.6 | 18 | 802 | 696 to 708 | −2.7 | 18 | 800 | 56 | 0.014 | 20 | 80 | 0.0006 |
| F11 | TM11 | 702 | 1.4 | 10 | 805 | 693 to 715 | −2.5 | 10 | 800 | 87 | 0.049 | 28 | 72 | 0.0008 |
| F12 | TM12 | 702 | 1.4 | 16 | 804 | 695 to 708 | −2.5 | 16 | 800 | 73 | 0.098 | 38 | 62 | 0.0008 |
| F13 | TM13 | 702 | 1.4 | 15 | 804 | 692 to 708 | −2.4 | 15 | 800 | 31 | 0.067 | 38 | 62 | 0.0007 |
| F14 | TM14 | 704 | 1.4 | 10 | 800 | 691 to 710 | −2.4 | 10 | 800 | 79 | 0.061 | 38 | 62 | 0.0002 |
| F15 | TM15 | 702 | 1.3 | 10 | 803 | 698 to 711 | −2.5 | 10 | 800 | 67 | 0.043 | 23 | 77 | 0.0001 |
| F16 | TM16 | 701 | 1.6 | 14 | 804 | 695 to 714 | −2.5 | 14 | 800 | 50 | 0.098 | 30 | 70 | 0.0008 |
| F17 | TM17 | 703 | 1.6 | 10 | 800 | 691 to 706 | −2.6 | 10 | 800 | 73 | 0.077 | 24 | 76 | 0.0010 |
| F18 | TM18 | 700 | 1.6 | 9 | 804 | 699 to 714 | −2.3 | 9 | 800 | 49 | 0.073 | 38 | 62 | 0.0001 |
| F19 | TM19 | 704 | 1.4 | 17 | 800 | 696 to 707 | −2.4 | 17 | 800 | 41 | 0.046 | 30 | 70 | 0.0006 |
| F20 | TM20 | 701 | 1.3 | 15 | 803 | 698 to 711 | −2.8 | 15 | 800 | 38 | 0.080 | 31 | 69 | 0.0003 |
| F21 | TM21 | 703 | 1.6 | 10 | 801 | 697 to 708 | −2.3 | 10 | 800 | 63 | 0.083 | 40 | 60 | 0.0010 |
| F22 | TM22 | 703 | 1.6 | 16 | 803 | 695 to 708 | −2.4 | 16 | 800 | 86 | 0.026 | 24 | 76 | 0.0008 |
| F23 | TM23 | 705 | 1.6 | 19 | 803 | 693 to 711 | −2.7 | 19 | 800 | 60 | 0.023 | 39 | 61 | 0.0004 |
| F24 | TM24 | 704 | 1.3 | 9 | 801 | 698 to 711 | −2.5 | 9 | 800 | 70 | 0.094 | 23 | 77 | 0.0005 |
| F25 | TM25 | 705 | 1.5 | 16 | 800 | 697 to 714 | −2.5 | 16 | 800 | 72 | 0.058 | 38 | 62 | 0.0006 |
| F26 | TM26 | 702 | 1.6 | 12 | 802 | 697 to 707 | −2.6 | 12 | 800 | 22 | 0.081 | 28 | 72 | 0.0005 |
| F27 | TM27 | 702 | 1.6 | 11 | 803 | 690 to 706 | −2.5 | 11 | 800 | 47 | 0.017 | 32 | 68 | 0.0002 |
| F28 | TM28 | 701 | 1.5 | 7 | 805 | 697 to 709 | −2.3 | 7 | 800 | 47 | 0.076 | 29 | 71 | 0.0006 |
| F29 | TM29 | 703 | 1.6 | 12 | 803 | 695 to 708 | −2.4 | 12 | 800 | 65 | 0.024 | 31 | 69 | 0.0008 |
| F30 | TM30 | 700 | 1.4 | 16 | 804 | 694 to 708 | −2.4 | 16 | 800 | 67 | 0.012 | 23 | 77 | 0.0000 |
| F31 | TM31 | 702 | 1.6 | 9 | 804 | 691 to 711 | −2.6 | 9 | 800 | 80 | 0.069 | 38 | 62 | 0.0010 |
| F32 | TM32 | 701 | 1.4 | 8 | 805 | 694 to 713 | −2.3 | 8 | 800 | 23 | 0.036 | 37 | 63 | 0.0009 |
| F33 | TM33 | 705 | 1.4 | 17 | 801 | 696 to 710 | −2.7 | 17 | 800 | 88 | 0.079 | 36 | 64 | 0.0003 |
| F34 | TM34 | 703 | 1.6 | 10 | 800 | 699 to 707 | −2.4 | 10 | 800 | 60 | 0.099 | 33 | 67 | 0.0009 |
| F35 | TM35 | 702 | 1.5 | 8 | 800 | 698 to 708 | −2.4 | 8 | 800 | 83 | 0.008 | 20 | 80 | 0.0004 |
| F36 | TM36 | 704 | 1.6 | 8 | 803 | 698 to 711 | −2.6 | 8 | 800 | 65 | 0.025 | 40 | 60 | 0.0006 |
| F37 | TM37 | 704 | 1.7 | 15 | 802 | 699 to 714 | −2.4 | 15 | 800 | 65 | 0.069 | 37 | 63 | 0.0001 |
| F38 | TM38 | 702 | 1.5 | 17 | 803 | 695 to 709 | −2.7 | 17 | 800 | 29 | 0.025 | 31 | 69 | 0.0003 |
| F39 | TM39 | 703 | 1.6 | 10 | 803 | 694 to 706 | −2.5 | 10 | 800 | 55 | 0.010 | 21 | 79 | 0.0009 |
| F40 | TM40 | 703 | 1.4 | 11 | 802 | 694 to 711 | −2.6 | 11 | 800 | 70 | 0.010 | 33 | 67 | 0.0007 |
| F41 | TM41 | 703 | 1.4 | 12 | 803 | 693 to 706 | −2.6 | 12 | 800 | 80 | 0.096 | 23 | 77 | 0.0000 |
| F42 | TM42 | 704 | 1.6 | 12 | 805 | 690 to 705 | −2.5 | 12 | 800 | 44 | 0.004 | 32 | 68 | 0.0005 |
| F43 | TM43 | 705 | 1.5 | 19 | 802 | 694 to 715 | −2.7 | 19 | 800 | 12 | 0.028 | 24 | 76 | 0.0005 |
| F44 | TM44 | 702 | 1.4 | 14 | 804 | 695 to 706 | −2.6 | 14 | 800 | 72 | 0.059 | 28 | 72 | 0.0001 |
| F45 | TM45 | 700 | 1.4 | 13 | 804 | 696 to 707 | −2.3 | 13 | 800 | 49 | 0.052 | 23 | 77 | 0.0009 |
| F46 | TM46 | 703 | 1.6 | 11 | 803 | 700 to 715 | −2.5 | 11 | 800 | 61 | 0.041 | 38 | 62 | 0.0003 |

TABLE 7-continued

Recrystallization and Annealing Conditions, Surface Structure, Plating Wettability, and Plating Adhesion

| | | | | | | | | | | | | | | |
|---|---|---|---|---|---|---|---|---|---|---|---|---|---|---|
| F47 | TM47 | 704 | 1.5 | 14 | 801 | 696 to 713 | −2.6 | 14 | 800 | 40 | 0.093 | 36 | 64 | 0.0008 |
| F48 | TM48 | 701 | 1.4 | 9  | 801 | 696 to 706 | −2.3 | 9  | 800 | 64 | 0.002 | 26 | 74 | 0.0009 |
| F49 | TM49 | 701 | 1.5 | 8  | 802 | 690 to 707 | −2.2 | 8  | 800 | 57 | 0.041 | 25 | 75 | 0.0005 |
| F50 | TM50 | 705 | 1.5 | 13 | 802 | 699 to 709 | −2.5 | 13 | 800 | 70 | 0.033 | 36 | 64 | 0.0005 |
| F51 | TM51 | 705 | 1.6 | 10 | 802 | 690 to 713 | −2.5 | 10 | 800 | 50 | 0.067 | 21 | 79 | 0.0009 |
| F52 | TM52 | 704 | 1.5 | 8  | 803 | 692 to 712 | −2.3 | 8  | 800 | 36 | 0.005 | 26 | 74 | 0.0008 |
| F53 | TM53 | 701 | 1.6 | 10 | 802 | 699 to 710 | −2.4 | 10 | 800 | 13 | 0.071 | 39 | 61 | 0.0006 |
| F54 | TM54 | 700 | 1.5 | 10 | 800 | 693 to 713 | −2.5 | 10 | 800 | 90 | 0.077 | 27 | 73 | 0.0003 |
| F55 | TM55 | 702 | 1.5 | 14 | 801 | 694 to 705 | −2.5 | 14 | 800 | 28 | 0.095 | 22 | 78 | 0.0002 |
| F56 | TM56 | 702 | 1.7 | 11 | 804 | 695 to 712 | −2.5 | 11 | 800 | 69 | 0.084 | 24 | 76 | 0.0001 |
| F57 | TM57 | 701 | 1.6 | 14 | 801 | 696 to 711 | −2.4 | 14 | 800 | 87 | 0.042 | 21 | 79 | 0.0000 |
| F58 | TM58 | 704 | 1.5 | 15 | 801 | 699 to 714 | −2.5 | 15 | 800 | 24 | 0.035 | 26 | 74 | 0.0002 |
| F59 | TM59 | 702 | 1.5 | 13 | 804 | 696 to 707 | −2.3 | 13 | 800 | 42 | 0.061 | 26 | 74 | 0.0001 |
| F60 | TM60 | 701 | 1.4 | 10 | 800 | 692 to 708 | −2.6 | 10 | 800 | 31 | 0.047 | 30 | 70 | 0.0002 |
| F61 | TM61 | 701 | 1.2 | 8  | 804 | 699 to 712 | −2.4 | 8  | 800 | 39 | 0.093 | 35 | 65 | 0.0007 |
| F62 | TM62 | 701 | 1.5 | 15 | 800 | 693 to 709 | −2.7 | 15 | 800 | 83 | 0.074 | 36 | 64 | 0.0002 |
| F63 | TM63 | 702 | 1.4 | 16 | 804 | 694 to 712 | −2.6 | 16 | 800 | 26 | 0.091 | 39 | 61 | 0.0001 |
| F64 | TM64 | 703 | 1.3 | 14 | 800 | 696 to 706 | −2.5 | 14 | 800 | 44 | 0.076 | 39 | 61 | 0.0003 |
| F65 | TM65 | 702 | 1.3 | 8  | 803 | 693 to 713 | −2.4 | 8  | 800 | 33 | 0.046 | 35 | 65 | 0.0009 |
| F66 | TM66 | 704 | 1.6 | 14 | 804 | 697 to 707 | −2.6 | 14 | 800 | 32 | 0.093 | 29 | 71 | 0.0004 |
| F67 | TM67 | 704 | 1.8 | 13 | 804 | 692 to 710 | −2.4 | 13 | 800 | 56 | 0.051 | 33 | 67 | 0.0004 |
| F68 | TM68 | 703 | 1.6 | 12 | 801 | 692 to 714 | −2.6 | 12 | 800 | 60 | 0.029 | 29 | 71 | 0.0005 |
| F69 | TM69 | 702 | 1.6 | 14 | 804 | 697 to 706 | −2.8 | 14 | 800 | 19 | 0.052 | 28 | 72 | 0.0003 |
| F70 | TM70 | 701 | 1.4 | 10 | 802 | 693 to 706 | −2.5 | 10 | 800 | 35 | 0.050 | 20 | 60 | 0.0009 |
| F71 | TM71 | 705 | 1.5 | 17 | 803 | 697 to 707 | −2.6 | 17 | 800 | 57 | 0.048 | 34 | 66 | 0.0002 |
| F72 | TM72 | 704 | 1.4 | 9  | 801 | 694 to 707 | −2.6 | 9  | 800 | 82 | 0.041 | 38 | 62 | 0.0002 |

Oxides in B layer and contents of elements

| Level | Cold rolled steel sheet | Si content [%] | Mn content [%] | P content [%] | S content [%] | Al content [%] | Ti, Nb, Cr, Mo, Ni, Cu, Zr, V, W, B, Ca content [%] | Alloying treatment | Evaluation Wettability | Evaluation Adhesion | Remarks |
|---|---|---|---|---|---|---|---|---|---|---|---|
| F1 | TM1 | 0.0005 | 0.0001 | 0.0002 | 0.0001 | 0.0008 | | Yes | Good | Good | Inv. ex. |
| F2 | TM2 | 0.0002 | 0.0009 | 0.0005 | 0.0009 | 0.0001 | | Yes | Good | Good | Inv. ex. |
| F3 | TM3 | 0.0006 | 0.0006 | 0.0009 | 0.0003 | 0.0001 | | Yes | Good | Good | Inv. ex. |
| F4 | TM4 | 0.0001 | 0.0008 | 0.0008 | 0.0006 | 0.0002 | | Yes | Good | Good | Inv. ex. |
| F5 | TM5 | 0.0001 | 0.0001 | 0.0001 | 0.0005 | 0.0009 | | Yes | Good | Good | Inv. ex. |
| F6 | TM6 | 0.0010 | 0.0002 | 0.0006 | 0.0004 | 0.0009 | | Yes | Good | Very good | Inv. ex. |
| F7 | TM7 | 0.0002 | 0.0005 | 0.0007 | 0.0002 | 0.0008 | | Yes | Good | Good | Inv. ex. |
| F8 | TM8 | 0.0004 | 0.0001 | 0.0003 | 0.0006 | 0.0009 | | Yes | Good | Good | Inv. ex. |
| F9 | TM9 | 0.0003 | 0.0002 | 0.0001 | 0.0007 | 0.0008 | | Yes | Good | Good | Inv. ex. |
| F10 | TM10 | 0.0010 | 0.0002 | 0.0008 | 0.0000 | 0.0007 | | No | Good | Good | Inv. ex. |
| F11 | TM11 | 0.0008 | 0.0001 | 0.0001 | 0.0003 | 0.0008 | | Yes | Good | Good | Inv. ex. |
| F12 | TM12 | 0.0000 | 0.0002 | 0.0003 | 0.0004 | 0.0007 | | Yes | Good | Good | Inv. ex. |
| F13 | TM13 | 0.0006 | 0.0009 | 0.0007 | 0.0010 | 0.0005 | | Yes | Good | Good | Inv. ex. |
| F14 | TM14 | 0.0005 | 0.0003 | 0.0000 | 0.0005 | 0.0006 | | Yes | Good | Good | Inv. ex. |
| F15 | TM15 | 0.0002 | 0.0004 | 0.0005 | 0.0007 | 0.0006 | | Yes | Good | Good | Inv. ex. |
| F16 | TM16 | 0.0002 | 0.0005 | 0.0004 | 0.0008 | 0.0007 | | Yes | Good | Good | Inv. ex. |
| F17 | TM17 | 0.0003 | 0.0009 | 0.0006 | 0.0009 | 0.0002 | | Yes | Good | Good | Inv. ex. |
| F18 | TM18 | 0.0001 | 0.0002 | 0.0001 | 0.0002 | 0.0005 | | Yes | Good | Good | Inv. ex. |
| F19 | TM19 | 0.0005 | 0.0009 | 0.0003 | 0.0000 | 0.0007 | | Yes | Good | Good | Inv. ex. |
| F20 | TM20 | 0.0008 | 0.0002 | 0.0004 | 0.0001 | 0.0003 | | No | Good | Good | Inv. ex. |
| F21 | TM21 | 0.0002 | 0.0009 | 0.0005 | 0.0003 | 0.0008 | | Yes | Good | Good | Inv. ex. |
| F22 | TM22 | 0.0002 | 0.0004 | 0.0002 | 0.0002 | 0.0003 | | Yes | Good | Good | Inv. ex. |
| F23 | TM23 | 0.0000 | 0.0000 | 0.0003 | 0.0009 | 0.0006 | | Yes | Good | Good | Inv. ex. |
| F24 | TM24 | 0.0010 | 0.0006 | 0.0006 | 0.0001 | 0.0010 | | Yes | Good | Good | Inv. ex. |
| F25 | TM25 | 0.0005 | 0.0007 | 0.0000 | 0.0005 | 0.0000 | | Yes | Good | Good | Inv. ex. |
| F26 | TM26 | 0.0005 | 0.0003 | 0.0000 | 0.0003 | 0.0003 | | Yes | Good | Good | Inv. ex. |
| F27 | TM27 | 0.0002 | 0.0000 | 0.0005 | 0.0006 | 0.0007 | | Yes | Good | Good | Inv. ex. |
| F28 | TM28 | 0.0004 | 0.0003 | 0.0004 | 0.0005 | 0.0008 | | Yes | Good | Good | Inv. ex. |
| F29 | TM29 | 0.0001 | 0.0001 | 0.0008 | 0.0009 | 0.0001 | | Yes | Good | Good | Inv. ex. |
| F30 | TM30 | 0.0007 | 0.0010 | 0.0000 | 0.0007 | 0.0006 | | No | Good | Good | Inv. ex. |
| F31 | TM31 | 0.0003 | 0.0007 | 0.0001 | 0.0008 | 0.0010 | | Yes | Good | Good | Inv. ex. |
| F32 | TM32 | 0.0009 | 0.0009 | 0.0006 | 0.0005 | 0.0007 | | Yes | Good | Good | Inv. ex. |
| F33 | TM33 | 0.0001 | 0.0002 | 0.0008 | 0.0009 | 0.0009 | | Yes | Good | Good | Inv. ex. |
| F34 | TM34 | 0.0002 | 0.0009 | 0.0003 | 0.0010 | 0.0002 | | Yes | Good | Good | Inv. ex. |
| F35 | TM35 | 0.0009 | 0.0007 | 0.0005 | 0.0002 | 0.0009 | | Yes | Good | Very good | Inv. ex. |
| F36 | TM36 | 0.0006 | 0.0006 | 0.0008 | 0.0001 | 0.0005 | | Yes | Good | Good | Inv. ex. |
| F37 | TM37 | 0.0005 | 0.0004 | 0.0000 | 0.0001 | 0.0002 | | Yes | Good | Good | Inv. ex. |
| F38 | TM38 | 0.0010 | 0.0001 | 0.0007 | 0.0003 | 0.0002 | | Yes | Good | Good | Inv. ex. |
| F39 | TM39 | 0.0001 | 0.0003 | 0.0006 | 0.0002 | 0.0002 | | Yes | Good | Good | Inv. ex. |

TABLE 7-continued

Recrystallization and Annealing Conditions, Surface Structure, Plating Wettability, and Plating Adhesion

| | | | | | | | | | | | |
|---|---|---|---|---|---|---|---|---|---|---|---|
| F40 | TM40 | 0.0002 | 0.0000 | 0.0008 | 0.0009 | 0.0001 | | No | Good | Good | Inv. ex. |
| F41 | TM41 | 0.0007 | 0.0001 | 0.0007 | 0.0010 | 0.0009 | | Yes | Good | Good | Inv. ex. |
| F42 | TM42 | 0.0009 | 0.0004 | 0.0004 | 0.0003 | 0.0007 | | Yes | Good | Good | Inv. ex. |
| F43 | TM43 | 0.0004 | 0.0005 | 0.0004 | 0.0006 | 0.0002 | | Yes | Good | Good | Inv. ex. |
| F44 | TM44 | 0.0005 | 0.0001 | 0.0009 | 0.0003 | 0.0003 | | Yes | Good | Very good | Inv. ex. |
| F45 | TM45 | 0.0001 | 0.0006 | 0.0006 | 0.0003 | 0.0009 | | Yes | Good | Good | Inv. ex. |
| F46 | TM46 | 0.0005 | 0.0003 | 0.0004 | 0.0005 | 0.0003 | | Yes | Good | Good | Inv. ex. |
| F47 | TM47 | 0.0002 | 0.0006 | 0.0003 | 0.0009 | 0.0006 | | Yes | Good | Good | Inv. ex. |
| F48 | TM48 | 0.0008 | 0.0007 | 0.0009 | 0.0003 | 0.0009 | | Yes | Good | Good | Inv. ex. |
| F49 | TM49 | 0.0006 | 0.0007 | 0.0005 | 0.0005 | 0.0009 | | Yes | Good | Good | Inv. ex. |
| F50 | TM50 | 0.0007 | 0.0009 | 0.0010 | 0.0009 | 0.0010 | | No | Good | Good | Inv. ex. |
| F51 | TM51 | 0.0001 | 0.0009 | 0.0004 | 0.0004 | 0.0010 | 0.00009 | Yes | Good | Good | Inv. ex. |
| F52 | TM52 | 0.0007 | 0.0006 | 0.0005 | 0.0005 | 0.0000 | 0.00003 | Yes | Good | Good | Inv. ex. |
| F53 | TM53 | 0.0002 | 0.0007 | 0.0002 | 0.0005 | 0.0006 | 0.00006 | Yes | Good | Good | Inv. ex. |
| F54 | TM54 | 0.0003 | 0.0004 | 0.0008 | 0.0006 | 0.0005 | 0.00002 | Yes | Good | Good | Inv. ex. |
| F55 | TM55 | 0.0008 | 0.0004 | 0.0002 | 0.0008 | 0.0000 | 0.00005 | Yes | Good | Good | Inv. ex. |
| F56 | TM56 | 0.0005 | 0.0007 | 0.0004 | 0.0001 | 0.0007 | 0.00006 | Yes | Good | Good | Inv. ex. |
| F57 | TM57 | 0.0006 | 0.0005 | 0.0009 | 0.0005 | 0.0009 | 0.00010 | Yes | Good | Good | Inv. ex. |
| F58 | TM58 | 0.0005 | 0.0005 | 0.0001 | 0.0009 | 0.0007 | 0.00002 | Yes | Good | Good | Inv. ex. |
| F59 | TM59 | 0.0001 | 0.0003 | 0.0005 | 0.0003 | 0.0009 | 0.00008 | Yes | Good | Good | Inv. ex. |
| F60 | TM60 | 0.0007 | 0.0007 | 0.0002 | 0.0000 | 0.0002 | 0.00004 | No | Good | Good | Inv. ex. |
| F61 | TM61 | 0.0003 | 0.0009 | 0.0004 | 0.0006 | 0.0004 | 0.00009 | Yes | Good | Good | Inv. ex. |
| F62 | TM62 | 0.0006 | 0.0008 | 0.0003 | 0.0003 | 0.0002 | 0.00003 | Yes | Good | Good | Inv. ex. |
| F63 | TM63 | 0.0005 | 0.0003 | 0.0009 | 0.0009 | 0.0007 | 0.00007 | Yes | Good | Good | Inv. ex. |
| F64 | TM64 | 0.0000 | 0.0002 | 0.0008 | 0.0004 | 0.0001 | 0.00006 | Yes | Good | Good | Inv. ex. |
| F65 | TM65 | 0.0003 | 0.0008 | 0.0005 | 0.0002 | 0.0004 | 0.00008 | Yes | Good | Good | Inv. ex. |
| F66 | TM66 | 0.0008 | 0.0003 | 0.0004 | 0.0002 | 0.0007 | 0.00009 | Yes | Good | Good | Inv. ex. |
| F67 | TM67 | 0.0009 | 0.0007 | 0.0009 | 0.0005 | 0.0004 | 0.00008 | Yes | Good | Good | Inv. ex. |
| F68 | TM68 | 0.0009 | 0.0003 | 0.0006 | 0.0003 | 0.0001 | 0.00006 | Yes | Good | Good | Inv. ex. |
| F69 | TM69 | 0.0003 | 0.0002 | 0.0010 | 0.0010 | 0.0002 | 0.00002 | Yes | Good | Good | Inv. ex. |
| F70 | TM70 | 0.0002 | 0.0000 | 0.0000 | 0.0001 | 0.0002 | 0.00003 | No | Good | Very good | Inv. ex. |
| F71 | TM71 | 0.0005 | 0.0003 | 0.0004 | 0.0003 | 0.0002 | 0.00005 | Yes | Good | Good | Inv. ex. |
| F72 | TM72 | 0.0002 | 0.0007 | 0.0002 | 0.0005 | 0.0006 | 0.00006 | Yes | Good | Good | Inv. ex. |

TABLE 8

Recrystallization and Annealing Conditions, Surface Structure, Plating Wettability, and Plating Adhesion

| | | Heating furnace | | | | Soaking furnace | | | | | | Oxides in B layer and contents of elements | |
|---|---|---|---|---|---|---|---|---|---|---|---|---|---|
| Level | Cold rolled steel sheet | Peak sheet temp. [° C.] | O potential logPH$_2$O/ PH$_2$ | H conc. [vol %] | Time in 500° C. to 950° C. temp. range [s] | Sheet temp. range [° C.] | O potential logPH$_2$O/ PH$_2$ | H conc. [vol %] | Time in 500° C. to 950° C. temp. range [s] | A layer thick. [μm] | B layer thick. [μm] | Oxide content [%] | Fe content [%] |
| G1 | TM1 | 701 | 0.3 | 12 | 199 | 695 to 709 | −3.8 | 12 | 307 | 39 | 0.102 | 33 | 67 |
| G2 | TM2 | 704 | 0.3 | 11 | 194 | 697 to 708 | −4.1 | 11 | 299 | 31 | 0.108 | 33 | 67 |
| G3 | TM3 | 703 | 0.3 | 10 | 203 | 696 to 708 | −3.9 | 10 | 303 | 53 | 0.194 | 26 | 74 |
| G4 | TM4 | 705 | 0.3 | 14 | 195 | 691 to 710 | −4.2 | 14 | 304 | 52 | 0.167 | 22 | 78 |
| G5 | TM5 | 700 | 0.1 | 12 | 199 | 699 to 715 | −4.0 | 12 | 305 | 14 | 0.148 | 24 | 76 |
| G6 | TM6 | 704 | 0.3 | 17 | 202 | 697 to 705 | −4.1 | 17 | 300 | 87 | 0.162 | 37 | 63 |
| G7 | TM7 | 705 | 0.5 | 14 | 195 | 690 to 714 | −4.2 | 14 | 304 | 87 | 0.111 | 30 | 70 |
| G8 | TM8 | 701 | 0.5 | 17 | 201 | 697 to 708 | −3.9 | 17 | 302 | 24 | 0.147 | 24 | 76 |
| G9 | TM9 | 703 | 0.2 | 10 | 194 | 694 to 714 | −4.0 | 10 | 306 | 25 | 0.104 | 36 | 64 |
| G10 | TM10 | 700 | 0.2 | 10 | 204 | 691 to 713 | −4.1 | 10 | 302 | 61 | 0.134 | 32 | 68 |
| G11 | TM11 | 703 | 0.5 | 11 | 202 | 699 to 708 | −4.0 | 11 | 304 | 60 | 0.126 | 26 | 74 |
| G12 | TM12 | 703 | 0.2 | 10 | 202 | 696 to 707 | −4.2 | 10 | 300 | 26 | 0.131 | 32 | 68 |
| G13 | TM13 | 704 | 0.3 | 14 | 200 | 697 to 711 | −3.9 | 14 | 303 | 29 | 0.101 | 24 | 76 |
| G14 | TM14 | 702 | 0.5 | 12 | 206 | 697 to 705 | −4.1 | 12 | 294 | 31 | 0.197 | 38 | 62 |
| G15 | TM15 | 704 | 0.4 | 18 | 200 | 691 to 709 | −3.8 | 18 | 296 | 24 | 0.157 | 37 | 63 |
| G16 | TM16 | 702 | 0.3 | 18 | 194 | 698 to 709 | −3.9 | 18 | 306 | 63 | 0.161 | 32 | 68 |
| G17 | TM17 | 704 | 0.4 | 11 | 202 | 697 to 706 | −4.1 | 11 | 296 | 53 | 0.154 | 25 | 75 |
| G18 | TM18 | 703 | 0.4 | 9 | 200 | 699 to 712 | −3.9 | 9 | 305 | 78 | 0.144 | 40 | 60 |
| G19 | TM19 | 701 | 0.2 | 10 | 201 | 692 to 713 | −4.2 | 10 | 297 | 83 | 0.102 | 31 | 69 |
| G20 | TM20 | 702 | 0.3 | 19 | 199 | 698 to 713 | −4.2 | 19 | 306 | 50 | 0.172 | 32 | 68 |
| G21 | TM21 | 705 | 0.2 | 14 | 202 | 697 to 706 | −4.1 | 14 | 297 | 65 | 0.120 | 30 | 70 |
| G22 | TM22 | 702 | 0.4 | 11 | 198 | 699 to 714 | −4.2 | 11 | 302 | 68 | 0.155 | 35 | 65 |
| G23 | TM23 | 705 | 0.3 | 18 | 194 | 691 to 708 | −4.0 | 18 | 299 | 57 | 0.182 | 33 | 67 |

TABLE 8-continued

Recrystallization and Annealing Conditions, Surface Structure, Plating Wettability, and Plating Adhesion

| | | | | | | | | | | | | | |
|---|---|---|---|---|---|---|---|---|---|---|---|---|---|
| G24 | TM24 | 702 | 0.3 | 16 | 201 | 696 to 711 | −3.9 | 16 | 306 | 16 | 0.147 | 29 | 71 |
| G25 | TM25 | 700 | 0.4 | 14 | 200 | 699 to 708 | −4.2 | 14 | 298 | 29 | 0.128 | 35 | 65 |
| G26 | TM26 | 701 | 0.1 | 15 | 204 | 691 to 715 | −4.1 | 15 | 297 | 65 | 0.136 | 34 | 66 |
| G27 | TM27 | 700 | 0.4 | 18 | 202 | 690 to 708 | −4.0 | 18 | 302 | 54 | 0.130 | 31 | 69 |
| G28 | TM28 | 702 | 0.3 | 11 | 206 | 691 to 709 | −4.1 | 11 | 300 | 31 | 0.136 | 40 | 60 |
| G29 | TM29 | 704 | 0.5 | 16 | 203 | 700 to 706 | −4.0 | 16 | 303 | 47 | 0.143 | 21 | 79 |
| G30 | TM30 | 704 | 0.3 | 15 | 195 | 693 to 714 | −4.2 | 15 | 304 | 71 | 0.181 | 23 | 77 |
| G31 | TM31 | 701 | 0.0 | 15 | 209 | 690 to 714 | −4.1 | 15 | 303 | 86 | 0.146 | 37 | 63 |
| G32 | TM32 | 701 | 0.3 | 8 | 207 | 698 to 706 | −4.1 | 8 | 303 | 83 | 0.128 | 28 | 72 |
| G33 | TM33 | 701 | 0.5 | 17 | 198 | 698 to 708 | −4.2 | 17 | 294 | 20 | 0.196 | 28 | 72 |
| G34 | TM34 | 702 | 0.4 | 12 | 192 | 700 to 713 | −4.0 | 12 | 293 | 85 | 0.159 | 26 | 74 |
| G35 | TM35 | 702 | 0.4 | 18 | 195 | 698 to 715 | −4.1 | 18 | 302 | 13 | 0.141 | 37 | 63 |
| G36 | TM36 | 701 | 0.3 | 7 | 200 | 699 to 708 | −4.0 | 7 | 305 | 22 | 0.121 | 32 | 68 |
| G37 | TM37 | 703 | 0.2 | 15 | 194 | 700 to 706 | −4.2 | 15 | 296 | 20 | 0.161 | 23 | 77 |
| G38 | TM38 | 702 | 0.1 | 17 | 196 | 698 to 713 | −4.0 | 17 | 299 | 87 | 0.131 | 21 | 79 |
| G39 | TM39 | 702 | 0.4 | 10 | 203 | 692 to 705 | −3.9 | 10 | 299 | 38 | 0.182 | 31 | 69 |
| G40 | TM40 | 701 | 0.4 | 9 | 208 | 695 to 706 | −4.0 | 9 | 298 | 68 | 0.107 | 39 | 61 |
| G41 | TM41 | 703 | 0.4 | 10 | 204 | 693 to 714 | −4.0 | 10 | 296 | 81 | 0.107 | 27 | 73 |
| G42 | TM42 | 702 | 0.1 | 9 | 204 | 693 to 714 | −4.1 | 9 | 296 | 32 | 0.152 | 34 | 66 |
| G43 | TM43 | 701 | 0.2 | 12 | 198 | 700 to 707 | −4.2 | 12 | 299 | 19 | 0.197 | 26 | 74 |
| G44 | TM44 | 701 | 0.2 | 13 | 205 | 697 to 711 | −3.8 | 13 | 301 | 57 | 0.141 | 35 | 65 |
| G45 | TM45 | 704 | 0.3 | 13 | 202 | 700 to 713 | −4.1 | 13 | 303 | 75 | 0.199 | 20 | 80 |
| G46 | TM46 | 701 | 0.3 | 13 | 200 | 692 to 709 | −3.9 | 13 | 307 | 25 | 0.132 | 27 | 73 |
| G47 | TM47 | 702 | 0.2 | 10 | 201 | 693 to 708 | −4.2 | 10 | 298 | 57 | 0.181 | 38 | 62 |
| G48 | TM48 | 702 | 0.2 | 10 | 199 | 700 to 714 | −4.2 | 10 | 307 | 89 | 0.167 | 30 | 70 |
| G49 | TM49 | 701 | 0.3 | 11 | 198 | 690 to 712 | −4.1 | 11 | 299 | 64 | 0.122 | 22 | 78 |
| G50 | TM50 | 701 | 0.2 | 7 | 200 | 694 to 711 | −4.1 | 7 | 306 | 37 | 0.197 | 36 | 64 |
| G51 | TM51 | 703 | 0.5 | 8 | 198 | 699 to 713 | −4.1 | 8 | 300 | 63 | 0.174 | 37 | 63 |
| G52 | TM52 | 703 | 0.4 | 9 | 205 | 700 to 711 | −3.8 | 9 | 299 | 66 | 0.121 | 31 | 69 |
| G53 | TM53 | 705 | 0.4 | 13 | 199 | 697 to 711 | −4.0 | 13 | 297 | 74 | 0.144 | 40 | 60 |
| G54 | TM54 | 702 | 0.2 | 18 | 200 | 691 to 710 | −3.8 | 18 | 305 | 25 | 0.102 | 25 | 75 |
| G55 | TM55 | 703 | 0.3 | 12 | 206 | 692 to 710 | −3.9 | 12 | 302 | 35 | 0.195 | 29 | 71 |
| G56 | TM56 | 702 | 0.2 | 14 | 199 | 691 to 710 | −4.1 | 14 | 297 | 67 | 0.186 | 33 | 67 |
| G57 | TM57 | 703 | 0.4 | 17 | 197 | 692 to 714 | −4.2 | 17 | 305 | 82 | 0.160 | 22 | 78 |
| G58 | TM58 | 704 | 0.2 | 12 | 206 | 698 to 713 | −4.1 | 12 | 298 | 81 | 0.110 | 38 | 62 |
| G59 | TM59 | 701 | 0.2 | 10 | 192 | 695 to 711 | −3.9 | 10 | 298 | 43 | 0.177 | 36 | 64 |
| G60 | TM60 | 703 | 0.3 | 12 | 201 | 695 to 714 | −4.1 | 12 | 302 | 27 | 0.168 | 27 | 73 |
| G61 | TM61 | 703 | 0.3 | 10 | 202 | 692 to 710 | −4.0 | 10 | 297 | 54 | 0.110 | 37 | 63 |
| G62 | TM62 | 702 | 0.2 | 11 | 203 | 692 to 705 | −4.0 | 11 | 304 | 17 | 0.141 | 29 | 71 |
| G63 | TM63 | 702 | 0.2 | 19 | 202 | 700 to 707 | −4.2 | 19 | 303 | 26 | 0.198 | 24 | 76 |
| G64 | TM64 | 702 | 0.4 | 10 | 202 | 695 to 714 | −4.0 | 10 | 302 | 38 | 0.175 | 23 | 77 |
| G65 | TM65 | 705 | 0.5 | 13 | 200 | 697 to 705 | −4.0 | 13 | 300 | 31 | 0.147 | 22 | 78 |
| G66 | TM66 | 702 | 0.4 | 15 | 200 | 695 to 710 | −4.2 | 15 | 303 | 89 | 0.144 | 23 | 77 |
| G67 | TM67 | 702 | 0.2 | 16 | 197 | 698 to 715 | −3.9 | 16 | 297 | 37 | 0.151 | 37 | 63 |
| G68 | TM68 | 702 | 0.3 | 13 | 199 | 699 to 714 | −4.2 | 13 | 306 | 60 | 0.174 | 36 | 64 |
| G69 | TM69 | 700 | 0.4 | 6 | 196 | 690 to 707 | −4.1 | 6 | 294 | 13 | 0.158 | 34 | 66 |
| G70 | TM70 | 702 | 0.4 | 13 | 198 | 696 to 707 | −3.7 | 13 | 293 | 28 | 0.178 | 24 | 76 |
| G71 | TM71 | 702 | 0.3 | 13 | 197 | 698 to 709 | −4.1 | 13 | 294 | 87 | 0.129 | 22 | 78 |
| G72 | TM72 | 705 | 0.0 | 2 | 197 | 697 to 705 | −4.0 | 2 | 298 | 62 | 0.103 | 33 | 67 |

Oxides in B layer and contents of elements

| Level | Cold rolled steel sheet | C content [%] | Si content [%] | Mn content [%] | P content [%] | S content [%] | Al content [%] | Ti, Nb, Cr, Mo, Ni, Cu, Zr, V, W, B, Ca content [%] | Alloying treatment | Evaluation Wettability | Adhesion | Remarks |
|---|---|---|---|---|---|---|---|---|---|---|---|---|
| G1 | TM1 | 0.0003 | 0.0001 | 0.0009 | 0.0009 | 0.0009 | 0.0002 | | Yes | Good | Good | Inv. ex. |
| G2 | TM2 | 0.0005 | 0.0005 | 0.0003 | 0.0003 | 0.0008 | 0.0008 | | Yes | Good | Good | Inv. ex. |
| G3 | TM3 | 0.0009 | 0.0010 | 0.0009 | 0.0004 | 0.0008 | 0.0004 | | Yes | Good | Good | Inv. ex. |
| G4 | TM4 | 0.0004 | 0.0002 | 0.0009 | 0.0002 | 0.0009 | 0.0009 | | Yes | Good | Good | Inv. ex. |
| G5 | TM5 | 0.0001 | 0.0003 | 0.0001 | 0.0005 | 0.0006 | 0.0002 | | Yes | Good | Good | Inv. ex. |
| G6 | TM6 | 0.0009 | 0.0004 | 0.0007 | 0.0002 | 0.0010 | 0.0006 | | Yes | Good | Good | Inv. ex. |
| G7 | TM7 | 0.0009 | 0.0001 | 0.0005 | 0.0010 | 0.0005 | 0.0006 | | Yes | Good | Good | Inv. ex. |
| G8 | TM8 | 0.0006 | 0.0010 | 0.0001 | 0.0008 | 0.0008 | 0.0009 | | Yes | Good | Good | Inv. ex. |
| G9 | TM9 | 0.0009 | 0.0010 | 0.0004 | 0.0001 | 0.0002 | 0.0000 | | Yes | Good | Very good | Inv. ex. |
| G10 | TM10 | 0.0003 | 0.0001 | 0.0008 | 0.0001 | 0.0009 | 0.0009 | | No | Good | Good | Inv. ex. |
| G11 | TM11 | 0.0009 | 0.0008 | 0.0005 | 0.0007 | 0.0003 | 0.0010 | | Yes | Good | Good | Inv. ex. |
| G12 | TM12 | 0.0001 | 0.0005 | 0.0003 | 0.0009 | 0.0004 | 0.0002 | | Yes | Good | Good | Inv. ex. |
| G13 | TM13 | 0.0003 | 0.0007 | 0.0006 | 0.0002 | 0.0004 | 0.0003 | | Yes | Good | Good | Inv. ex. |
| G14 | TM14 | 0.0006 | 0.0008 | 0.0008 | 0.0004 | 0.0004 | 0.0003 | | Yes | Good | Good | Inv. ex. |
| G15 | TM15 | 0.0009 | 0.0002 | 0.0003 | 0.0007 | 0.0007 | 0.0003 | | Yes | Good | Good | Inv. ex. |
| G16 | TM16 | 0.0002 | 0.0001 | 0.0005 | 0.0010 | 0.0007 | 0.0004 | | Yes | Good | Good | Inv. ex. |

TABLE 8-continued

Recrystallization and Annealing Conditions, Surface Structure, Plating Wettability, and Plating Adhesion

| | | | | | | | | | | | | |
|---|---|---|---|---|---|---|---|---|---|---|---|---|
| G17 | TM17 | 0.0007 | 0.0005 | 0.0009 | 0.0003 | 0.0003 | 0.0008 | | Yes | Good | Good | Inv. ex. |
| G18 | TM18 | 0.0001 | 0.0000 | 0.0008 | 0.0005 | 0.0003 | 0.0003 | | Yes | Good | Very good | Inv. ex. |
| G19 | TM19 | 0.0007 | 0.0006 | 0.0009 | 0.0004 | 0.0008 | 0.0002 | | Yes | Good | Good | Inv. ex. |
| G20 | TM20 | 0.0000 | 0.0002 | 0.0008 | 0.0000 | 0.0006 | 0.0007 | | No | Good | Good | Inv. ex. |
| G21 | TM21 | 0.0002 | 0.0010 | 0.0001 | 0.0005 | 0.0008 | 0.0000 | | Yes | Good | Good | Inv. ex. |
| G22 | TM22 | 0.0002 | 0.0004 | 0.0001 | 0.0005 | 0.0008 | 0.0009 | | Yes | Good | Good | Inv. ex. |
| G23 | TM23 | 0.0002 | 0.0002 | 0.0004 | 0.0004 | 0.0001 | 0.0008 | | Yes | Good | Good | Inv. ex. |
| G24 | TM24 | 0.0008 | 0.0002 | 0.0009 | 0.0008 | 0.0005 | 0.0001 | | Yes | Good | Good | Inv. ex. |
| G25 | TM25 | 0.0002 | 0.0004 | 0.0001 | 0.0009 | 0.0002 | 0.0006 | | Yes | Good | Good | Inv. ex. |
| G26 | TM26 | 0.0000 | 0.0009 | 0.0005 | 0.0005 | 0.0004 | 0.0001 | | Yes | Good | Good | Inv. ex. |
| G27 | TM27 | 0.0006 | 0.0003 | 0.0008 | 0.0004 | 0.0000 | 0.0005 | | Yes | Good | Very good | Inv. ex. |
| G28 | TM28 | 0.0002 | 0.0010 | 0.0007 | 0.0002 | 0.0005 | 0.0001 | | Yes | Good | Good | Inv. ex. |
| G29 | TM29 | 0.0004 | 0.0005 | 0.0002 | 0.0005 | 0.0009 | 0.0009 | | Yes | Good | Good | Inv. ex. |
| G30 | TM30 | 0.0006 | 0.0004 | 0.0005 | 0.0002 | 0.0007 | 0.0001 | | No | Good | Good | Inv. ex. |
| G31 | TM31 | 0.0009 | 0.0009 | 0.0004 | 0.0003 | 0.0005 | 0.0000 | | Yes | Good | Good | Inv. ex. |
| G32 | TM32 | 0.0002 | 0.0008 | 0.0004 | 0.0003 | 0.0002 | 0.0006 | | Yes | Good | Good | Inv. ex. |
| G33 | TM33 | 0.0009 | 0.0007 | 0.0001 | 0.0008 | 0.0008 | 0.0009 | | Yes | Good | Good | Inv. ex. |
| G34 | TM34 | 0.0007 | 0.0001 | 0.0006 | 0.0000 | 0.0007 | 0.0002 | | Yes | Good | Good | Inv. ex. |
| G35 | TM35 | 0.0001 | 0.0003 | 0.0001 | 0.0008 | 0.0001 | 0.0002 | | Yes | Good | Good | Inv. ex. |
| G36 | TM36 | 0.0008 | 0.0003 | 0.0007 | 0.0006 | 0.0001 | 0.0007 | | Yes | Good | Good | Inv. ex. |
| G37 | TM37 | 0.0007 | 0.0006 | 0.0008 | 0.0001 | 0.0005 | 0.0000 | | Yes | Good | Good | Inv. ex. |
| G38 | TM38 | 0.0005 | 0.0010 | 0.0004 | 0.0000 | 0.0008 | 0.0002 | | Yes | Good | Good | Inv. ex. |
| G39 | TM39 | 0.0004 | 0.0007 | 0.0009 | 0.0006 | 0.0008 | 0.0006 | | Yes | Good | Good | Inv. ex. |
| G40 | TM40 | 0.0000 | 0.0001 | 0.0005 | 0.0006 | 0.0002 | 0.0009 | | No | Good | Good | Inv. ex. |
| G41 | TM41 | 0.0001 | 0.0008 | 0.0006 | 0.0003 | 0.0007 | 0.0003 | | Yes | Good | Good | Inv. ex. |
| G42 | TM42 | 0.0008 | 0.0002 | 0.0006 | 0.0002 | 0.0000 | 0.0007 | | Yes | Good | Good | Inv. ex. |
| G43 | TM43 | 0.0004 | 0.0001 | 0.0009 | 0.0000 | 0.0007 | 0.0004 | | Yes | Good | Good | Inv. ex. |
| G44 | TM44 | 0.0009 | 0.0004 | 0.0003 | 0.0009 | 0.0005 | 0.0003 | | Yes | Good | Good | Inv. ex. |
| G45 | TM45 | 0.0008 | 0.0005 | 0.0006 | 0.0009 | 0.0000 | 0.0004 | | Yes | Good | Good | Inv. ex. |
| G46 | TM46 | 0.0006 | 0.0003 | 0.0005 | 0.0002 | 0.0005 | 0.0008 | | Yes | Good | Good | Inv. ex. |
| G47 | TM47 | 0.0004 | 0.0006 | 0.0004 | 0.0000 | 0.0008 | 0.0007 | | Yes | Good | Good | Inv. ex. |
| G48 | TM48 | 0.0005 | 0.0004 | 0.0002 | 0.0008 | 0.0010 | 0.0003 | | Yes | Good | Good | Inv. ex. |
| G49 | TM49 | 0.0000 | 0.0010 | 0.0002 | 0.0003 | 0.0006 | 0.0004 | | Yes | Good | Good | Inv. ex. |
| G50 | TM50 | 0.0002 | 0.0005 | 0.0009 | 0.0002 | 0.0004 | 0.0000 | | No | Good | Good | Inv. ex. |
| G51 | TM51 | 0.0006 | 0.0007 | 0.0007 | 0.0010 | 0.0009 | 0.0010 | 0.00006 | Yes | Good | Good | Inv. ex. |
| G52 | TM52 | 0.0000 | 0.0001 | 0.0007 | 0.0010 | 0.0001 | 0.0001 | 0.00006 | Yes | Good | Good | Inv. ex. |
| G53 | TM53 | 0.0010 | 0.0003 | 0.0004 | 0.0002 | 0.0003 | 0.0008 | 0.00009 | Yes | Good | Good | Inv. ex. |
| G54 | TM54 | 0.0005 | 0.0001 | 0.0001 | 0.0002 | 0.0006 | 0.0007 | 0.00004 | Yes | Good | Good | Inv. ex. |
| G55 | TM55 | 0.0004 | 0.0006 | 0.0009 | 0.0000 | 0.0005 | 0.0010 | 0.00008 | Yes | Good | Good | Inv. ex. |
| G56 | TM56 | 0.0002 | 0.0002 | 0.0006 | 0.0009 | 0.0008 | 0.0005 | 0.00010 | Yes | Good | Good | Inv. ex. |
| G57 | TM57 | 0.0005 | 0.0004 | 0.0008 | 0.0006 | 0.0001 | 0.0010 | 0.00002 | Yes | Good | Good | Inv. ex. |
| G58 | TM58 | 0.0004 | 0.0007 | 0.0002 | 0.0007 | 0.0008 | 0.0009 | 0.00007 | Yes | Good | Good | Inv. ex. |
| G59 | TM59 | 0.0003 | 0.0008 | 0.0006 | 0.0000 | 0.0001 | 0.0008 | 0.00008 | Yes | Good | Good | Inv. ex. |
| G60 | TM60 | 0.0005 | 0.0002 | 0.0005 | 0.0004 | 0.0008 | 0.0007 | 0.00002 | No | Good | Good | Inv. ex. |
| G61 | TM61 | 0.0008 | 0.0007 | 0.0004 | 0.0004 | 0.0008 | 0.0002 | 0.00004 | Yes | Good | Good | Inv. ex. |
| G62 | TM62 | 0.0002 | 0.0005 | 0.0005 | 0.0008 | 0.0004 | 0.0006 | 0.00000 | Yes | Good | Good | Inv. ex. |
| G63 | TM63 | 0.0003 | 0.0003 | 0.0003 | 0.0002 | 0.0003 | 0.0009 | 0.00002 | Yes | Good | Good | Inv. ex. |
| G64 | TM64 | 0.0008 | 0.0005 | 0.0003 | 0.0002 | 0.0003 | 0.0004 | 0.00007 | Yes | Good | Good | Inv. ex. |
| G65 | TM65 | 0.0001 | 0.0003 | 0.0010 | 0.0008 | 0.0006 | 0.0002 | 0.00004 | Yes | Good | Good | Inv. ex. |
| G66 | TM66 | 0.0002 | 0.0009 | 0.0006 | 0.0003 | 0.0007 | 0.0008 | 0.00008 | Yes | Good | Good | Inv. ex. |
| G67 | TM67 | 0.0000 | 0.0005 | 0.0005 | 0.0001 | 0.0000 | 0.0004 | 0.00007 | Yes | Good | Good | Inv. ex. |
| G68 | TM68 | 0.0009 | 0.0004 | 0.0009 | 0.0010 | 0.0005 | 0.0009 | 0.00004 | Yes | Good | Good | Inv. ex. |
| G69 | TM69 | 0.0001 | 0.0002 | 0.0001 | 0.0009 | 0.0010 | 0.0000 | 0.00008 | Yes | Good | Very good | Inv. ex. |
| G70 | TM70 | 0.0002 | 0.0007 | 0.0003 | 0.0004 | 0.0004 | 0.0000 | 0.00002 | No | Good | Good | Inv. ex. |
| G71 | TM71 | 0.0001 | 0.0008 | 0.0007 | 0.0003 | 0.0003 | 0.0006 | 0.00001 | Yes | Good | Very good | Inv. ex. |
| G72 | TM72 | 0.0000 | 0.0005 | 0.0009 | 0.0009 | 0.0005 | 0.0009 | 0.00006 | Yes | Good | Good | Inv. ex. |

TABLE 9

Recrystallization and Annealing Conditions, Surface Structure, Plating Wettability, and Plating Adhesion (Comparative Examples)

| | | Heating furnace | | | | Soaking furnace | | | | | | Oxides in B layer and contents of elements | | |
|---|---|---|---|---|---|---|---|---|---|---|---|---|---|---|
| Level | Cold rolled steel sheet | Peak sheet temp. [° C.] | O potential logPH$_2$O/PH$_2$ | H conc. [vol %] | Time in 500° C. to 950° C. temp. range [s] | Sheet temp. range [° C.] | O potential logPH$_2$O/PH$_2$ | H conc. [vol %] | Time in 500° C. to 950° C. temp. range [s] | A layer thick. [μm] | B layer thick. [μm] | Oxide content [%] | Fe content [%] | C content [%] |
| H1 | TM1 | 802 | −2.2 | 6 | 296 | 798 to 814 | −4.3 | 6 | 196 | 66 | 0.0002 | 65 | 35 | 0.0335 |
| H2 | TM22 | 801 | −3.5 | 7 | 304 | 793 to 812 | −5.8 | 7 | 207 | 44 | 0.0004 | 60 | 40 | 0.1134 |
| H3 | TM51 | 803 | −2.9 | 6 | 306 | 798 to 814 | −4.3 | 6 | 202 | 76 | 0.0004 | 70 | 30 | 0.0543 |
| H4 | TM1 | 804 | 2.2 | 5 | 300 | 797 to 808 | −4.4 | 5 | 201 | 28 | 0.72 | 75 | 25 | 0.0005 |
| H5 | TM22 | 802 | 2.8 | 7 | 308 | 792 to 815 | −0.4 | 7 | 201 | 32 | 0.65 | 85 | 15 | 0.0010 |
| H6 | TM52 | 803 | 3.2 | 7 | 303 | 797 to 806 | −4.3 | 7 | 202 | 20 | 0.80 | 73 | 27 | 0.0000 |
| H7 | TM1 | 802 | 0.5 | 7 | 302 | 795 to 812 | −1.2 | 7 | 207 | 48 | 0.591 | 55 | 45 | 0.0124 |
| H8 | TM22 | 800 | 0.3 | 5 | 300 | 793 to 814 | −1.8 | 5 | 204 | 85 | 0.00023 | 63 | 37 | 0.0954 |
| H9 | TM53 | 804 | 2.5 | 7 | 291 | 791 to 807 | −0.5 | 7 | 196 | 33 | 0.00080 | 59 | 41 | 0.0783 |
| H10 | TM1 | 802 | 0.6 | 7 | 302 | 796 to 815 | −6 | 7 | 203 | 46 | 0.593 | 55 | 45 | 0.0007 |
| H11 | TM22 | 803 | 0.6 | 8 | 302 | 795 to 807 | −5.3 | 8 | 197 | 77 | 0.823 | 59 | 41 | 0.0006 |
| H12 | TM54 | 802 | −2.5 | 4 | 303 | 791 to 807 | −0.8 | 4 | 196 | 55 | 0.664 | 62 | 38 | 0.0004 |
| H13 | TM1 | 401 | 0.5 | 5 | 0 | 399 to 405 | −4.4 | 5 | 0 | 59 | 0.617 | 10 | 90 | 0.0153 |
| H14 | TM22 | 743 | 0.5 | 7 | 5 | 740 to 749 | −4.2 | 7 | 8 | 52 | 0.0004 | 13 | 86 | 0.0845 |
| H15 | TM55 | 404 | 0.4 | 8 | 0 | 403 to 407 | −4.2 | 8 | 0 | 17 | 0.564 | 10 | 89 | 0.0343 |
| H16 | TM1 | 1001 | 0.5 | 7 | 294 | 999 to 1006 | −4.2 | 7 | 823 | 17 | 0.70 | 72 | 28 | 0.0001 |
| H17 | TM22 | 1012 | 0.5 | 5 | 534 | 1004 to 1023 | −4.2 | 5 | 582 | 20 | 0.061 | 80 | 20 | 0.0005 |
| H18 | TM56 | 1042 | 0.4 | 4 | 923 | 1035 to 1048 | −4.4 | 4 | 197 | 33 | 0.068 | 81 | 19 | 0.0002 |
| H19 | TM1 | 800 | 0.5 | 6 | 100 | 791 to 813 | −4.2 | 6 | 8 | 41 | 0.064 | 10 | 90 | 0.0232 |
| H20 | TM22 | 803 | 0.6 | 6 | 100 | 791 to 811 | −4.4 | 6 | 6 | 55 | 0.068 | 6 | 92 | 0.0545 |
| H21 | TM57 | 801 | 0.6 | 8 | 100 | 793 to 812 | −4.4 | 8 | 4 | 32 | 0.0003 | 12 | 87 | 0.0143 |
| H22 | TM1 | 552 | 0.4 | 5 | 1112 | 794 to 813 | −4.2 | 5 | 1058 | 29 | 0.5 | 82 | 18 | 0.0008 |
| H23 | TM22 | 783 | 0.6 | 7 | 1204 | 549 to 560 | −4.3 | 7 | 1245 | 21 | 0.050 | 78 | 22 | 0.0009 |
| H24 | TM58 | 901 | 0.5 | 5 | 1048 | 892 to 905 | −4.3 | 5 | 1144 | 84 | 1.0 | 75 | 25 | 0.0009 |
| H25 | TM1 | 802 | 0.7 | 0.5 | 308 | 799 to 805 | −4.3 | 0.5 | 202 | 56 | 0.050 | 27 | 73 | 0.0005 |
| H26 | TM59 | 801 | 0.5 | 0.3 | 304 | 799 to 807 | −4.3 | 0.3 | 201 | 80 | 0.070 | 26 | 74 | 0.0004 |
| H27 | TM1 | 801 | 0.5 | 42 | 297 | 799 to 808 | −4.3 | 42 | 199 | 56 | 0.013 | 42 | 58 | 0.0009 |
| H28 | TM60 | 801 | 0.3 | 36 | 305 | 796 to 814 | −4.3 | 36 | 197 | 40 | 0.050 | 48 | 52 | 0.0007 |
| H29 | TM1 | 800 | −1.2 | 7 | 295 | 791 to 806 | −4.3 | 7 | 195 | 1.2 | 0.166 | 65 | 35 | 0.0235 |
| H30 | TM22 | 800 | −1.1 | 4 | 294 | 793 to 812 | −4.4 | 4 | 208 | 0.5 | 0.038 | 60 | 40 | 0.1134 |
| H31 | TM61 | 804 | −0.8 | 5 | 299 | 791 to 811 | −4.3 | 5 | 199 | 1.5 | 0.009 | 70 | 30 | 0.0543 |
| H32 | TM1 | 803 | −0.9 | 6 | 301 | 792 to 811 | −4.1 | 6 | 201 | 105 | 0.258 | 75 | 25 | 0.0005 |
| H33 | TM22 | 804 | −0.8 | 6 | 300 | 799 to 812 | −4.3 | 6 | 196 | 115 | 0.055 | 85 | 15 | 0.0010 |
| H34 | TM62 | 801 | −1 | 5 | 305 | 797 to 809 | −4.4 | 5 | 201 | 111 | 0.007 | 73 | 27 | 0.0000 |

| Level | Cold rolled steel sheet | Si content [%] | Mn content [%] | P content [%] | S content [%] | Al content [%] | Ti, Nb, Cr, Mo, Ni, Cu, Zr, V, W, B, Ca content [%] | Alloying treatment | Wettability | Adhesion | Remarks |
|---|---|---|---|---|---|---|---|---|---|---|---|
| H1 | TM1 | 0.0009 | 0.0007 | 0.0001 | 0.0002 | 0.0006 | | Yes | Poor | Good | Comp. ex. |
| H2 | TM22 | 0.0005 | 0.0007 | 0.0010 | 0.0002 | 0.0005 | | No | Poor | Good | Comp. ex. |
| H3 | TM51 | 0.0000 | 0.0003 | 0.0005 | 0.0008 | 0.0009 | 0.0005 | Yes | Good | Poor | Comp. ex. |
| H4 | TM1 | 0.0005 | 0.0009 | 0.0009 | 0.0006 | 0.0007 | | No | Poor | Good | Comp. ex. |
| H5 | TM22 | 0.0008 | 0.0001 | 0.0005 | 0.0005 | 0.0001 | | Yes | Good | Poor | Comp. ex. |
| H6 | TM52 | 0.0006 | 0.0010 | 0.0006 | 0.0007 | 0.0003 | 0.002 | No | Poor | Good | Comp. ex. |
| H7 | TM1 | 0.0007 | 0.0010 | 0.0004 | 0.0004 | 0.0001 | | Yes | Good | Poor | Comp. ex. |
| H8 | TM22 | 0.0001 | 0.0001 | 0.0006 | 0.0008 | 0.0003 | | No | Poor | Good | Comp. ex. |
| H9 | TM53 | 0.0002 | 0.0010 | 0.0003 | 0.0003 | 0.0001 | 0.0012 | Yes | Poor | Good | Comp. ex. |
| H10 | TM1 | 0.0004 | 0.0005 | 0.0008 | 0.0003 | 0.0003 | | No | Poor | Good | Comp. ex. |
| H11 | TM22 | 0.0005 | 0.0009 | 0.0007 | 0.0001 | 0.0006 | | No | Poor | Good | Comp. ex. |
| H12 | TM54 | 0.0007 | 0.0005 | 0.0005 | 0.0006 | 0.0010 | 0.004 | No | Poor | Good | Comp. ex. |
| H13 | TM1 | 0.233 | 0.136 | 0.0004 | 0.0000 | 0.0089 | | No | Poor | Good | Comp. ex. |
| H14 | TM22 | 0.824 | 0.408 | 0.0071 | 0.0027 | 0.0023 | | No | Poor | Good | Comp. ex. |
| H15 | TM55 | 0.783 | 0.412 | 0.0002 | 0.0004 | 0.0061 | 0.0021 | No | Poor | Good | Comp. ex. |
| H16 | TM1 | 0.0002 | 0.0004 | 0.0005 | 0.0008 | 0.0008 | | No | Poor | Good | Comp. ex. |

TABLE 9-continued

Recrystallization and Annealing Conditions, Surface Structure, Plating Wettability, and Plating Adhesion (Comparative Examples)

| | | | | | | | | | | | |
|---|---|---|---|---|---|---|---|---|---|---|---|
| H17 | TM22 | 0.0002 | 0.0000 | 0.0006 | 0.0001 | 0.0008 | | Yes | Poor | Poor | Comp. ex. |
| H18 | TM56 | 0.0004 | 0.0002 | 0.0009 | 0.0009 | 0.0001 | 0.013 | Yes | Poor | Poor | Comp. ex. |
| H19 | TM1 | 0.255 | 0.136 | 0.0008 | 0.0006 | 0.0043 | | Yes | Poor | Poor | Comp. ex. |
| H20 | TM22 | 0.745 | 0.566 | 0.0090 | 0.0018 | 0.0008 | | Yes | Poor | Poor | Comp. ex. |
| H21 | TM57 | 0.883 | 0.196 | 0.0008 | 0.0006 | 0.0078 | 0.005 | Yes | Poor | Poor | Comp. ex. |
| H22 | TM1 | 0.0004 | 0.0002 | 0.0002 | 0.0005 | 0.0004 | | Yes | Poor | Poor | Comp. ex. |
| H23 | TM22 | 0.0008 | 0.0009 | 0.0006 | 0.0008 | 0.0008 | | Yes | Poor | Poor | Comp. ex. |
| H24 | TM58 | 0.0010 | 0.0003 | 0.0009 | 0.0007 | 0.0001 | 0.0011 | Yes | Poor | Poor | Comp. ex. |
| H25 | TM1 | 0.012 | 0.0003 | 0.0007 | 0.0005 | 0.0032 | | Yes | Poor | Poor | Comp. ex. |
| H26 | TM59 | 0.021 | 0.0004 | 0.0003 | 0.0003 | 0.0055 | 0.0011 | Yes | Poor | Poor | Comp. ex. |
| H27 | TM1 | 0.0000 | 0.0005 | 0.0005 | 0.0001 | 0.0003 | | Yes | Poor | Poor | Comp. ex. |
| H28 | TM60 | 0.0003 | 0.0003 | 0.0009 | 0.0002 | 0.0007 | 0.0011 | Yes | Poor | Poor | Comp. ex. |
| H29 | TM1 | 0.0009 | 0.0007 | 0.0001 | 0.0002 | 0.0006 | | Yes | Poor | Poor | Comp. ex. |
| H30 | TM22 | 0.0005 | 0.0007 | 0.0010 | 0.0002 | 0.0005 | | Yes | Poor | Poor | Comp. ex. |
| H31 | TM61 | 0.0000 | 0.0003 | 0.0005 | 0.0008 | 0.0009 | 0.003 | Yes | Poor | Poor | Comp. ex. |
| H32 | TM1 | 0.0005 | 0.0009 | 0.0009 | 0.0006 | 0.0007 | | Yes | Poor | Poor | Comp. ex. |
| H33 | TM22 | 0.0008 | 0.0001 | 0.0005 | 0.0005 | 0.0001 | | Yes | Poor | Poor | Comp. ex. |
| H34 | TM62 | 0.0006 | 0.0010 | 0.0006 | 0.0007 | 0.0003 | 0.002 | Yes | Poor | Poor | Comp. ex. |

After the soaking furnace, the steel sheet is treated by general slow cooling, rapid cooling, overaging, and secondary cooling steps and then dipped in a hot dip galvanization bath. The hot dip galvanization bath had a plating bath temperature of 460° C. and contained 0.13 mass % of Al. After the steel sheet was dipped in the hot dip galvanization bath, it was wiped by nitrogen gas to adjust the plating thickness to 8 μm per surface. After that, in several examples, an alloying furnace was used to heat the steel sheet to a temperature of 500° C. for 30 seconds for alloying treatment. The obtained hot dip galvanized steel sheet was evaluated for plating wettability and plating adhesion. The results are shown in Tables 2 to 7, while comparative examples are shown in Table 8. In Tables 2 to 7, the performance of alloying treatment is described by indicating the case where alloying treatment is performed as "Yes" and the case where it is not as "No".

The plating wettability was evaluated by mapping Zn and Fe on any 200 μm×200 μm area on the surface of the plated steel sheet of each test material by EPMA and judging the case where there is no Zn and there are locations where Fe is exposed as poor in wettability (Poor) and the case where Zn covers the entire surface and there are no locations where Fe is exposed as good in wettability (Good).

The plating adhesion was measured by a powdering test. The case of a peeling length of over 2 mm was evaluated as poor in adhesion (Poor), 2 mm to over 1 mm as good in adhesion (Good), and 1 mm or less as extremely good in adhesion (Very good). A "powdering test" is a method of examination of adhesion which adheres Cellotape® to a hot dip galvanized steel sheet, bends the tape surface by 90° (R=1), unbends it, then peels off the tape and measures the peeled length of the plating layer.

Further, the thickness of the B layer and the total of the contents of the individual oxides or composite oxides in the B layer, the content of Fe not in oxides in the B layer, and the contents of Si, Mn, P, S, Al, Ti, Cr, Mo, Ni, Cu, Zr, V, B, and Ca not in oxides in the B layer were found by the methods of measurement by the above-mentioned XPS (PHI5800, made by Ulvac Phi).

As a result of tests of the plating wettability and plating adhesion of the examples (invention examples) and comparative examples of the present invention, it was learned that the examples of the present invention of Tables 2 to 9 of A1 to A72, B1 to B72, C1 to C72, D1 to D72, E1 to E72, F1 to F72, and G1 to G72 were better in plating wettability and plating adhesion compared with the comparative examples of Table 9 of the levels H1 to H34.

INDUSTRIAL APPLICABILITY

The hot dip galvanized steel sheet which is produced by the method of the present invention is excellent in plating wettability and plating adhesion, so application mainly as members in the automotive field and the household appliance field and construction machine field may be expected.

The invention claimed is:

1. A hot dip galvanized steel sheet comprising a steel sheet which contains, by mass %,
C: 0.05% to 0.50%,
Si: 0.1% to 3.0%,
Mn: 0.5% to 5.0%,
P: 0.001% to 0.5%,
S: 0.001% to 0.03%,
Al: 0.005% to 1.0%, and
a balance of Fe and unavoidable impurities, having a hot dip galvanized layer A on the surface of said steel sheet, characterized by having the following B layer right below said steel sheet surface and inside said steel sheet:
B layer: Layer which has thickness of 0.001 μm to 0.5 μm, which contains, based on mass of said B layer, one or more of Fe, Si, Mn, P, S, and Al oxides in a total of less than 50 mass %, which contains C, Si, Mn, P, S, and Al not in oxides in:
C: less than 0.05 mass %,
Si: less than 0.1 mass %,
Mn: less than 0.5 mass %,
P: less than 0.001 mass %,
S: less than 0.001 mass %, and
Al: less than 0.005 mass %, and
which contains Fe not in oxides in 50 mass % or more.

2. A hot dip galvanized steel sheet comprising a steel sheet which contains, by mass %,
C: 0.05% to 0.50%,
Si: 0.1% to 3.0%,
Mn: 0.5% to 5.0%,
P: 0.001% to 0.5%,
S: 0.001% to 0.03%,
Al: 0.005% to 1.0%,
one or more elements of Ti, Nb, Cr, Mo, Ni, Cu, Zr, V, W, B, Ca, and REM in respectively 0.0001% to 1%, and a balance of Fe and unavoidable impurities, having a hot dip galvanized layer A on the surface of said steel sheet, characterized by having the following B layer right below said steel sheet surface and inside said steel sheet:

B layer: Layer which has thickness of 0.001 μm to 0.5 μm, which contains, based on mass of said B layer, one or more of Fe, Si, Mn, P, S, Al, Ti, Nb, Cr, Mo, Ni, Cu, Zr, V, W, B, Ca, and REM oxides in a total of less than 50 mass %, which contains C, Si, Mn, P, S, Al, Ti, Nb, Cr, Mo, Ni, Cu, Zr, V, W, B, Ca, and REM not in oxides in:

C: less than 0.05 mass %,
Si: less than 0.1 mass %,
Mn: less than 0.5 mass %,
P: less than 0.001 mass %,
S: less than 0.001 mass %,
Al: less than 0.005 mass %,
one or more of Ti, Nb, Cr, Mo, Ni, Cu, Zr, V, W, B, Ca, and REM in respectively less than 0.0001 mass %, and
which contains Fe not in oxides in 50 mass % or more.

3. The hot dip galvanized steel sheet according to claim 1, wherein said hot dip galvanized layer A has a thickness of 2 μm to 100 μm.

4. A method of production of a hot dip galvanized steel sheet comprising casting, hot rolling, pickling, and cold rolling a steel containing the components described in claim 1 to obtain a cold rolled steel sheet, and annealing said cold rolled steel sheet and hot dip galvanizing the annealed steel sheet in a continuous hot dip galvanization facilities which are provided with a heating furnace and a soaking furnace, wherein, in said heating furnace and said soaking furnace which perform said annealing treatment, the temperature of said cold rolled steel sheet in the furnaces being 500° C. to 950° C. in temperature range and running said cold rolled steel sheet under the following conditions:

Heating furnace conditions: Using an all radiant tube type of heating furnace, heating said cold rolled steel sheet in the above temperature range for 10 seconds to 1000 seconds, wherein the $\log(PH2O/PH_2)$ of the value of the steam partial pressure ($PH_2O$) in said heating furnace divided by the hydrogen partial pressure ($PH_2$) is −2 to 2, and wherein said heating furnace has an atmosphere comprised of hydrogen in a hydrogen concentration of 1 vol % to 30 vol %, steam, and nitrogen;

Soaking furnace conditions: After said heating furnace, in the soaking furnace, soaking said cold rolled steel sheet in the above temperature range for 10 seconds to 1000 seconds, wherein the $\log(PH_2O/PH_2)$ of the value of the steam partial pressure ($PH_2O$) in said soaking furnace divided by the hydrogen partial pressure ($PH_2$) is −5 to less than −2, and wherein said soaking furnace has an atmosphere comprised of hydrogen in a hydrogen concentration of 1 vol % to 30 vol %, steam, and nitrogen.

5. The hot dip galvanized steel sheet according to claim 2, wherein said hot dip galvanized layer A has a thickness of 2 μm to 100 μm.

6. A method of production of a hot dip galvanized steel sheet comprising casting, hot rolling, pickling, and cold rolling a steel containing the components described in claim 2 to obtain a cold rolled steel sheet, and annealing said cold rolled steel sheet and hot dip galvanizing the annealed steel sheet in a continuous hot dip galvanization facilities which are provided with a heating furnace and a soaking furnace, wherein, in said heating furnace and said soaking furnace which perform said annealing treatment, the temperature of said cold rolled steel sheet in the furnaces being 500° C. to 950° C. in temperature range and running said cold rolled steel sheet under the following conditions:

Heating furnace conditions: Using an all radiant tube type of heating furnace, heating said cold rolled steel sheet in the above temperature range for 10 seconds to 1000 seconds, wherein the $\log(PH_2O/PH_2)$ of the value of the steam partial pressure ($PH_2O$) in said heating furnace divided by the hydrogen partial pressure ($PH_2$) is −2 to 2, and wherein said heating furnace has an atmosphere comprised of hydrogen in a hydrogen concentration of 1 vol % to 30 vol %, steam, and nitrogen;

Soaking furnace conditions: After said heating furnace, in the soaking furnace, soaking said cold rolled steel sheet in the above temperature range for 10 seconds to 1000 seconds, wherein the $\log(PH_2O/PH_2)$ of the value of the steam partial pressure ($PH_2O$) in said soaking furnace divided by the hydrogen partial pressure ($PH_2$) is −5 to less than −2, and wherein said soaking furnace has an atmosphere comprised of hydrogen in a hydrogen concentration of 1 vol % to 30 vol %, steam, and nitrogen.

7. A hot dip galvannealed steel sheet comprising a steel sheet which contains, by mass %,
C: 0.05% to 0.50%,
Si: 0.1% to 3.0%,
Mn: 0.5% to 5.0%,
P: 0.001% to 0.5%,
S: 0.001% to 0.03%,
Al: 0.005% to 1.0%, and
a balance of Fe and unavoidable impurities, having a hot dip galvannealed layer A on the surface of said steel sheet, characterized by having the following B layer right below said steel sheet surface and inside said steel sheet:

B layer: Layer which has thickness of 0.001 μm to 0.5 μm, which contains, based on mass of said B layer, one or more of Fe, Si, Mn, P, S, and Al oxides in a total of less than 50 mass %, which contains C, Si, Mn, P, S, and Al not in oxides in:
S, and Al not in oxides in:
C: less than 0.05mass %,
Si: less than 0.1 mass %,
Mn: less than 0.5 mass %,
P: less than 0.001 mass %,
S: less than 0.001 mass %, and
Al: less than 0.005 mass %, and
which contains Fe not in oxides in 50 mass % or more.

8. A hot dip galvannealed steel sheet comprising a steel sheet which contains, by mass %,
C: 0.05% to 0.50%,
Si: 0.1% to 3.0%,
Mn: 0.5% to 5.0%,
P: 0.001% to 0.5%,
S: 0.001% to 0.03%,
Al: 0.005% to 1.0%,
one or more elements of Ti, Nb, Cr, Mo, Ni, Cu, Zr, V, W, B, Ca, and REM in respectively 0.0001% to 1%, and
a balance of Fe and unavoidable impurities, having a hot dip galvannealed layer A on the surface of said steel sheet, characterized by having the following B layer right below said steel sheet surface and inside said steel sheet:

B layer: Layer which has thickness of 0.001 μm to 0.5 μm, which contains, based on mass of said B layer, one or more of Fe, Si, Mn, P, S, Al, Ti, Nb, Cr, Mo, Ni, Cu, Zr, V, W, B, Ca, and REM oxides in a total of less than 50 mass %, which contains C, Si, Mn, P, S, Al, Ti, Nb, Cr, Mo, Ni, Cu, Zr, V, W, B, Ca, and REM not in oxides in:
C: less than 0.05 mass %,
Si: less than 0.1 mass %,
Mn: less than 0.5 mass %,
P: less than 0.001 mass %,
S: less than 0.001 mass %,
Al: less than 0.005 mass %,
one or more of Ti, Nb, Cr, Mo, Ni, Cu, Zr, V, W, B, Ca, and REM in respectively less than 0.0001 mass %, and which contains Fe not in oxides in 50 mass % or more.

9. The hot dip galvannealed steel sheet according to claim 7, wherein said hot dip galvannealed layer A has a thickness of 2 μm to 100 μm.

10. The hot dip galvannealed steel sheet according to claim 8, wherein said hot dip galvannealed layer A has a thickness of 2 μm to 100 μM.

11. A method of production of a hot dip galvannealed steel sheet comprising casting, hot rolling, pickling, and cold rolling a steel containing the components described in claim 7 to obtain a cold rolled steel sheet, and annealing said cold rolled steel sheet and hot dip galvanizing the annealed steel sheet in a continuous hot dip galvanization facilities which are provided with a heating furnace and a soaking furnace, and alloying the hot dip galvanized steel sheet, wherein, in said heating furnace and said soaking furnace which perform said annealing treatment, the temperature of said cold rolled steel sheet in the furnaces being 500° C. to 950° C. in temperature range and running said cold rolled steel sheet under the following conditions:

Heating furnace conditions: Using an all radiant tube type of heating furnace, heating said cold rolled steel sheet in the above temperature range for 10 seconds to 1000 seconds, wherein the $\log(PH_2O/PH_2)$ of the value of the steam partial pressure ($PH_2O$) in said heating furnace divided by the hydrogen partial pressure ($PH_2$) is −2 to 2, and wherein said heating furnace has an atmosphere comprised of hydrogen in a hydrogen concentration of 1 vol % to 30 vol %, steam, and nitrogen;

Soaking furnace conditions: After said heating furnace, in the soaking furnace, soaking said cold rolled steel sheet in the above temperature range for 10 seconds to 1000 seconds, wherein the $\log(PH_2O/PH_2)$ of the value of the steam partial pressure ($PH_2O$) in said soaking furnace divided by the hydrogen partial pressure ($PH_2$) is −5 to less than −2, and wherein said soaking furnace has an atmosphere comprised of hydrogen in a hydrogen concentration of 1 vol % to 30 vol %, steam, and nitrogen.

12. A method of production of a hot dip galvannealed steel sheet comprising casting, hot rolling, pickling, and cold rolling a steel containing the components described in claim 8 to obtain a cold rolled steel sheet, and annealing said cold rolled steel sheet and hot dip galvanizing the annealed steel sheet in a continuous hot dip galvanization facilities which are provided with a heating furnace and a soaking furnace, and alloying the hot dip galvanized steel sheet, wherein, in said heating furnace and said soaking furnace which perform said annealing treatment, the temperature of said cold rolled steel sheet in the furnaces being 500° C. to 950° C. in temperature range and running said cold rolled steel sheet under the following conditions:

Heating furnace conditions: Using an all radiant tube type of heating furnace, heating said cold rolled steel sheet in the above temperature range for 10 seconds to 1000 seconds, wherein the $\log(PH_2O/PH_2)$ of the value of the steam partial pressure ($PH_2O$) in said heating furnace divided by the hydrogen partial pressure ($PH_2$) is −2 to 2, and wherein said heating furnace has an atmosphere comprised of hydrogen in a hydrogen concentration of 1 vol % to 30 vol %, steam, and nitrogen;

Soaking furnace conditions: After said heating furnace, in the soaking furnace, soaking said cold rolled steel sheet in the above temperature range for 10 seconds to 1000 seconds, wherein the $\log(PH_2O/PH_2)$ of the value of the steam partial pressure ($PH_2O$) in said soaking furnace divided by the hydrogen partial pressure ($PH_2$) is −5 to less than −2, and wherein said soaking furnace has an atmosphere comprised of hydrogen in a hydrogen concentration of 1 vol % to 30 vol %, steam, and nitrogen.

* * * * *